United States Patent
Bendinelli et al.

(10) Patent No.: US 7,181,766 B2
(45) Date of Patent: Feb. 20, 2007

(54) METHODS AND SYSTEM FOR PROVIDING NETWORK SERVICES USING AT LEAST ONE PROCESSOR INTERFACING A BASE NETWORK

(75) Inventors: Samuel Bendinelli, Princeton, NJ (US); Michael Herrick, Colts Neck, NJ (US); John Keane, Metuchen, NJ (US); Christopher Macey, Red Bank, NJ (US); Mark Tuomenoksa, Winchester, MA (US); Jerold Francus, Far Hills, NJ (US); Jonathan Harwood, Rumson, NJ (US); Brion Shimamoto, Riverside, CT (US); Joseph Ferraro, Old Tappan, NJ (US)

(73) Assignee: Corente, Inc., East Brunswick, NJ (US)

( * ) Notice: Subject to any disclaimer, the term of this patent is extended or adjusted under 35 U.S.C. 154(b) by 826 days.

(21) Appl. No.: 09/832,345

(22) Filed: Apr. 11, 2001

(65) Prior Publication Data
US 2002/0026503 A1 Feb. 28, 2002

Related U.S. Application Data

(63) Continuation-in-part of application No. 09/814,178, filed on Mar. 22, 2001.

(60) Provisional application No. 60/196,297, filed on Apr. 12, 2000.

(51) Int. Cl.
*G06F 15/177* (2006.01)
*H04L 9/00* (2006.01)
*G06F 3/00* (2006.01)

(52) U.S. Cl. .................. 726/15; 726/3; 726/4; 709/220; 709/223; 710/1; 713/151; 713/152; 713/153

(58) Field of Classification Search ................ 709/220, 709/223; 710/1; 713/151–153; 726/3, 4, 726/15
See application file for complete search history.

(56) References Cited

U.S. PATENT DOCUMENTS

| | | | |
|---|---|---|---|
| 5,825,772 A | 10/1998 | Dobbins et al. | |
| 5,864,666 A | 1/1999 | Shrader | |
| 5,875,472 A | 2/1999 | Bauman et al. ............. | 711/150 |
| 5,918,019 A | 6/1999 | Valencia | |
| 5,930,188 A | 7/1999 | Roohparvar | |
| 6,041,166 A | 3/2000 | Hart et al. | |
| 6,061,796 A * | 5/2000 | Chen et al. ................. | 713/152 |
| 6,092,200 A | 7/2000 | Muniyappa et al. | |
| 6,094,437 A | 7/2000 | Loehndorf, Jr. et al. | |
| 6,104,716 A | 8/2000 | Crichton et al. | |
| 6,154,839 A | 11/2000 | Arrow et al. | |
| 6,173,399 B1 | 1/2001 | Gilbrech ..................... | 713/153 |
| 6,175,917 B1 | 1/2001 | Arrow et al. | |
| 6,195,705 B1 | 2/2001 | Leung | |
| 6,249,523 B1 | 6/2001 | Hrastar et al. | |
| 6,339,595 B1 | 1/2002 | Rekhter et al. ............. | 372/392 |
| 6,381,646 B2 | 4/2002 | Zhang et al. | |
| 6,393,488 B1 | 5/2002 | Araujo ....................... | 709/245 |
| 6,407,988 B1 | 6/2002 | Agraharam et al. | |
| 6,438,612 B1 | 8/2002 | Ylonen et al. | |
| 6,449,272 B1 | 9/2002 | Chuah et al. | |
| 6,490,289 B1 | 12/2002 | Zhang et al. ................ | 370/401 |
| 6,507,873 B1 | 1/2003 | Suzuki et al. | |
| 6,516,417 B1 | 2/2003 | Pegrum et al. | |
| 6,556,584 B1 | 4/2003 | Horsley et al. | |
| 6,615,357 B1 | 9/2003 | Boden et al. | |
| 6,631,416 B2 | 10/2003 | Bendinelli et al. | |
| 6,665,304 B2 | 12/2003 | Beck et al. | |
| 6,684,256 B1 | 1/2004 | Warrier et al. | |
| 6,697,354 B1 | 2/2004 | Borella et al. | |
| 6,701,358 B1 * | 3/2004 | Poisson et al. ............. | 709/223 |
| 6,751,729 B1 * | 6/2004 | Giniger et al. ............. | 713/153 |
| 6,788,681 B1 | 9/2004 | Hurren et al. | |
| 6,798,782 B1 | 9/2004 | Caronni et al. | |
| 6,996,628 B2 | 2/2006 | Keane et al. | |
| 7,028,334 B2 | 4/2006 | Tuomenoksa | |
| 2001/0014097 A1 | 8/2001 | Beck et al. | |
| 2001/0032273 A1 | 10/2001 | Cheng | |
| 2002/0023210 A1 | 2/2002 | Tuomenoksa | |
| 2002/0026531 A1 | 2/2002 | Keane et al. | |

| | | | |
|---|---|---|---|
| 2002/0029276 A1 | 3/2002 | Bendinelli et al. |
| 2002/0053031 A1 | 5/2002 | Bendinelli et al. |
| 2002/0056008 A1 | 5/2002 | Keane et al. |
| 2002/0091859 A1 | 7/2002 | Tuomenoksa |
| 2002/0099937 A1 | 7/2002 | Tuomenoksa |
| 2002/0124090 A1 | 9/2002 | Poier et al. |
| 2003/0033401 A1 | 2/2003 | Poisson et al. |
| 2003/0108041 A1 | 6/2003 | Aysan et al. |
| 2003/0131263 A1 | 7/2003 | Keane et al. |
| 2003/0145104 A1 | 7/2003 | Boden et al. |
| 2003/0158962 A1 | 8/2003 | Keane et al. |

FOREIGN PATENT DOCUMENTS

| | | |
|---|---|---|
| EP | 0 302 646 A2 | 2/1989 |
| EP | 0838 930 A2 | 4/1998 |
| GB | 2 340 702 A | 2/2000 |
| WO | WO 8908887 | 9/1989 |
| WO | WO 985467 A | 12/1998 |
| WO | WO 9859470 | 12/1998 |
| WO | WO 0011832 A | 3/2000 |
| WO | WO 01/80487 A2 | 10/2001 |
| WO | WO 0180490 A3 | 10/2001 |
| WO | WO 01/82533 A2 | 11/2001 |
| WO | WO 02/17558 A2 | 2/2002 |

OTHER PUBLICATIONS

Malkin Gary Scott: "Dial-In Virtual Private Networks Using Layer 3 Tunneling" Proceedings of the Conference on Local Computer Networks, Nov. 2, 1997.

O'Guin, S. et al., "Application of Virtual Private Networking Technology to Standards-Based Management Protocols Across Heterogeneous Firewill-Protected Networks," IEEE, pp. 1251-1255, Oct. 31, 1999.

Hurwitz Group, "How Small and Midsize Businesses Can Turn the Internet into a Private Network for Competitive Advantage," Jun. 2000, downloaded from http://www.openreach.com on Jan. 4, 2001.

Applied Technologies Group, "A Practical Guide to the Right VPN Solution," 2000, downloaded from http://www.openreach.com on Jan. 23, 2001.

OpenReach, "Demystifying VPN: An Introduction to VPN Technology," 2000, downloaded from http://www.openreach.com on Jan. 4, 2001.

OpenReach, "Private Connections / Open Networks," presented on Feb. 20, 2001.

OpenReach, "Transforming the Internet into My Private Backbone for Business: Demystifying VPNs," presented on Nov. 7, 2000.

NetworkMagazine.com, "Special Report: VPN Overlay Networks: An Answer to Netwroks-Based IP VPNs?," Jun. 5, 2001, downloaded downloaded from http://www.network_magazine.com on Nov. 5, 2001.

RFC-2401, S. Kent et al., "Security Architecture for The Internet Protocol," The Internet Society (1998).

RFC-2409, Harkins et al., "The Internet Key Exchange," The Internet Society (1998).

RFC-1828, Metzger et al., "IP Authentication Using Keyed MD5," The Internet Society (1995).

RFC-793, "Transmission Control Protocol," Information Sciences Institute for Defense Advanced Research Projects Agency (DARPA)(1981).

RFC-791, "Internet Protocol," Information Sciences Institute for Defense Advanced Research Projects Agency (DARPA)(1981).

RFC-2663, P. Srisuresh et al., "IP Network Address Translator (NAT) Technology and Considerations," pp. 1-30, Aug. 1999.

W. T. Teo et al., "Mobile IP extension for Private Internets Support (MPN)," Internet Drafts Archive, 'Online!, pp. 1-24, Feb. 1999, Retrieved from the Internet: URL:http://www.watersprings.org/pub/id/draft-teoyli-mobileip-mvpn-02.txt>, 'retrieved on Feb. 9, 2005!.

\* cited by examiner

*Primary Examiner*—Kim Huynh
*Assistant Examiner*—Alan S. Chen
(74) *Attorney, Agent, or Firm*—Finnegan, Henderson, Farabow, Garrett & Dunner, LLP

(57) ABSTRACT

Methods and systems are provided for providing network services using at least one processor, such as a network operations center that interfaces a base network. The network operations center may receive information identifying a user authorized to administer a first processor, which may be separate from the network operations center, and a base address that is routable in the base network. The network operations center may provide through the base network code and information for self-configuring the first processor as a gateway that interfaces the base network at the base address. The first processor may execute the provided code to self-configure itself as the gateway based on the provided information. The network operations center may then provide through the base network to the first processor additional information enabling at least one tunnel through the base network to a second processor, which may also be separate from the network operations center, when the first and second processors each provide to the network operations center a consent for enabling the tunnel.

56 Claims, 61 Drawing Sheets

| | |
|---|---|
| <local computer information> | |
| computer_name | ="org5" |
| domain_name | ="bugwheat2" |
| virtualip_address | ="10.0.11.130" |
| visibleip_address | ="208.185.39.2" |
| firewall_in_place | ="no" |
| network_config | ="Inline" |
| dns_from_dhcp | ="no" |
| dns_primary | ="10.10.10.2" |
| dns_secondary | ="10.10.10.3" |
| ProxyIp | ="208.185.40.2" |
| </local computer information> | |
| <local interface information> | |
| name | ="eth0" |
| mac_layer_address | ="00:90:27:EE:02:3B" |
| local_IP_address | ="208.185.39.2" |
| gateway | ="208.185.39.1" |
| subnet_mask | ="255.255.255.0" |
| dhcp | ="none" |
| </local interface information> | |
| <local_LAN_Information><address_range> | |
| startip_address_range | ="208.185.49.1" |
| endip_address_range | ="208.185.49.255" |
| type | ="included" |
| gateway | ="" |
| </address_range> </local_LAN_Information> | |
| <cryptographic key> | |
| kind | ="PublicKey" |
| type | ="NOC's_Primary_Key" |
| format | ="RSA" |
| encryption | ="3DES" |
| modulus | ="0x ... 01" |
| modulus_bits | ="1024" |
| public_exp | ="0x03" |
| </cryptographic key> | |
| <firewall rule> | |
| protocol="tcp" | |
| direction="in" | |
| src_ip_mask="$any" | |
| src_port="1024:65535" | |
| dst_ip_mask="$1" | |
| dst_port="21" | |
| action="ACCEPT" | |
| rule_number="1" | |
| </firewall rule> | |

Sections: 1210 (local computer information), 1212 (local interface information), 1214 (local_LAN_Information), 1216 (cryptographic key), 1218 (firewall rule)

```
<monitoring_information>
    name="org-name"
    vip="virtual IP of org"
    ctime="system up time in seconds"
    <tunnel>
        vip="vip of buddy"
        age="age,uptime"
        <bandwidth>
            data="tod,interval,tx_bytes,tx_packets"
        </bandwidth>
        <latency>
            data="tod,interval,min,max,avg"
        </latency>
        ...
    </tunnel>
    <interface>
        name="eth0" | "tcpt0" | "ipsec0"
        <bandwidth>
            data="tod,interval,tx_bytes,tx_pkts,tx_errs,tx_dropped,
                  rx_bytes,rx_pkts,rx_errs,rx_dropped"
        </bandwidth>
        ...
```

4105 — <monitoring_information>
4110 — name="org-name"
4115 — vip="virtual IP of org"
4120 — ctime="system up time in seconds"
4125 — <tunnel>, vip="vip of buddy"
4130 — age="age,uptime"
4135 — <bandwidth> data="tod,interval,tx_bytes,tx_packets" </bandwidth>
4140 — <latency> data="tod,interval,min,max,avg" </latency>
4145 — </tunnel>, <interface> name="eth0" | "tcpt0" | "ipsec0"
4150 — <bandwidth> data="tod,interval,tx_bytes,tx_pkts,tx_errs,tx_dropped, rx_bytes,rx_pkts,rx_errs,rx_dropped" </bandwidth>

FIG. 41

METHODS AND SYSTEM FOR PROVIDING NETWORK SERVICES USING AT LEAST ONE PROCESSOR INTERFACING A BASE NETWORK

CROSS REFERENCE TO RELATED APPLICATIONS

This application claims the benefit of U.S. Provisional Patent Application No. 60/196,297, entitled "NETWORK ARCHITECTURE, SYSTEMS, AND METHODS," filed on Apr. 12, 2000, the disclosure of which is expressly incorporated herein by reference in its entirety, and is a continuation in part of U.S. patent application Ser. No. 09/814,178, entitled "METHOD AND SYSTEM FOR MANAGING AND CONFIGURING VIRTUAL PRIVATE NETWORKS," filed Mar. 22, 2001, which is also expressly incorporated herein by reference in its entirety. The present application also relates to U.S. patent application Ser. No. 09/832,339, entitled "METHODS AND SYSTEMS FOR PARTNERS IN VIRTUAL NETWORKS," filed Apr. 11, 2001, U.S. patent application Ser. No. 09/832,363, entitled "METHODS AND SYSTEMS FOR HAIRPINS IN VIRTUAL NETWORKS," filed Apr. 11, 2001, U.S. patent application Ser. No. 09/832,362, entitled "METHODS AND SYSTEMS FOR USING NAMES IN VIRTUAL NETWORKS," filed Apr. 11, 2001, U.S. patent application Ser. No. 09/832,341, entitled "METHODS AND SYSTEMS FOR MANAGING VIRTUAL ADDRESSES FOR VIRTUAL NETWORKS," filed Apr. 11, 2001, U.S. patent application Ser. No. 09/832,346, entitled "METHODS AND SYSTEMS FOR ENABLING COMMUNICATION BETWEEN A PROCESSOR AND A NETWORK OPERATIONS CENTER," filed Apr. 11, 2001, U.S. patent application Ser. No. 09/832,353, now U.S. Pat. No. 6,631,416, entitled "METHODS AND SYSTEMS FOR AN EXTRANET," filed Apr. 11, 2001, all of which are expressly incorporated herein by reference in their entirety and concurrently filed herewith the present application.

DESCRIPTION OF THE INVENTION

1. Field of the Invention

The present invention relates to systems and methods for controlling networks, and in particular, to systems and methods for implementing virtual private networks.

2. Background of the Invention

Wide area networks allow users to access company files and computer programs, regardless of where users are geographically located. Until recently, building wide area networks remained the province of only the largest corporations or companies with enough technical skill and financial resources. Organizations have used a range of approaches to building wide area networks to connect remote offices, partners, or employees. These "traditional" approaches to connectivity include, for example, point-to-point leased lines, packet switched networks, and dedicated virtual private networks (VPNs).

Point-to-point leased lines are physical networks requiring the engineering of separate links between sites that need to communicate with each other. Point-to-point leased lines can take from 30 to 90 days to install and are costly.

A packet switched network using frame relay is a traditional alternative to point-to-point leased lines that offers reduced costs and increased flexibility. Like the point-to-point solutions, the initial installation of a frame relay network takes a long time. For example, additional access circuits may usually take two to three weeks for installation and the service is fairly costly.

A more-recently introduced service offered by some network service providers is a dedicated virtual private network. This routed service eliminates the complexity and costs associated with the engineering of connections between dedicated locations, but requires the network service provider to manage security as the network is shared with other customers. A virtual private network is "virtual" because it uses a shared or a base network, such as the Internet as its backbone as opposed to a completely private network with dedicated lines. It is also "private" since the information that is exchanged between the users may be encrypted or encoded to provide privacy. Prior to the present invention, virtual private networks, dedicated point-to-point lines, and packet switched networks shared drawbacks of being cumbersome and costly.

Although traditional virtual private networks offer low access costs, they often entail high set-up, maintenance, and management costs. Based on a number of factors, a shared network such as the Internet has evolved as the preferred backbone for connecting and internetworking multiple locations, partners, and employees. Also, the Internet offers the advantages of being ubiquitous, (available almost everywhere—small towns, large cities, around the world), offering an enormous capacity, and increasing cost-effectiveness, with fast, new access methods, such as DSL and cable modems.

With the advent and ubiquity of the Internet, virtual private networks have emerged as a way to build a private communication network over a shared public or private infrastructure or a base network. Virtual private networks provide secure private connections over the Internet by enabling authentication of users and locations, delivering secure and private "tunnels" between users or locations, and encrypting user communications.

Today, most virtual private networks are Internet Protocol (IP) based and are established over the Internet. They fall into two categories, namely hardware-based and software-based virtual private networks. Hardware-based virtual private networks require proprietary hardware platforms and claim to provide high price/performance ratios and potentially increased security through specialized functions. Network manufacturers are building some virtual private network capabilities into routers and other networking equipment.

Software-based virtual private networks have emerged as another alternative to hardware-based virtual private networks. Vendors are already adding virtual private network functionality, such as tunneling and encryption to their firewall solutions.

Although use of a base network, such as the Internet as a backbone for wide area networks may be less expensive and more flexible than traditional solutions, the associated costs and complexity of using virtual private networks has been prohibitive. As a result, most companies have been reluctant to link remote locations over the Internet using virtual private networks.

Building wide area virtual private networks over the Internet has been difficult because most robust solutions have required esoteric networking and security technologies. Merely deciding what type of virtual private network and what levels of security or encryption are required can be confusing to many information technology (IT) personnel and non-IT personnel. Beyond the complex purchase decisions, the installation and ongoing maintenance of such systems can be time-consuming, especially if the number of remote locations changes frequently. In addition, many companies have found that rolling out traditional virtual private network products requires significant logistical planning to make sure that the right hardware and software is available at all the remote locations. Initial configuration of these remote sites is often time consuming enough, without factoring in the effort required to get a remote site back on line if a location fails (especially if no skilled IT resources are available at the remote site).

Many organizations have been reluctant to establish Internet-based wide area virtual private networks also because of the increasing number of Internet security threats, such as hackers and corporate espionage. Further, virtual private networks and Internet-based connectivity solutions continue to remain prohibitively expensive. Even prepackaged virtual private network solutions require expensive networking personnel to configure, install, and manage such networks. For example, enterprise level firewall and virtual private network solutions may take up to a week to configure. In addition, the installation often requires support at the remote locations, dictating either extensive travel requirements for home office personnel or the hiring and training of remote IT support staff.

Many software-based virtual private network solutions also require the purchase of specialized and costly hardware. Moreover, although virtual private networks can save considerable amounts of money over frame relay or leased line networks, associated IT support costs often erase the savings. For example, setting up a virtual private network may necessitate hiring full-time IT professional to set up and administer the network.

As explained above, the installation and maintenance of a secure virtual private network over the Internet have been too complex, requiring financial investment in hardware, software, personnel, and/or time. To provide encryption and authentication on a virtual private network, each user must perform a variety of tasks including, for example, using an encryption algorithm that is compatible with the virtual private network; using an authentication technique that is compatible with the virtual private network; coordinating various security protocols with other users (e.g., coordinating a public key exchange) of the virtual private network; coordinating the establishment of tunnels with other users of the virtual private network; selecting and manually configuring the encryption path through the communication path; and/or recovering the virtual private network after a failure. Accordingly, the burdens of installing and administering virtual private networks are significant.

SUMMARY OF A FEW ASPECTS THE INVENTION

To address the above and other limitations of the prior art, methods and systems are provided that easily and effectively leverage the power of a shared or a base network, such as the Internet for private connectivity without the complexity, cost, or time associated with setting up traditional virtual private networks. Rather than requiring specialized hardware, such methods and systems are capable of being self-configured on nonproprietary hardware, such as a standard personal computer (PC), to quickly establish one or more virtual private networks over a local or wide geographical area. Configuration may be achieved by pointing-and-clicking, making it feasible for users to build secure virtual private networks.

Methods and systems consistent with one aspect of the present invention may enable one or more networks between a first processor and a second processor using at least one additional processor separate from the first and second processors. The additional processor may receive information indicating consent on behalf of the first processor to enabling a tunnel between the first processor and the second processor and information indicating consent on behalf of the second processor to enabling a tunnel between the second processor and the first processor. The additional processor may determine a first virtual address for the first processor and a second virtual address for the second processor such that the first and second virtual addresses uniquely identify the first and second processors, respectively, and are routable through the network. The additional processor may provide to each of the first and second processors the first and second virtual addresses to enable one or more tunnels between the first and the second processors, thus enabling one or more networks between the first and second processors.

Furthermore, methods and systems consistent with another aspect of the present invention may provide program code that configures a processor, such as the first processor into a gateway capable of being enabled by the additional processor for establishing one or more tunnels to another processor, such as the second processor through a communication channel.

Moreover, methods and systems consistent with another aspect of the invention may enable communication between a first processor and a second processor using at least one additional processor separate from the first and second processors, wherein one or more firewalls selectively restrict the communication between the first and second processors. The at least one additional processor may receive a first request from the first processor for a hairpin and receive a second request from the second processor for the hairpin. The at least one processor may also authorize a first port at the hairpin and a second port at the hairpin, when each of the first and second processors consents to enabling the hairpin. Moreover, the first port for the first processor and the second port for the second processor may be allocated. Furthermore, the hairpin may forward one or more packets received at the first port from the first processor to the second port such that the communication between the first and second processors is allowed by one or more firewalls.

Furthermore, methods and systems consistent with yet another aspect of the present invention may enable a virtual network between a first processor and a second processor using at least one additional processor separate from the first processor and the second processor. In one embodiment, the at least one additional processor may determine a first virtual address and a first base address for the first processor such that the first virtual address is routable through the virtual network and the first base address is routable through a base network and determine a second virtual address and a second base address for the second processor such that the second virtual address is routable through the virtual network and the second base address is routable through the base network. The at least one additional processor may provide the first virtual address and the first base address to the first processor and the second virtual address and the second base address to the second processor. Moreover, the virtual network may be enabled over the base network based on the first virtual address, the first base address, the second virtual address, and the second base address.

Further, methods and systems consistent with yet another aspect of the present invention may enable one or more networks between a first processor and a second processor using at least one additional processor separate from the first and second processors, the first processor and the second processor each identifiable by a name and each independently administered through the additional processor. The additional processor may receive information indicating consent on behalf of the first processor to enabling a tunnel between the first processor and the second processor and information indicating consent on behalf of the second processor to enabling a tunnel between the second processor and the first processor. The additional processor may determine a first virtual address for the first processor and a second virtual address for the second processor such that the first and second virtual addresses uniquely identify the first and second processors, respectively, and are routable through the network. The additional processor may provide to each of the first and second processors the first and second virtual addresses to enable one or more tunnels between the first and the second processors, thus enabling one or more networks between the first and second processors.

In addition, methods and systems consistent with yet another aspect of the present invention may enable one or more networks between a first processor and a second processor using at least one additional processor separate from the first and second processors, the first processor interfacing a first network using a first address space and the second processor interfacing a second network using a second address space. The additional processor may receive information indicating consent on behalf of the first processor for enabling a tunnel between the first processor and the second processor and information indicating consent on behalf of the second processor for enabling a tunnel between the second processor and the first processor. The additional processor may determine a first virtual address for the first processor and a second virtual address for the second processor such that the first and second virtual addresses uniquely identify the first and second processors, respectively, and are routable through the base network. The additional processor may provide to each of the first and second processors the first and second virtual addresses to enable one or more tunnels between the first and the second processors, thus enabling one or more networks between the first and second processors. The first processor identifying a conflict between the first address space and the second address space and the first processor and the second processor resolving the conflict between the first address space and the second address space.

Moreover, methods and systems consistent with still another aspect of the present invention may enable one or more networks between a first processor and a second processor, each identifiable by a name, using at least one additional processor separate from the first and second processors. The additional processor may receive on behalf of the first processor information that includes a name of the second processor and receive on behalf of the second processor information that includes the name of the first processor. The additional processor may determine a first virtual address for the first processor based on the information received on behalf of the second processor and a second virtual address for the second processor based on the information received on behalf of the first processor such that the first and second virtual addresses uniquely identify the first and second processors, respectively, and are routable through the network. The additional processor may provide to each of the first and second processors the first and second virtual addresses to enable one or more tunnels between the first and the second processors, thus enabling one or more networks between the first and second processors.

Methods and systems consistent with yet another aspect of the present invention may enable one or more networks between a first processor and a second processor, each identifiable by a name, using at least one additional processor separate from the first and second processors. The additional processor may provide a set of names that includes the name of the second processor and receive information indicating on behalf of the first processor a first selection including one or more of the names in the set of names that includes the name of the second processor. Further, the additional processor may provide a set of names that includes the name of the first processor and receives information indicating on behalf of the second processor a second selection including one or more of the names in the set of names that includes the name of the first processor. The additional processor may determine a first virtual address for the first processor and a second virtual address for the second processor such that the first and second virtual addresses uniquely identify the first and second processors, respectively, and are routable through the network. The additional processor may provide to each of the first and second processors the first and second virtual addresses to enable one or more tunnels between the first and the second processors, thus enabling one or more networks between the first and second processors when the additional processor determines that the first selection includes the name of the second processor and the second selection includes the name of the first processor.

Methods and systems consistent with still yet another aspect the present invention may enable a virtual network between a first processor and a second processor using at least one additional processor separate from the first and second processors. The additional processor may determine a first virtual address that identifies the first processor in the virtual network and provide the first virtual address to the first processor. When a tunnel between the first processor and the second processor is requested from the additional processor, the additional processor may authenticate the request based on the first virtual address and determine a second virtual address that identifies the second processor in the virtual network. After the additional processor authenticates the request and determines that the first and second processors have indicated a mutual consent for enabling one or more tunnels between the first and second processors, the additional processor may provide the second virtual address to the first processor to enable the requested tunnel between the first and second processors.

Moreover, methods and systems consistent with another aspect of the present invention may provide network services using at least one processor that interfaces a base network. The at least one processor may receive information identifying a user authorized to administer a first processor, which may be separate from the at least one processor, and a base address that is routable in the base network. The at least one processor may provide through the base network code and information for configuring the first processor to interface the base network at the received base address. The first processor may execute the provided code to configure the first processor based on the provided information such that the first processor interfaces the base network. The at least one processor may provide through the base network to the first processor information enabling at least one tunnel through the base network to a second processor, which may be separate from the at least one processor, when the first and second processors each provide to the at least one processor a consent for enabling the at least one tunnel.

Furthermore, in yet another aspect of the present invention if the user desires assistance in administering and/or establishing one or more virtual networks over the base network, the at least one processor may provide remote assistance to the user. The at least one processor may also monitor each virtual network and alert the user in a customized fashion when events occur in the virtual network. The at least one processor may also monitor quality-of-service (QoS) statistics within the virtual networks, such as the availability, bandwidth, throughput, and latency for each tunnel established through the base network. The at least one processor may further monitor quality-of-service statistics for a network service provider, such as the availability, bandwidth, throughput, and latency for the first and second processors.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 12 illustrates an example table that may be supplied to a gateway regarding one of its partners, in accordance with methods and systems consistent with the invention;

FIG. 31 is an exemplary graphical user interface of a network operations center for providing configuration, billing, and gateway maintenance information, in accordance with methods and systems consistent with the present invention;

FIG. 41 is an exemplary record provided to a network operations center on tunnel performance statistics, in accordance with methods and systems consistent with the present invention;

DETAILED DESCRIPTION

Figure 1:
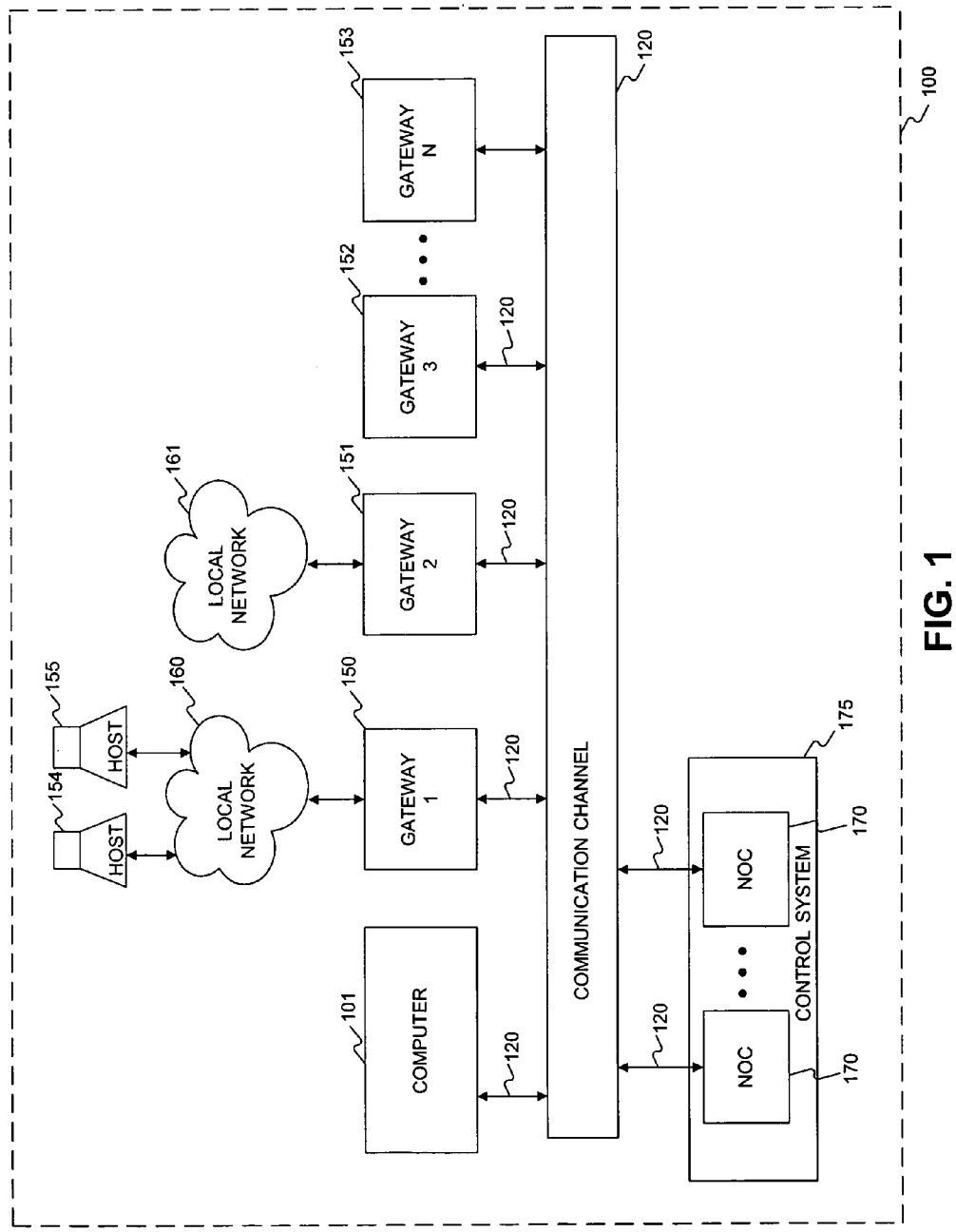
FIG. 1 is a general block diagram of a first exemplary network in accordance with methods and systems consistent with the present invention.

Reference will now be made in detail to the exemplary embodiments of the invention, examples of which are illustrated in the accompanying drawings. Wherever possible, the same reference numbers will be used throughout the drawings to refer to the same or like parts.

In accordance with an embodiment of the present invention, a prospective user or customer may contact a mediation point or a control system, such as a network operations center via a base network, such as the Internet, and indicate a desire to establish one or more virtual private networks. After answering a series of questions posed by the network operations center, the user receives program code and information for loading onto one or more processors, such as personal computers. The program code and information may be in the form of a disk, such as an optical disk or floppy disk, downloaded over the Internet and onto a disk, or installed directly over the Internet on to a computer. The program code may be distributed to other computers at other desired sites user sites as well. Alternatively, the program code and information may be preinstalled on a computer and delivered to the user.

The user then runs or boots a computer with the provided code and information. When the computer is booted, it thereafter communicates with the network operations center over the Internet to receive further information such that the computer is configured as a gateway or a computer capable of participating in one or more virtual private networks enabled by the network operations center over a base network, such as the Internet. The provided code and information may also be loaded on other computers such that the computer is configured as a gateway.

After configuration is completed and based on the user's request, the network operations center may enable over the Internet one or more virtual private networks between the gateway and other gateways configured through the network operations center. At the consent of the user, the virtual private networks may be periodically reconfigured to add additional gateways at, for example, geographically dispersed sites or to provide full or limited access to the networks via other gateways.

Consequently, the user may configure one or more gateways using a computer, such as a personal computer, without investing in costly proprietary hardware or setting up a typically costly network administration department. Because the gateway as configured is not dependent on a particular piece of hardware, flexible virtual private networks may be inexpensively established between remote locations.

Accordingly, the user may choose and change its Internet service providers (ISPs), network equipment, and access types (T1, cable modem, DSL, etc.) and then access the network operations center through the Internet to update configuration information that may have resulted from such a change. Furthermore, to participate in a virtual private network, a user need not require other users to use specific network gear or sign-up with specific ISPs. Instead, the user may direct other users to the network operations center to receive program code and information to configure one or more gateways capable of participating in one or more virtual private networks.

The user may quickly bring up new gateways in minutes rather than weeks or months. As explained above, the user may install the program code, log onto a network operations center with any web browser, and connect to London, New York and Boston in minutes. Unlike traditional virtual private network services requiring 30 to 90 days for installation of a new Internet connection, the gateways may be configured to be compatible with the user's existing Internet connections. The user may even start with a dial-up or ISDN connection and later replace it with a faster DSL, cable, or T1 connection without affecting service. Additionally, unlike traditional network equipment requiring expensive overnight shipping, the gateway program code may be downloaded almost anywhere in the world or may be distributed on a storage device, such as an optical disk or a floppy disk.

In another embodiment, two or more users may register with a controller or network operations center using a web browser. The network operations center may prompt them to provide basic identifying information, such as the Internet Protocol (IP) addresses of their computers. The network operations center may then generate a program code and configuration information and provide them to each user. After the users install the program code and configuration information on their respective computers, the respective computers establish communication with the network operations center to obtain additional configuration information for configuring themselves as gateways. After configuration is completed, one or more of the computers communicates its consent to the network operations center for establishing a tunnel to the other computer. Each computer may communicate its consent mutually and/or independently of the other computer.

If both gateways consent, the network operations center then proceeds to enable a tunnel between the user computers. The network operations center may enable the tunnel by providing sufficient information to each computer over the Internet such that the computer may establish the tunnel with the provided information. Once the tunnel is enabled, the computers may establish the tunnel and then use the tunnel to exchange information in a secure and trusted manner. At any time, each computer may withdraw its consent and terminate the tunnel. Furthermore, other computers configured through the network operations center may also join the virtual private network.

Consequently, the tasks of installing a gateway, establishing a virtual private network, and joining a virtual private network are simplified from the perspective of the users, even when establishing a temporary virtual private network for a short term project or a short term financial transaction (e.g., a purchase or sale).

As such, the described methods and systems may be for various applications, such as, for example, enabling the establishment of virtual private networks without costly hardware and software outlays; providing virtual private networks to businesses that sell products to customers over the Internet; providing virtual private networks to users of a corporate Intranet that seek to share information with outside users in a secure manner; and providing virtual private networks to users of the Internet in general. In such applications, the users may communicate with the virtual private networks by registering over the Internet with a control system, such as a network operations center; installing a program code; and indicating a consent to participate in a virtual private network. As a result, managing virtual private networks is simplified since users are not required to, for example, coordinate selection of encryption algorithms and/or authentication techniques; monitor and/or control tunnels of virtual private networks; and/or recover virtual private networks from failures.

From a business perspective, the user may be charged a periodic fee based on the number of gateways configured by the user through the network operations center. Alternatively, charges might also be assessed based on one or more of the following: the volume of information transported on the virtual private networks, the number of tunnels, or the usage time.

Before embarking on an element-by-element description of various preferred embodiments, the following terms are described. A gateway refers to any processor through which access is provided to a network. For example, a gateway may provide hosts or computers in a local area network or in a wide area network access to another network. A processor may include, for example, a personal computer, router, bridge, server, or any other network device. An encrypted information flow includes a flow of information that is encrypted. An example of an encrypted information flow is a tunnel, such as an encrypted tunnel. A tunnel may be established, for example, when two gateways open a channel of communication through a base network, such as the Internet. A tunnel may be enabled, for example, when a gateway is provided with authorization and/or sufficient information that may be used by the gateway to establish a tunnel with another gateway.

FIG. 1 shows a general block diagram of a network 100, in accordance with an embodiment of the present invention. The network 100 may include a control system 175 with one or more network operations centers 170, a communication channel 120, one or more gateways 150–153, one or more local networks 160, 161, one or more hosts 154, 155, and a computer 101. The communication channel 120 may include a shared or base network, such as the Internet to facilitate communication and exchanges between the various entities depicted in the network 100 of FIG. 1.

In accordance with an embodiment of the present invention, a first gateway, such as gateway 150 may establish through communication channel 120 a first encrypted information flow to the control system 175. This first encrypted information flow may permit the control system 175 to exchange control information through the communication channel 120 with the first gateway 150. Further, a second gateway, such as gateway 151 may establish through communication channel 120 a second encrypted information flow to the control system 175. This second encrypted information flow may also permit the control system 175 to exchange with the second gateway 151 control information through the communication channel 120. Since both of these information flows may be encrypted, the encrypted information flow may provide privacy.

The control system 175 may also enable a third encrypted information flow through the communication channel 120 between the first gateway 150 and the second gateway 151. The control system 175 may enable the third encrypted information flow after the first gateway 150 and the second gateway 151 consent to enabling the third encrypted information flow.

The consent communicated to the control system 175 may be mutual in that the first gateway 150 and the second gateway 151 each consents to enabling of the third tunnel. Moreover, the consent may be independent in that the first gateway 150 and the second gateway 151 independently consent to the establishment of the third tunnel without regard to whether the other gateway consents. A gateway may communicate its consent by identifying the names and/or addresses of the other gateways. For example, in an embodiment, a gateway may identify its consent to enabling a tunnel with another gateway by simply providing the name of the other gateway to the control system 175. If the control system 175 determines that the consent is mutual (i.e., that the other gateway also consents to enabling the tunnel), the control system 175 places the other gateway on a list (hereinbelow referred to as a partner list) that will be provided to the gateway. Likewise, the control system places the gateway on the partner list for the other gateway. That is, the control system 175 places each gateway on the partner list of the other gateway and provides the respective partner lists to each gateway. Accordingly, the partner list reflects the mutual desire of each gateway to enable a tunnel.

For example, referring to FIG. 1, a user using host computer 155 may use a web browser to access the control system 175 through the tunnel between gateway 150 and the control system 175. The control system 175 may then provide the user with the names of other gateways that gateway 150 may establish a tunnel with (e.g., the names for gateways 151–153). The user then may select one or more names corresponding to the other gateways that gateway 150 consents to enabling a tunnel with. The user may then submit the names of the selected gateways to the control system 175, which determines if there is mutual consent for each of the selected gateways. That is, the control system 175 determines for each of the selected gateways whether or not the selected gateway also consents to enabling a tunnel with gateway 150. If there is mutual consent, each of the selected gateways that also consents is added to the partner list for gateway 150, and gateway 150 is also added to the partner list for each of the selected gateways. These partner lists may then be forwarded by the control system 175 to gateway 150 and each of the selected gateways.

Accordingly, when the control system 175 determines that the first gateway 150 and the second gateway mutually consent to the third tunnel, the control system may then provide to the first and second gateways through the first and second tunnels, respectively, sufficient information to enable the third tunnel. The third tunnel may be enabled, for example, when the first and second gateways are provided sufficient information allowing them to establish this third tunnel through the communication channel 120. In one embodiment, the sufficient information includes the partner list for the first gateway and the partner list for the second gateway. Moreover, for each gateway listed on the partner list, the partner list may include, for example, a virtual IP address, a real IP address, and/or other information describing each gateway. After the third tunnel is enabled, the first and second gateways 150, 151 may establish the third tunnel through the communication channel 120. This third tunnel may provide privacy as to the exchanged information and may also be authenticated using an Internet Protocol Security (IPSec) compliant authentication technique, such as MD-5 hashing. Also, the encryption used for the encrypted information flow may be a weak encryption or encoding algorithm that provides minimal privacy or may be a strong encryption scheme that essentially guarantees privacy.

An encrypted information flow, such as a tunnel may be established through communication channel 120 by, for example, encapsulating a protocol within another protocol. For example, a tunnel may be encrypted when an Internet Protocol packet encapsulates an encryption protocol. Examples of encryption protocols may include RSA, Digital Encryption Standard (DES), and Triple DES (3DES). For example, an encrypted tunnel may be established using Internet Protocol (IP) packets such that the payload of each packet is encrypted but the address of each packet is unencrypted (i.e., clear-text). As a result, the encrypted payload may be encapsulated by a clear text IP address, forming a virtual tunnel through a base network, such as the communication channel 120. Other encrypted tunnels may be established through the communication channel 120 with other gateways, such as gateways 152 and 153. These virtual tunnels established through the base network and enabled by the control system 175 may also form a virtual network. If a virtual network enabled by the control system 175 uses some type of encoding or encryption for privacy, the virtual network may also be referred to as a virtual private network.

In the embodiment of FIG. 1, the computer 101 may include, for example, a personal computer and/or a workstation that include a web browser, such as the Netscape Navigator developed by Netscape or the Internet Explorer developed by Microsoft. The computer 101 may connect to the control system 175 through the communication channel 120 using the web browser. Once the computer 101 connects to the control system 175, a user may register one or more gateways with the control system 175 and define an initial configuration for one or more of the gateways 150–153 desiring to participate in one or more virtual private networks.

After the initial configuration of the gateways 150–153 is defined, the control system 175 may create a disk image that includes program code and information for configuring the gateways 151–153. The disk image may include, for example, a copy of the program code required to configure a personal computer as a gateway. Alternatively, the control system 175 may install through the communication channel 120 a bootable program on the gateways 151–153. After executing the bootable program on a computer, the bootable program may retrieve additional program code and configuration information from the control system 175 or other secured site to configure the computer as a gateway. Moreover, the program code may be loaded onto the gateways 150–153 using a single disk (not shown) and/or downloaded through the communication channel 120. Once the program code is installed, the gateways 150–153 may be capable of being enabled by the control system 175 and participating in one or more virtual networks or virtual private networks through the communication channel 120.

The disk image may include program code for one or more of the following: program code for IPSec; program code for communications between network operations center 170 and gateways 151–153; the Linux Operating System (OS) including kernel and device drivers; the configuration of the IP stack such as a Dynamic Host Configuration Protocol (DHCP) client and a DHCP Server; program code for routing packets through one or more tunnels established between gateways 151–153; access control information for limiting the functions performed through one or more tunnels established between gateways 151–153; program code for the SOCKS Proxy code; program code for a web browser; and any other software that may be installed based on the user's configuration. In addition, the LINUX operating system may be a "hardened" version of Linux to improve the security of the operating system. When each of the gateways 150–153 loads the disk image, each gateway may execute the program code contained in the disk image. As each of the gateways 151–153 performs the steps contained in the program code, each may connect to the control system 175 and establish an encrypted information flow to the control system 175.

The control system 175 may also enable an encrypted information flow between at least two gateways, permitting them to exchange information or traffic in a private manner. Further, the control system 175 may control and/or monitor the encrypted information flows in the network 100 by exchanging control and/or monitoring information with the gateways over the encrypted information flow.

Referring to FIG. 1, the control system 175 may include one or more network operation centers 170. Each of the network operation centers 170 may be located at the same location or may be distributed along the communication channel 120 connecting the distributed network operation centers 170. If the network operations centers 170 are distributed, they may also use one or more gateways configured as described above to provide privacy and/or authentication. The control system 175 and the network operation centers 170 may be implemented with at least one processor including, for example, one or more of the following components: a central processing unit, a co-processor, a memory, a storage device, an input device, an output device, a network interface, a display, and/or other processing devices and systems.

The gateways 150–153 may each include, for example, one or more of the following processors: a computer, a server, a router, a switch, a portable device such as a cell phone or a personal digital assistant, or any other communication device capable of performing the functions of the gateway in accordance with the present invention. A gateway may participate as a stand-alone node or computer interfacing the communication channel 120 (see, e.g., the gateways 152 and 153) and/or as a gateway interfacing a local network (see, e.g., the gateways 150 and 151). In a stand-alone configuration, for example, the gateway 153 may permit a user to participate in one or more virtual private networks established over communication channel 120. In a local network configuration, for example, the gateway 150 may interface the local network 100 to permit one or more users, such as hosts 154 and 155 to participate in one or more virtual private networks established over communication channel 120. Furthermore, in the local network configuration, the gateway may resolve address conflicts that may exist with the local area network 160 and other networks such as local area network 161.

Figure 2:
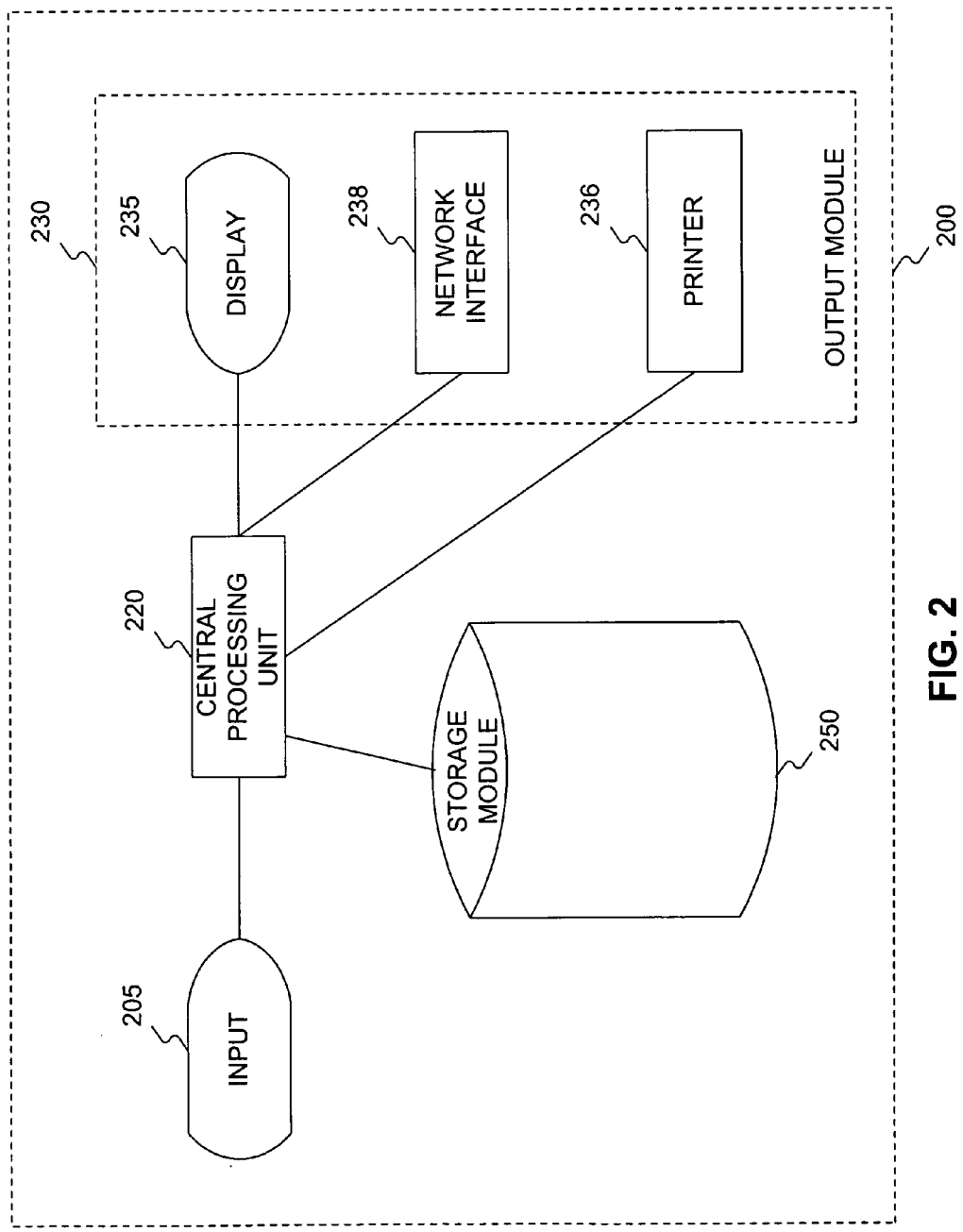
FIG. 2 is a general block diagram of an exemplary processor in which systems and methods consistent with the present invention may be implemented.

The host computers 154 and 155 may each include a processor, such as a computer 200 shown in FIG. 2. The computer 200 may include an input module 205, a central processing unit (CPU) 220, a storage module 250, and an output module 230. The output module 230 may include a display 235, a printer 236, and a network interface 238. One of ordinary skill in the art will recognize that each host computer 154 and 155 may also function as a gateway in accordance with the present invention. Although FIG. 2 shows a computer 200, other devices, such as printers, personal digital assistants, wireless devices, and mobile phones, may function as a host computer and participate in one or more virtual private networks established over communication channel 120.

The input module 205 of FIG. 2 may be implemented with a variety of devices to receive a user's input and/or provide the input to the CPU 220. Some of these devices (not shown) may include, for example, a network interface module, a modem, a keyboard, a mouse, and an input storage device.

Although FIG. 2 illustrates only a single CPU 220, computer 200 may alternatively include a set of CPU. The CPU 220 may also include, for example, one or more of the following: a co-processor, memory, registers, and other processing devices and systems as appropriate.

The storage module 250 may be embodied with a variety of components or subsystems including, for example, a hard drive, an optical drive, a general-purpose storage device, a removable storage device, and/or other devices capable of storing. Further, although storage module 250 is illustrated in FIG. 2 as being separate or independent from CPU 220, the storage module and CPU 220 may be implemented as part of a single platform or system.

Referring again to FIG. 1, the communication channel 120 may facilitate communication between the various entities depicted in the network 100. The communication channel may include, for example, a telephony-based network, a local area network (LAN), a wide area network (WAN), a dedicated Intranet, the Internet, and/or a wireless network. Further, any suitable combination of wired and/or wireless components and systems may be incorporated into the communication channel 120. Any suitable combination of point-to-point communications or network communications may also be incorporated into communication channel 120 to facilitate communication between the entities illustrated in FIG. 1. Moreover, although local networks 160, 161 are shown as being separate from the communication channel 120, the local network 160, 161 may be implemented in the same manner as the communication channel 120 or include one or more of the features of the communication channel 120.

In one embodiment, a user may serve as an administrator and may register at least one of the gateways 150–153 through control system 175 and/or establish one or more virtual private networks over communication channel 120. The user may use an Internet browser on computer 101 to contact the control system 175, to register at least one of the gateways 150–153, and/or establish one or more virtual private networks over communication channel 120. Moreover, although the computer 101 is shown as a stand-alone entity in the embodiment of FIG. 1, the computer 101 may alternatively be co-located with one or more of the gateways 150–153, the control system 170, and/or the communication channel 120.

Furthermore, the user may register with the control system 175 and provide basic information, such as the number of gateways participating in the virtual private network and billing information. Once registered, the user may receive code generated by the control system 175. The user may then reboot a computer with the received code to configure the computer as a gateway. That is, the administrator may install the code on any computer that the administrator desires to configure as a gateway including the computer serving as the computer 101. The configured gateway may then establish a tunnel to another gateway (i.e., similarly configured by the control system 175) after the control system 175 determines that each gateway mutually consents to enabling the tunnel and provides each gateway with sufficient information to enable the tunnel.

Figure 3:
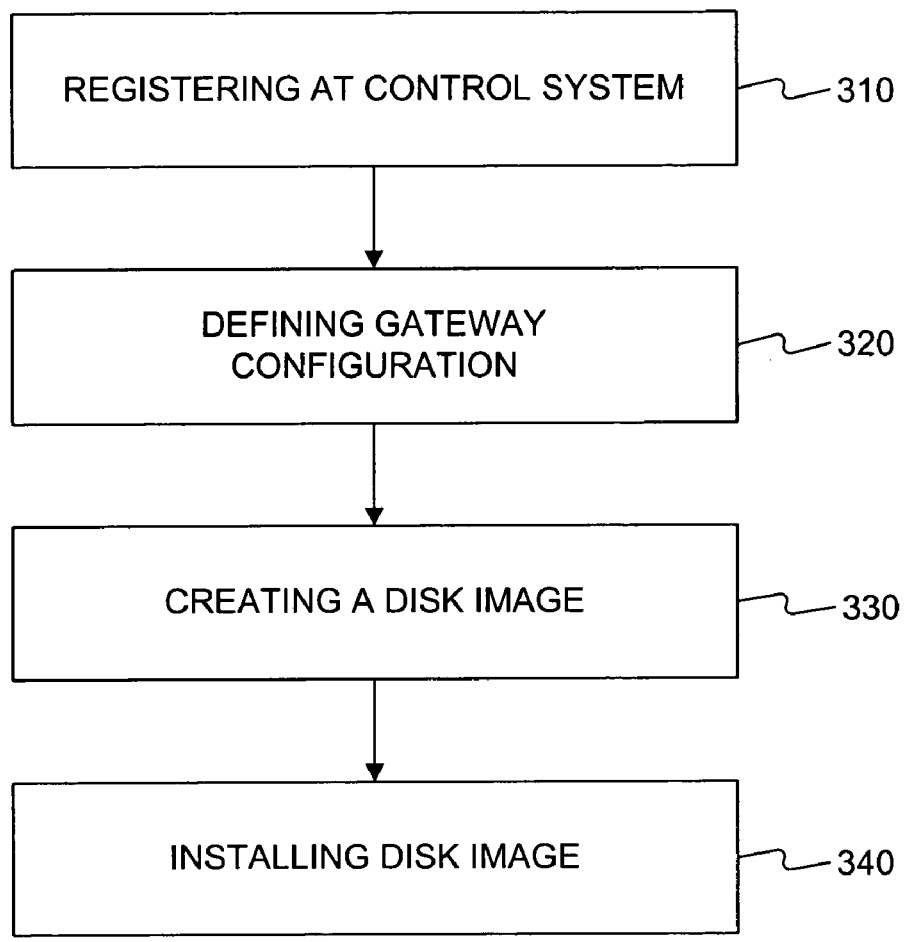
FIG. 3 is an exemplary flow chart for initially registering with a control system in accordance with methods and systems consistent with the present invention.

FIG. 3 shows an exemplary flowchart for initially registering one or more gateways with the control system 175. Referring to FIGS. 1 and 3, the user may register at least one of the gateways 150–153 with the control system 175 (step 310) and define a configuration for the registered gateways 150–153 (step 320). In one embodiment, the user may contact the control system 175 through the Internet using a web browser to specify a particular configuration for a gateway. This specified configuration information may include a name for the gateway and a name for the virtual private network. This name for the virtual private network will hereinafter be referred to as the virtual private network's domain name.

The control system 175 may use the specified configuration to assemble code and information, such as program code and textual information (e.g., Extensible Markup Language also referred to as "XML"), in the form of a disk image (step 330). This disk image may include all the program code and information needed to configure gateways 150–153 for establishing one or more virtual private networks established over communication channel 120. The disk image may then be provided to the user and installed on a processor, such as a personal computer or a general-purpose computer (step 340). When the processor reboots, it uses the information provided in the disk image to configure itself as a gateway capable of establishing secure tunnels to the control system 175. The disk image may be sized to fit on a single storage medium, such as a floppy disk or optical disk. Moreover, the disk may be distributed through alternative channels of distribution, such as direct mail, unsolicited mail, over-the-counter retail, or may be distributed with other hardware and software provided by a vendor.

Alternatively, the disk image may be downloaded from the control system onto a storage medium or may be stored at the control system 175 for later transfer to the gateways 150–153. Accordingly, a commercial-off-the-shelf computer may be configured as a gateway capable of participating in one or more virtual private networks established over communication channel 120.

The control system 175 may perform various functions including, for example, enabling tunnels between two or more gateways in network 100; assembling and/or configuring a user's computer as a gateway; negotiating an authentication technique; determining one or more partner lists for the gateways 150–153; administering the configuration of virtual private networks established over communication channel 120; providing virtual Internet Protocol (IP) addresses to each gateway; monitoring and/or controlling the established virtual private networks; enabling the establishment of tunnels between two or more gateways in the network 100; enabling the establishment of tunnels with gateways not accessible behind firewalls; and/or recovering the established virtual private networks after a failure. The control system 175 may exchange control information with each of the gateways 150–153 through a tunnel established through the communication channel 120. Moreover, each pair of the gateways 150–153 may exchange information through one or more tunnels established between the gateways.

Figure 4:
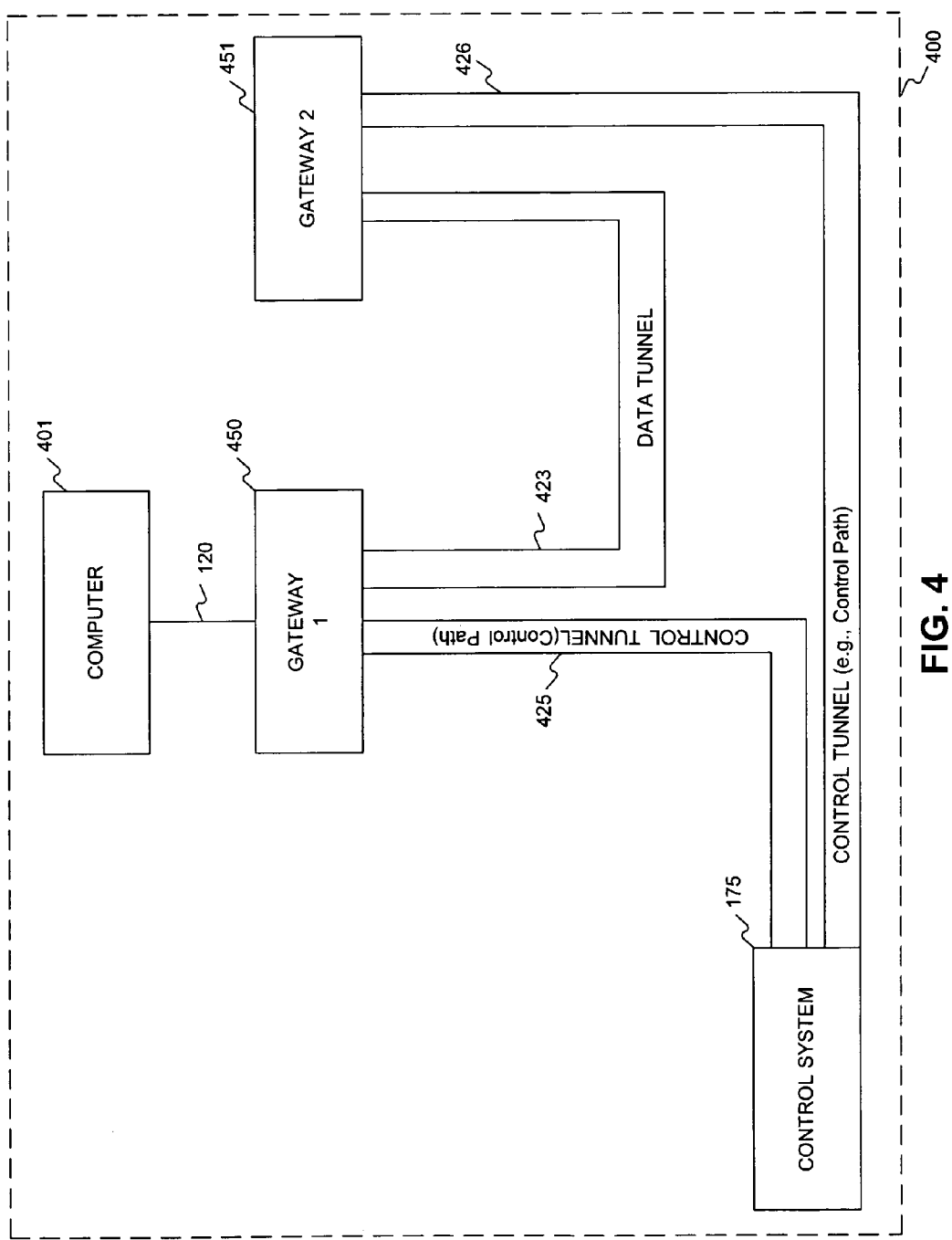
FIG. 4 is a general block diagram of a second exemplary network in accordance with methods and systems consistent with the present invention.

FIG. 4 shows an exemplary virtual private network 400 established over the communication channel 120. This exemplary network 400 will be used to illustrate how such a network is enabled. The network 400 includes a first gateway 450, a second gateway 451, a computer 401, a first tunnel 425, a second tunnel 426, a third tunnel 423, and the control system 175. The first tunnel 425, the second tunnel 426, and the third tunnel 423 may be established through the communication channel 120. Moreover, gateway 450 and gateway 451 may each participate as a stand-alone node in the virtual private network 400 or as a node interfacing a local network, such as local network 160 shown in FIG. 1.

The virtual private network 400 may be established after each of the gateways 450, 451 establishes a tunnel (e.g., the first tunnel 425 and the second tunnel 426) to the control system 175; after the first gateway 450 and the second gateway 451 each communicate to the control system 175 a consent to enable the third tunnel 423 between the first gateway 450 and the second gateway 451; after the control system 175 provides to the first gateway and the second gateway sufficient information to enable the third tunnel 423; and after the first gateway 450 and the second gateway 451 establish the third tunnel 423. With the third tunnel established, the first gateway 450 and the second gateway 451 may communicate in a private and/or trusted manner. Although FIG. 4 only shows two gateways, additional gateways (not shown) may also join the virtual private network 400. Accordingly, the task of configuring gateways that are capable of participating in a virtual private network is significantly simplified.

A user desiring to configure the virtual private network 400 may simply register one or more gateways and administer the network through the control system 175. The tasks performed by the user may thus be simplified to, for example, initially registering with the control system, rebooting one or more computers with software provided by the control system to configure the computers as gateways, and selecting one or more gateways from a list of desired partners. When two gateways consent to enabling a tunnel between the two gateways, the control system 175 may place each gateway on the partner list of the other gateway and provide the partner list to each gateway. Accordingly, the partner list may reflect the mutual desire of each gateway to enable a tunnel.

Moreover, the control system 175 may perform at least one or more of the following tasks, which are otherwise typically administered by the users enabling tunnels between gateways: coordinating one or more partner lists; administering the configuration of one or more virtual private networks established based on the enabled tunnels; monitoring the virtual private networks; controlling the virtual private networks; distributing to gateways information about changes in the configuration of the virtual private networks and/or other gateways; disseminating software for configuring gateways; providing an indication of a compromised private key; negotiating an encryption algorithm with gateways; negotiating an authentication technique with gateways; and recovering from a failure in the virtual private networks.

As previously discussed with reference to FIG. 3, after a user desiring virtual private network services registers for secure services, the control system may assemble a disk image and provide the disk image to the user for loading onto a computer and configuring the computer as a gateway. The gateway may then participate in a virtual private network established over a base network, such as the Internet.

Figure 5:
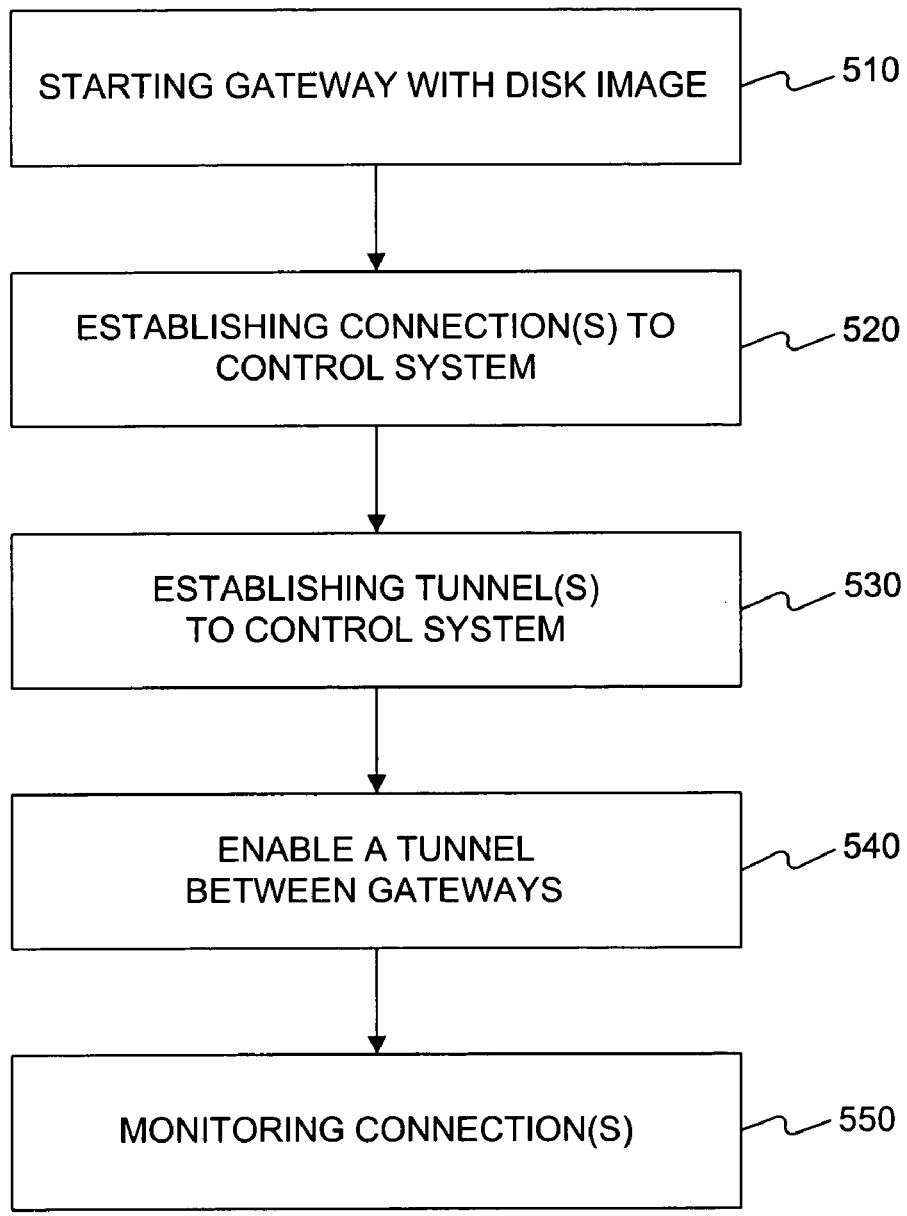
FIG. 5 is an exemplary flow chart for establishing a network in accordance with methods and systems consistent with the present invention.

FIG. 5 illustrates an exemplary flow chart of the steps for establishing a virtual private network between the gateways identified by the user. Each of these steps will be discussed in further detail following the broad description of FIG. 5.

Referring to FIGS. 4 and 5, the first gateway 450 may start with the disk image installed (step 510). The first gateway 450 may establish a connection to the control system 175 (step 520) and proceed to establish a first tunnel 425 to the control system 175 (step 530) through a communication channel, such as the communication channel 120 of FIG. 1. The second gateway 451 may also perform the steps 510–530 to establish a second tunnel 426 to the control system 175. Once the first and second tunnels are established, the control system 175 may exchange information with each gateway to further configure the gateways.

To enable a third tunnel 423 between the first gateway 450 and the second gateway 451 (step 540), the control system 175 may determine whether the first gateway 450 and the second gateway 451 have consented to enabling the third tunnel 423. This consent may be mutual and independent of the decision of the other gateways (not shown). For example, the control system 175 may determine the consent based on a list that includes desired partners for each of the gateways 450, 451. If the first gateway 450 and the second gateway 451 each consent to enabling of the third tunnel 423, the control system 175 may then enable the third tunnel 423 (step 540).

For example, to enable the third tunnel (step 540), the control system 175 may perform one or more of the following: update the partner lists of the first gateway 450 and the second gateway 451 to reflect mutual consent; provide an indication that a tunnel between the first and second gateways 450, 451 is authorized; provide real IP addresses for each of the gateways to permit a connection through a base network, such as the Internet; provide the virtual IP address of each gateway to the other gateway to enable a tunnel between the gateways; facilitate the establishment of one or more tunnels by providing out-of-band signaling to the first gateway 450 and the second gateway 451 through the first tunnel 425 and the second tunnel 426, respectively; determine one or more partner lists for one or more gateways 450, 451; provide configuration information for the network and/or for each gateway; exchange control information with the first gateway 450 and the second gateway 451 on the first tunnel 425 and the second tunnel 426, respectively; negotiate an encryption algorithm with each gateway; and negotiate an authentication technique. Moreover, the control system 175 may also monitor the status and performance of the tunnels established through the communication channel 120 (step 550).

Figure 6A:
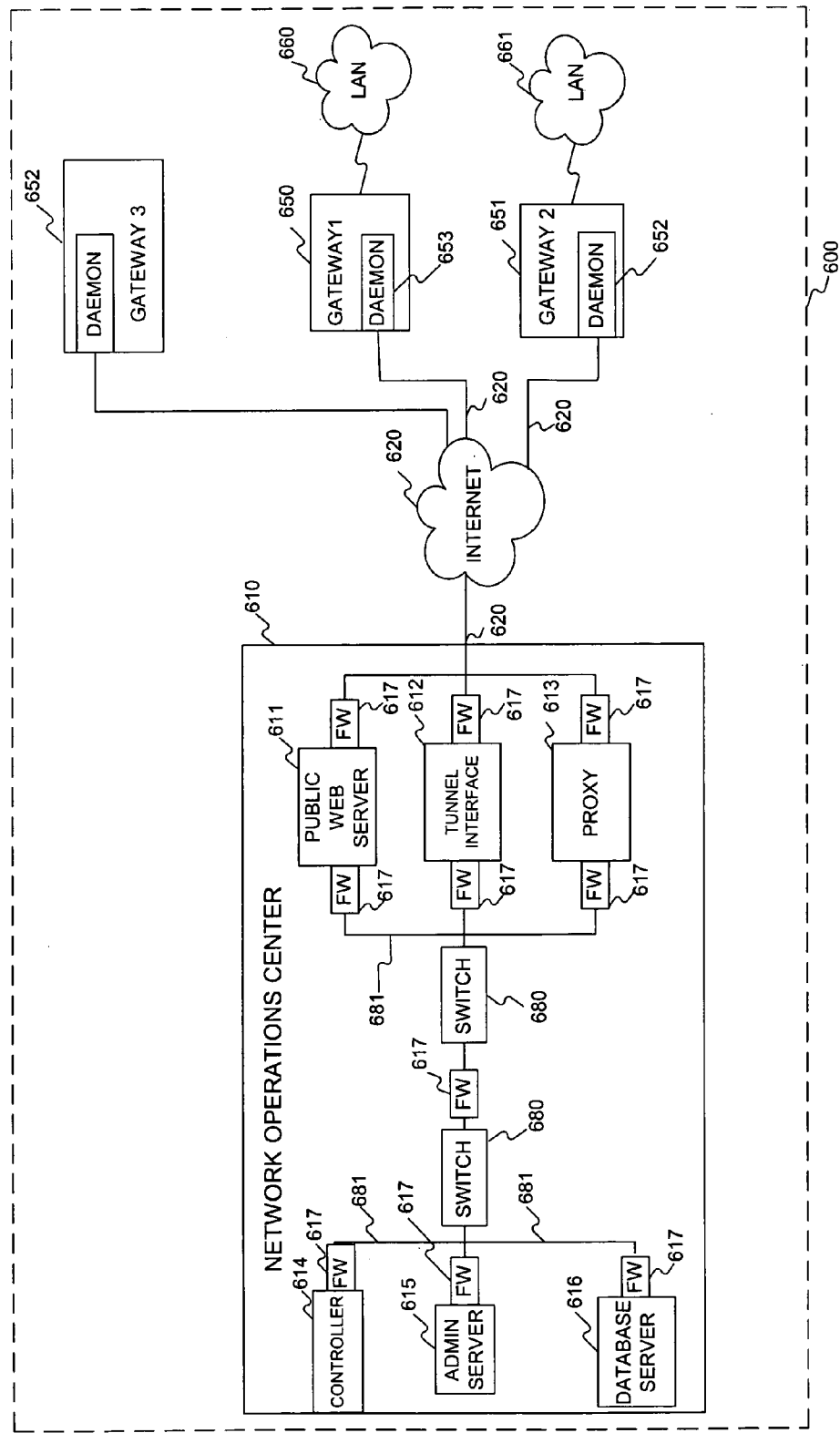
FIG. 6A is a general block diagram of a third exemplary network in accordance with methods and systems consistent with the present invention.

FIG. 6A shows a third exemplary network 600 in accordance with an embodiment of the present invention. The network 600 may include one or more local area networks (LANs) 660, 661, a first, second, and third gateways 650–652, the Internet 620 and/or Intranet access (not shown), and a network operations center 610.

The LANs 660, 661 may be similar to the LANs 160, 161 of FIG. 1. The Internet 620 and/or Intranet access may include features similar to the communication channel 120 of FIG. 1. Moreover, the gateways 650–652 may each include information and program code for implementing one or more virtual private networks over the Internet 620. Furthermore, the first and second gateways 650, 651 may interface the LAN 660, 661 and the network 600 whereas the third gateway 652 may be configured as a stand-alone node interfacing only the network 600.

In the embodiment of FIG. 6A, the network operations center 610 may determine a virtual address for each gateway desiring to participate in one or more virtual private networks established through a base network, such as the Internet 620. Consequently, each gateway may be provided two addresses—a real or public address and a virtual address. The virtual address, which may be in an IP format, may be used by the gateways to establish one or more tunnels with each other through a base network, such as the Internet 620 and may be routable only through the established tunnels. This virtualized addressing may provide virtual connectivity through the Internet 620 and may allow routing of virtual addresses from one address to another. Moreover, this virtualized addressing may facilitate network address translation, port address translation, IP masquerade, and/or IP connection sharing during the process of routing as well as during the dynamic assignment of addresses. Although a virtual address may be used by a gateway to establish one or more tunnels to form a virtual network and/or virtual private network, the network operations center 610 may alternatively provide to each gateway any other address that is capable of enabling any other networks established through or over a base network, such as the Internet 620.

Based on the virtual addresses determined by the network operations center 610 and provided to the gateways 650, 651, 652, one or more virtual private networks may be established over the Internet 620. For example, each gateway 650, 651, 652 may include a virtual device adapter (not shown), which may be capable of emulating the functions of a network interface card (NIC). Using the virtual device adapter, each gateway may route or forward information, such as packets through tunnels established with other gateways.

Figure 6B:
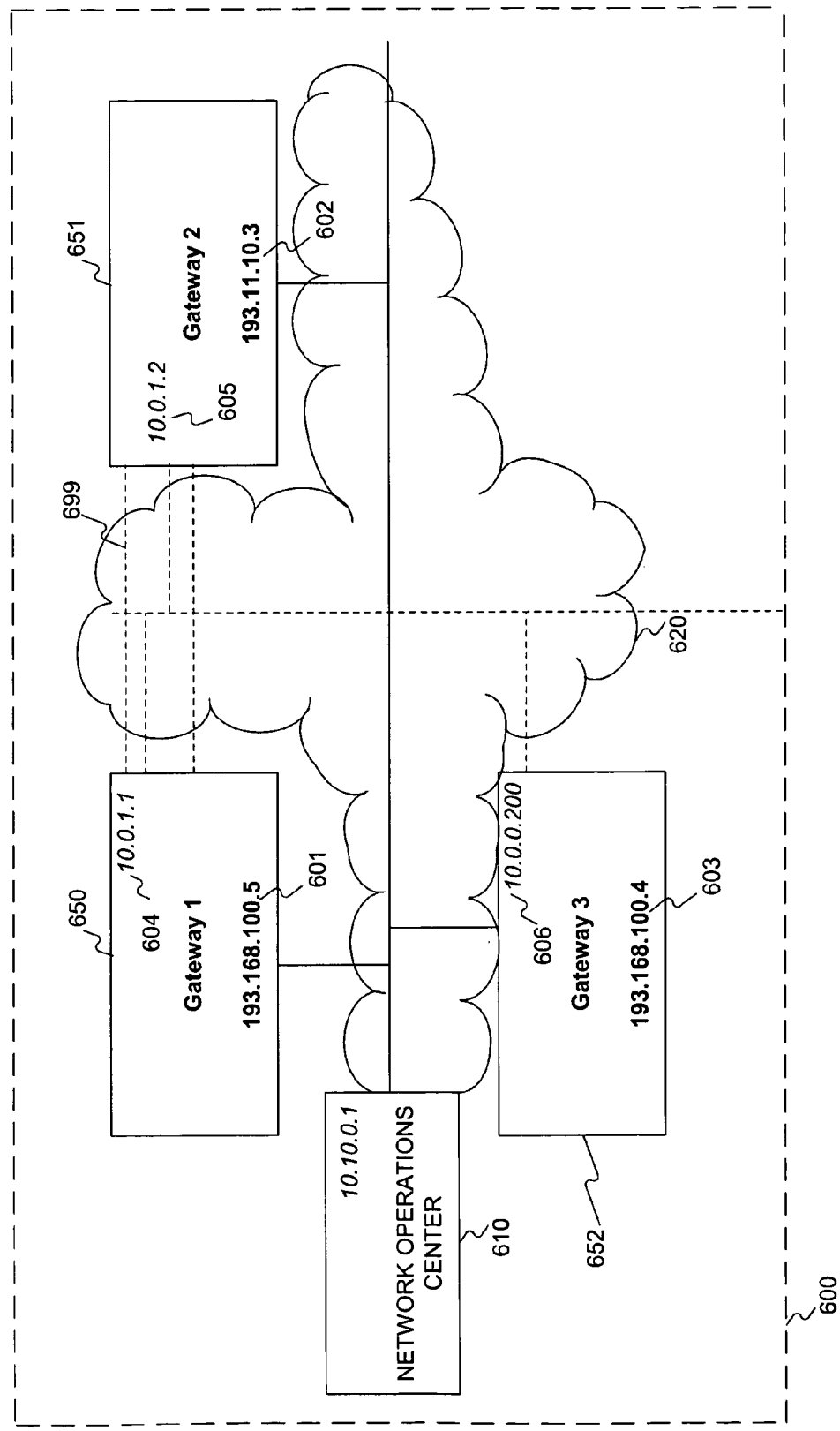
FIG. 6B shows virtual IP addresses for a network in accordance with methods and systems consistent with the present invention.

FIG. 6B shows the network 600 of FIG. 6A from the perspective of virtual addresses and real or public addresses that are used by gateways 650–652 to route information, such as packets through tunnels established through the Internet 620, in accordance with an embodiment of the present invention. The gateways 650–652 may be assigned real IP addresses 601, 602, 603 and virtual IP addresses 604, 605, 606, respectively. Each real IP address, which may be assigned by, for example, an Internet Service Provider (ISP), may be routable through a base network, such as the Internet 620. On other hand, each virtual address, which may be assigned and provided by the network operations center 610, may be only routable through the tunnels enabled by the network operations center 610 and established through the Internet 620.

The solid lines connecting the gateways 650–652 represent the real IP connectivity between the machines. The real IP addresses 601–603 used by gateways 650–652, respectively, may interface the Internet 620 or a local area network, such as LAN's 660 and 661. The dashed lines represent virtual connectivity provided by the virtual IP addresses 604–606. Each gateway may include at least one virtual device adapter with a corresponding virtual IP address. For example, a virtual device adapter (not shown) may be included at each end of a tunnel 699 established between the first gateway 650 and the second gateway 651. Each virtual device adapter may have the corresponding virtual IP address for its gateway. For example, the virtual device adapter for the first gateway 650 may have a virtual IP address of 10.0.1.1 (shown as 604), and the virtual device adapter for the second gateway 651 may have a virtual IP address of 10.0.1.2 (shown as 605).

In one embodiment, the network operations center 610 may provide to each gateway a virtual IP address during the initial configuration of the gateway. The network operations center 610 may then store the virtual IP address of the gateway with the gateway's name and the authentication information, such as a shared secret for that gateway. To enable a tunnel between two gateways that mutually consent to the tunnel, the network operations center 610 may provide each gateway the virtual IP address of the other gateway.

Packets addressed with a virtual IP address may be transported between the gateways through tunnels established through a base network, such as the Internet 620. For example, when a pair of gateways (e.g., 650 and 651) consents to enabling a tunnel (e.g., tunnel 699) between the gateways, the network operations center 610 may provide the virtual addresses for each gateway to the other gateway to enable the tunnel between the gateways.

Before the first gateway 650 sends a packet with an encrypted payload through a tunnel to the second gateway 651, the virtual device adapter may add the virtual addresses of the second gateway 651 and the first gateway 650 to the packet. For example, the virtual device adapter may add a source virtual address of 10.0.1.1 (shown as 604) and a destination virtual address of 10.0.1.2 (shown as 605) to a packet from the first gateway 650 to the second gateway 651. The first gateway 650 may then take the virtualized packet and encapsulate the virtualized packet within another TCP/IP packet with real source and destination addresses, such as a source address of 193.168.100.5 (shown as 601) for first gateway 650 and a destination address of 193.11.10.3 (shown as 602) for second gateway 651. The encapsulated packet may then be routed based on the real destination address of 193.11.10.3 through the Internet 620 until the packet reaches the real destination address.

When the encapsulated packet arrives at the destination address, the second gateway 651 may remove the real TCP/IP addresses, leaving a payload that includes an IP packet with the virtual source and destination addresses. The virtual device adapter within the second gateway 651 may recognize the virtual IP addresses, receive the packet with the virtual IP addresses (i.e., source and destination virtual addresses), and forward the packet to the second gateway 651 for additional processing, such as authenticating and/or decoding the encrypted payload of the packet.

In one embodiment, network operations center 610 may enable and administer one or more virtual private networks, such as tunnels established through the Internet 620. The network operations center 610 may include one or more processors that are distributed or co-located within substantially the same geographic area. For example, the network operations center 610 may be distributed along a communication channel (see, e.g., the communication channel 120 at FIG. 1), the Internet, and/or an Intranet.

The network operations center 610 may perform at least one or more of the following features: providing information and code for configuring processors, such as computers as gateways capable of participating in one or more virtual private networks established through the Internet 620; enabling the establishment of tunnels by providing an indication that a tunnel between two gateways is authorized; determining one or more partner lists for gateways; administering the configuration of the virtual private networks; detecting and resolving virtual and real IP address conflicts; monitoring the virtual private networks; controlling the virtual private networks; negotiating an encryption algorithm with each of the gateways; providing a virtual IP address to each gateway; negotiating an authentication technique with each of the gateways; distributing changes to the configuration of the virtual private network; disseminating software updates to the gateways; providing an indication of a security problem (e.g., a compromised private key); and recovering the virtual private networks from failures.

Accordingly, a user's role is simplified to registering with the network operations center 610, providing configuration information about one or more of the desired gateways, loading program code onto one or more computers to configure them as gateways, and selecting one or more desired partners for establishing one or more virtual private networks over a base network, such as the Internet 620.

Referring back to FIG. 6A, the network operations center 610 may include a public web server 611, a tunnel interface module 612, a proxy module 613, a controller module 614, an administrative server 615, a database server 616, one or more firewalls 617, one or more switches 680, and a communication channel 681.

The public web server 611 may not authenticate the identity of those connected to the public web server 611, and thus, may not provide any measure of trust. Moreover, the public web server 611 may not provide encryption or privacy. But the public web server 611 may provide a user with a means of accessing the network operations center 610 to perform limited functions, including registering to enable and establish a virtual private network through the Internet 620.

For example, a user may register through the public web server 611 in a nonsecure manner. During initial registration, the network operations center 610 and/or the public web server 611 may present to the user a series of questions and receive responses to the question based on which the network operations center 610 may generate program code and information for configuring a computer as a gateway capable of participating in one or more virtual private networks established over the Internet 620. For example, this program code and information may be provided in the form of a disk image, which may be downloaded and installed in one or more computers to configure them as gateways 650–652. Moreover, the public web server 611 may also include one or more of the following: marketing information, trouble ticket information, and other user information that may not require privacy and/or authentication. The public web server 611 may include a firewall 617 and other security devices to limit access to the switch 680 and the communication channel 681 in network operation center 610. In one embodiment, the Linux Ipchains utility may be used to manage the firewall 617.

The tunnel interface module 612 may include program code for establishing tunnels between the network operations center 610 and one or more of the gateways 650–652. The tunnel interface module 612 may also include a public addressable or routable IP address that permits establishing tunnels between the network operations center 610 and the gateways 650–652 through the Internet 620. Moreover, the tunnel interface module 612 may include a transmission control protocol (TCP) tunnel driver used to establish a TCP tunnel between the network operations center 610 and the gateways 650–652. For example, the tunnel interface module 612 may use the TCP tunnel driver to encapsulate packets for an IPSec tunnel within TCP packets. Although the TCP tunnel driver may encapsulate the IPSec tunnel, other encryption and/or tunnel software (e.g., a User Datagram Protocol (UDP) tunnel driver) may be used instead.

In one embodiment, the only processes that may be executed from the nonsecure side of the tunnel interface module 612 (i.e., the Internet side 620) may be those processes related to the TCP tunnel driver.

To enhance security, the tunnel interface module 612 may communicate with the other subsystems of the network operations center 610 in a limited manner. For example, the tunnel interface module 612 may provide a single control and monitoring port for exchanging messages with the controller module 614 and for exchanging secured sockets layer (SSL) messages with the administrative server 615. Further, the tunnel interface module 612 may use a firewall 617 and/or other security devices to limit access to the switch 680 and communication channel 681. The two-tier structure with the tunnel interface module 612 connected through security devices, such as firewalls to the controller module 614 may provide enhanced security at the network operations center 610.

The proxy module 613 may include one or more processors, which may serve as a proxy for enabling one or more tunnels between at least two of the gateways 650–652, when the gateways are each not accessible behind a firewall, hiding their respective real IP addresses. Alternatively, the proxy module 620 may be located within one of the gateways 650–652 or at a third party website hosting the proxy module 613.

The controller module 614 may include one or more processors, which may receive the control information provided by each of the gateways 650–652. The control information provided by each of the gateways 650–652 may also include monitoring information. The controller module 614 may also authenticate the identity of a gateway, determine that tunnels are authorized according to each gateway's list of desired partners, and add partners to each gateway's partner list.

The administrative server 615 gathers information and then may store gathered information in the database server 616 including, for example, a tunnel database that includes a list of tunnels that are active on the network 600; a predefined rule or trigger that indicates when a new tunnel request is made for a tunnel that already exists and is active in the tunnel database; a database with authentication information capable of authenticating the identity of each of the gateways 650–652 participating in the network 600. For example, the database server 616 may store for each gateway the authentication information in the form of a shared secret (e.g., a bit string and/or a public key) that authenticates the identity of a gateway seeking to establish a tunnel to the network operations center or another gateway. When the shared secret stored in the database server 616 matches the shared secret presented by the gateway to the network operations center 610, the gateway may be authenticated.

While encryption techniques may make communications private, authentication techniques may allow communicating parties to verify each other's identity and the authenticity of the exchanged information. Authentication serves to provide a level of trust so that users in a virtual private network may be confident about the authenticity of the exchanged information. Authentication may be established using a variety of security techniques including, for example, a signature, a digital signature, a digital certificate, a hash code, a password, and/or any other approach that may be used to establish identity of a user or computer.

The database server 616 may perform one or more of the following: storing customer information; storing the disk image described above; generating reports, such as alarm reports, activity reports, and/or other reports for administering virtual private networks established through the Internet 620; and storing monitoring information associated with the virtual private networks.

The firewalls 617 may include one or more processors which may selectively limit the type of information reaching communication channel 681 and switch 680. For example, the firewalls 617 may only permit entry of TCP commands to a specific port number. Moreover, the firewalls 617 may be implemented as a stand-alone device, software, firmware, and/or implemented as part of another processor, router, gateway, and/or any other device capable of performing the functions of a firewall.

The switches 680 switch information or traffic (e.g., datagrams, packets, or cells) between one or more of the subsystems 611–616 of the network operations center 610. The switches 680 may be implemented with one or more processors, a router, a switch, and/or any other communication device capable of switching and/or routing information to the appropriate subsystem within the network operations center 610.

The subsystems 611–616 of the network operations center 610 may be distributed along the communication channel 681 that connects the subsystems. The communication channel 681 may include one or more of the features and functions described above with respect to the communication channel 120 of FIG. 1.

Figure 7:
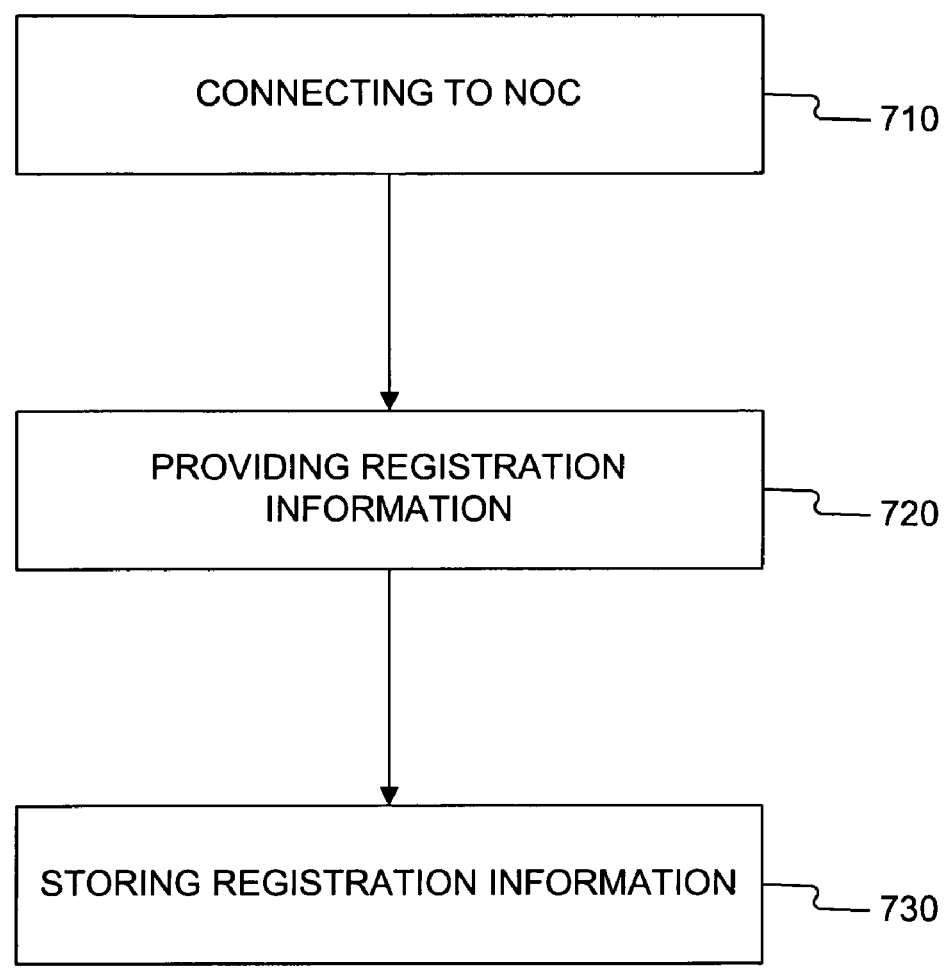
FIG. 7 is an exemplary flow chart for providing information to a Network Operations Center (NOC) in accordance with methods and systems consistent with the present invention.

FIG. 7 shows a flowchart of the steps performed for registering a gateway. A user, such as an administrator may register a gateway with the network operations center 610. A computer may connect through a gateway 650 to the Internet 620 and the public web server 611 of the network operations center 610 (step 710). Alternatively, a computer may connect directly to the Internet 620 and the public web server 611. The user of the computer, who may function as an administrator of the gateway 650, may provide registration information (step 720) to the public web server 611. The public web server 611 may then store the registration information (step 730) in, for example, the database server 616. The initial registration information may include preliminary configuration information, such as the number of gateways, billing information, and the administrator's name and (electronic mail) email address.

Since the initial connection between the user's computer and the network operations center 610 may be a nonsecure connection, it may be desirable to limit the initial registration information to a minimum (e.g., the registration information provided above in step 720) to enhance security. This initial registration information may include the minimum amount necessary to create program code and information needed to configure a processor such that the configured processor is capable of contacting the network operations center 610 over a secure connection (e.g., a tunnel) established over the Internet 620 to obtain additional configuration information. Accordingly, once the user is able to communicate with the network operations center 610 through the secure connection, the user may then provide additional registration information. This additional information may be needed to complete the process of configuring the processor as a gateway. Further, this additional information may include, for example, the number and names for the gateways.

Once the processor is configured as a gateway, the network operations center 610 may prevent the gateway from connecting to the public web server 611 when exchanging additional information with the network operations center 610. For example, after a configured gateway contacts the network operations center 610, the network operations center 610 may reroute any connections to the public web server 611 to the tunneling interface 612, where a secure tunnel is established for exchanging additional configuration information and code to complete the configuration of the gateway.

For example, during the user's first session with the public web server 611 of the network operations center 610, the user may connect to the network operations center using a browser configured with the Secure Sockets Layer protocol (SSL). During this initial contact with the public web server, the network operation center 610 may limit the user's range of permissible functions to basic functions until a secure tunnel is established. In one embodiment, the user may be denied the privilege to change firewall rules, administer partner lists, show tunnel status, show partner list information, delete administrators, and/or define groups of gateways. These denied functions may only be performed through a secure and/or authenticated tunnel to the network operation center 610.

Figure 8:
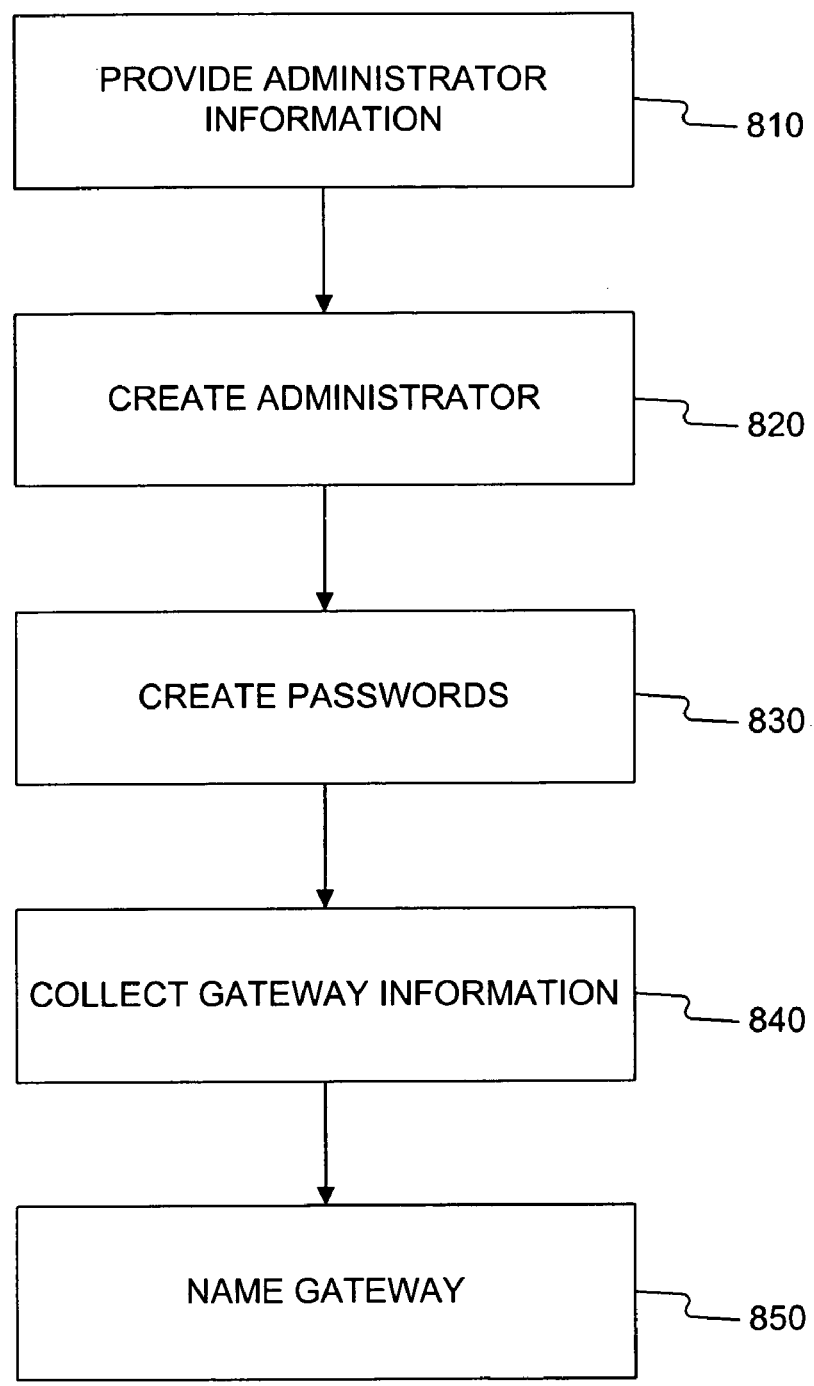
FIG. 8 is an exemplary flow chart for defining a gateway in accordance with methods and systems consistent with the present invention.

FIG. 8 is an exemplary flow chart depicting the steps for configuring a gateway. The user may provide administration information (step 810); create an administrator login (step 820); create a password for the administrator's login (step 830); provide information describing at least one of the gateways 650–652, LAN 660, 661, Internet 620, and/or other information necessary to configure a gateway capable of participating in one or more virtual private networks established over the Internet 620 (step 840); and provide a name for each of the gateways 650–652 (step 850). The administrator may be a user with the authority to establish one or more virtual private networks over the Internet 620. The steps of FIG. 8 may be performed in a secure manner when the user uses one or more of gateways 650–652 to connect to the network operations center 610 and to establish a tunnel with the network operations center 610.

To provide administrator information (step 810), the user may use gateway 652 to connect to the network operations center 610 through the Internet 620. The user may provide the public web server 611 of the network operations center 610 with sufficient information for registering an administrator including, for example, the administrator's name, log-in, password, email address, pager, and phone number. In the exemplary embodiment of FIG. 6A, the public web server 611 may collect and store this information in database server 616. After the user provides this information (step 810), the network operations center 610 may create an administrator login (step 820), providing the user with the capability to configure and administer one or more virtual private networks over the Internet 620.

To create passwords (step 830), the user may select a login name and password for administration of the virtual network, such as a virtual private network for the gateways 650–652. The user may create a login and password for more than one administrator of the virtual private network to permit other users to login, create, administer, and download a disk image for configuring the virtual private network including the gateways. Furthermore, another user name and password may be created for access to a customer support function at the network operations center 610.

In providing information about the gateways 650–652, LAN 661, 660, and/or other information for configuring and administering virtual private networks (step 840), the user may provide one or more of the following information: the IP address; subnet mask; domain name server address; and gateway IP address for each desired gateway. If a fixed IP address gateway is not used for each gateway 650–652, the administrator may indicate that a dynamic host control protocol (DHCP) is used. Moreover, the administrator may provide other information including, for example, the media access control (MAC) address for a gateway or a proxy server IP address. For example, the network operations center 610 may perform an auto-discovery process to determine certain information about the administrator's existing network configuration. For example, the network operator center 610 may determine the IP address of a gateway by reading the source and destination address on a packet and determine whether the gateway is accessible behind a firewall by sending test packets to the gateway to see if the packets are rejected by the firewall.

To name each of the gateways 650–652 (step 850), the user may select a unique name for each of the gateways 650–652. Moreover, the user may select a name, such as a domain name for each of the configured virtual private networks. Furthermore, the user may select to use a two level naming hierarchy for each of the gateways 650–652. For example, a two level naming hierarchy may include, for example, domain_name.gateway_name or customer_name.organization_name.

Based on the information provided by the user, the network operations center may create and/or assemble program code and information for configuring a processor, such as a computer as a gateway capable of participating in one or more virtual private networks established over the Internet 620. For example, the network operations center 610 and, in particular, administrative server 615 may generate a disk image that includes the program code and information. The user may select to download the disk image during the initial session(s) with the network operations center 610. Alternatively, the user may select to download the disk image at a later session. The user may also select to receive the disk image in the form of a diskette; may select to store the disk image at the network operations center 610; and may permit one or more gateways 650–652 to download the disk image after the user's initial session with the network operations center 610.

Figure 9A:
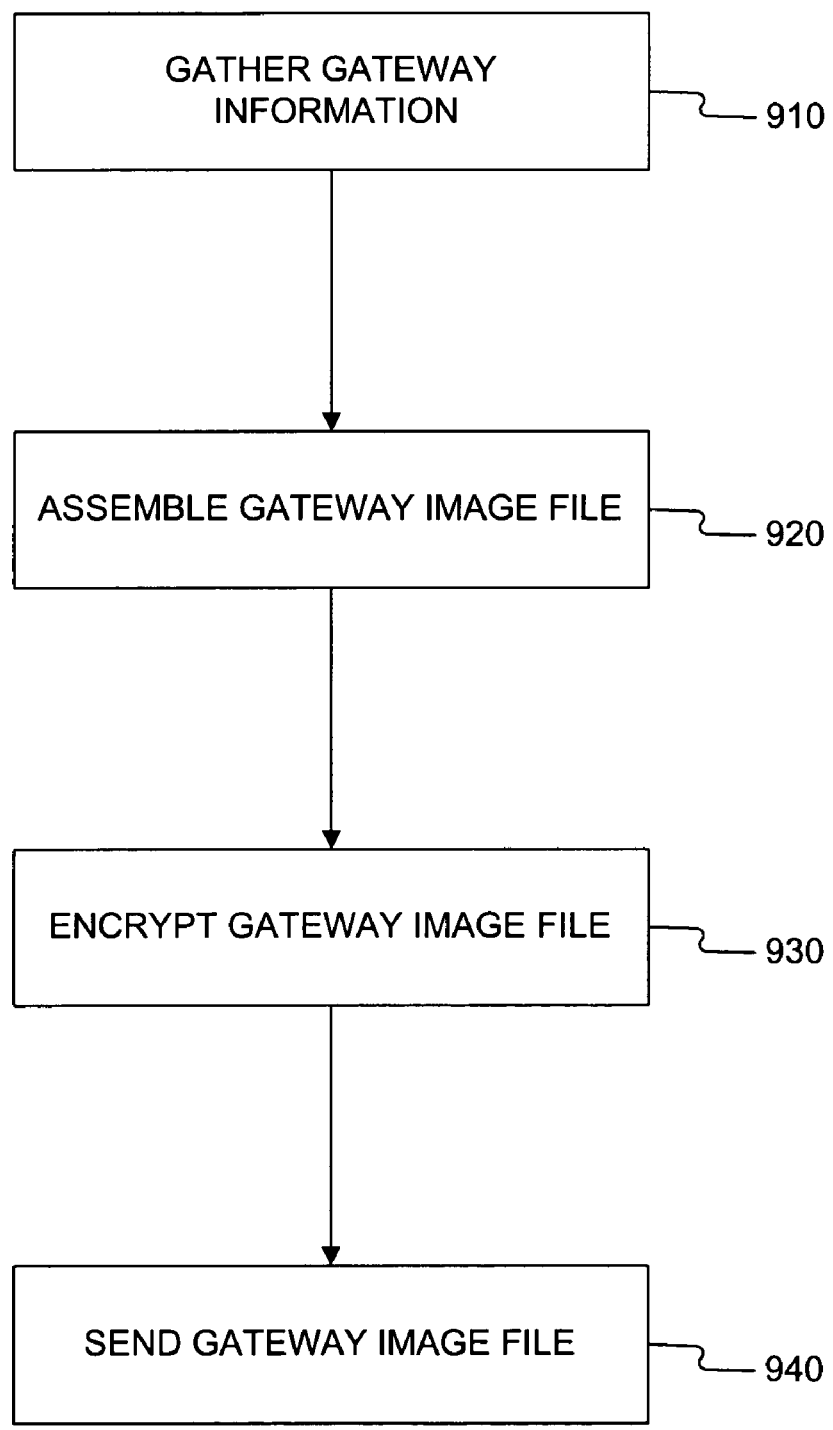
FIG. 9A is an exemplary flow chart for creating a program code for configuring a processor as a gateway in accordance with methods and systems consistent with the present invention.

FIG. 9A is an exemplary flow chart of the steps performed by network operations center 610 to create code and information (see, also, FIG. 3 at step 330) for configuring a gateway. The administrative server 615 in the network operations center 610 may gather the information previously provided by the user (step 910); create a disk image file (step 920); encrypt the disk image file (step 930); and send the disk image to the user (step 940).

To gather the information provided by the user (step 910), the administrative server may retrieve the information previously provided by the user (see, e.g., FIGS. 7 and 8) and store the information in the database server 616 of the network operations center 610. The administrative server 615 may then use this information to create a program code for configuring a computer as a gateway, for example, gateways 650–652. This program code may be formed into a disk image (step 920).

The network operations center 610 may encrypt the disk image (step 930) to provide privacy. To encrypt the disk image file, the network operations center 610 may use an encryption algorithm, such as DES. The network operations center 610 may send the disk image to one or more of the gateways 650–652 (step 940). The disk image may be sized to fit on a diskette. If the disk image is provided on a diskette, the user may load the diskette onto a computer (e.g., the first gateway 650) and reboot the computer. Alternatively, the disk image may be loaded onto a communication device, such as a router, switch, or a bridge, enabling them to participate in one or more virtual private networks established over the Internet. Similarly, the disk image may be loaded onto a wireless device, enabling the wireless device (e.g., a cell phone, personal digital assistant, etc.) to participate in one or more virtual private networks established over the Internet 620.

Figure 10A:
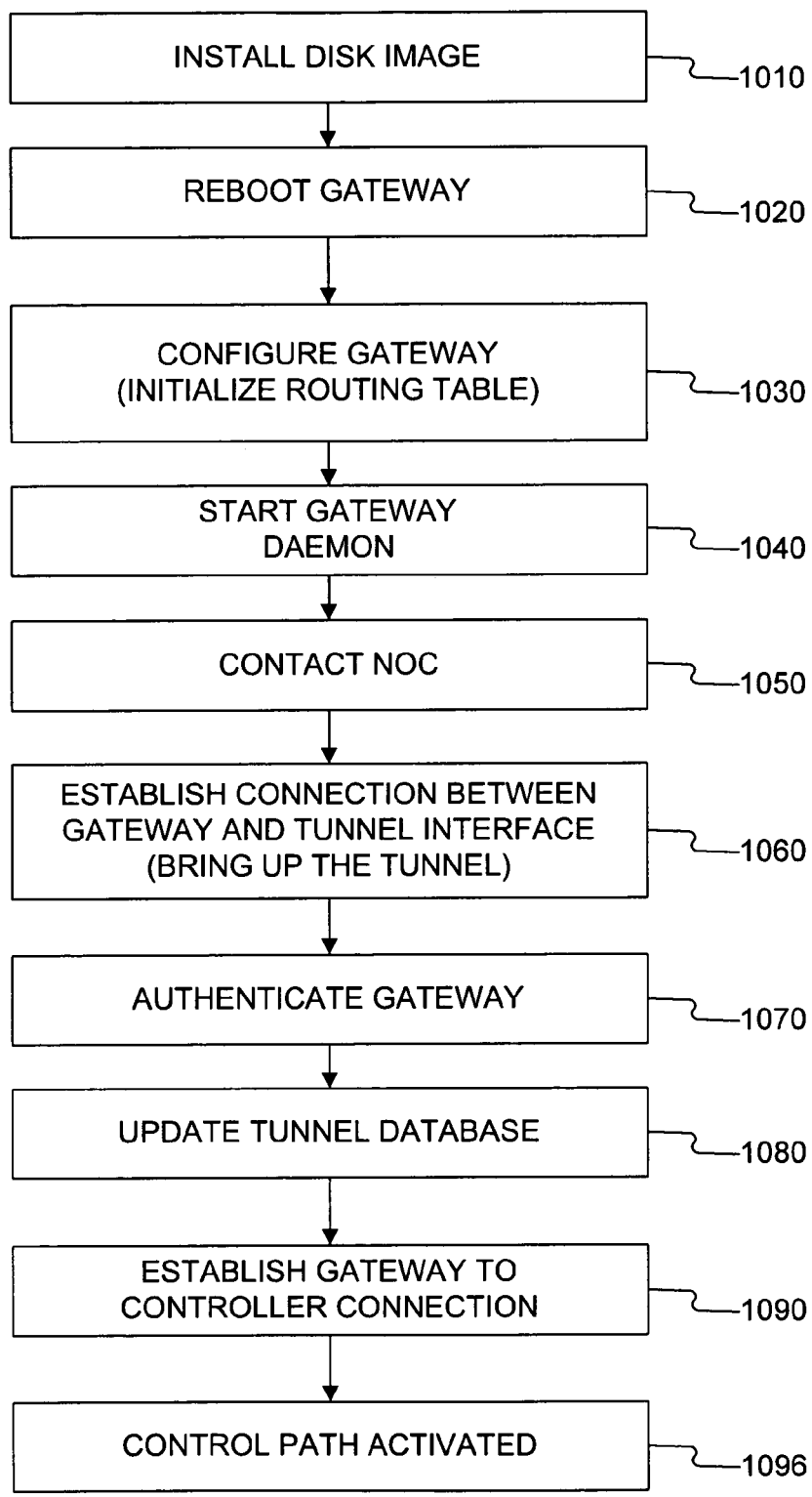
FIG. 10A is an exemplary flow chart for configuring a processor as a gateway in accordance with methods and systems consistent with the present invention.

FIG. 10A is an exemplary flow chart depicting the steps for establishing a tunnel to the network operations center and further configuring one or more gateways. A user installs the disk image (step 1010) into at least one gateway (e.g., the first gateway 650) and reboots the processor associated with the gateway (step 1020). When the processor reboots, the gateway executes the program code in the disk image and may execute any other program code required for operation of the gateway (e.g., operating system and drivers).

By executing the program code, a routing table in the gateway is initialized to a default state, permitting the gateway to find the Internet 620. The gateway may be configured with one or more of the following: IP addresses, subnet mask, partner list, domain name server address, and the Internet access device address. The network operations center may also determine a virtual IP address for the gateway. The gateway may then execute a daemon (step 1040) that may perform the following steps: contact the network operations center 610 and/or the tunnel interface module 612 (step 1050); open a TCP connection to the tunnel interface module 612; and initiate IPSec tunnels through the TCP tunnels to the tunnel interface module 612 (step 1060). The tunnel interface module 612 may authenticate the identity of the gateway (step 1070); update the tunnel database (step 1080); and establish a connection from the gateway to the controller module 614 (step 1090). The controller module 614 may then activate a control path (step 1096), which the network operations center 610 may use to exchange control information with the gateway.

As each gateway is configured, it may perform the steps of FIG. 10A to establish a tunnel with the network operations center 610 and exchange through the tunnel, control information, monitoring information, and additional configuration information, such as the latest partner list.

In step 1010, the user of the first gateway 650 may in stall the disk image, enabling the first gateway 650 to reboot and execute the program code resident on the disk image.

In step 1020, the user may reboot the first gateway 650 with the program code. One of ordinary skill in the art would recognize that the reboot may take various forms and may include a total reboot of the gateway or, alternatively, a warm reboot where the gateway loads the disk image without affecting the operation of the gateway. Moreover, one of ordinary skill in the art would also recognize that the disk image may also be loaded on a communication device (e.g., a router, a firewall, a wireless device, and etc.) and/or any other processor. Moreover, the rebooting step 1020 may also include running other software including, for example, an operating system, drivers, program code for IPSec tunnels, and/or software capable of providing the functions of a firewall. RFC-2401, R. Atkinson, The Internet Society (1998), titled "Security Architecture for IP," describes, inter alia, IP Sec and is incorporated herein by reference in its entirety.

In step 1030, the first gateway 650 may configure its IP addresses for the appropriate subnet mask, domain name server, Internet/intranet access device, and/or Dynamic Host Configuration Protocol (DHCP) server. Moreover, the first gateway 650 may initialize its internal routing table to a default state.

The first gateway 650 may start the gateway daemon (step 1040), which may execute some or all of the program code on the disk image. The gateway daemon may contact the network operations center 610 (including the tunnel interface module 612 step 1050) using a domain name server or an IP address to resolve the address of the network operations center 610.

After initial contact with the network operations center 610 is made, the gateway daemon may open a TCP connection to the tunnel interface module 612. With a TCP tunnel established, the network operations center 610 may provide the gateway daemon with an IP address, permitting the first gateway 650 to make an internal routing table entry. This routing table entry may permit the first gateway 650 to route, for example, traffic associated with controlling a gateway through the TCP tunnel to the network operations center 610 and tunnel interface module 612. The first gateway 650 may then communicate directly with the tunnel interface module 612 through the TCP tunnel.

In step 1070, the first gateway 650 and the gateway daemon running on the first gateway 650 may begin the process of authentication with the network operations center 610. For example, an Internet Key Exchange (IKE) may be initiated between the network operations center 610 and the first gateway 650. This is described in RFC-2409, D. Harkins et al., The Internet Society (1998), titled "Internet Key Exchange," which is incorporated herein by reference in its entirety. A key exchange, such as IKE may be implemented using the Free S/WAN program code available at the Free S/WAN website. Alternatively, a shared secret may be presented for authentication.

During authentication, the first gateway 650 presents a shared secret to the network operations center 610. The authentication may include presenting a shared secret to the network operations center. In one embodiment, a gateway presented a virtual IP address that included a shared secret. Alternatively, a public key exchange, such as the one provided by the IKE protocol may also be used to authenticate the first gateway 650 with the network operations center 610 and the tunnel interface module 612. Furthermore, the shared secret or public key may also be used when a gateway authenticates with another gateway during the establishment of a tunnel between the two gateways.

Moreover, during the authentication process, the tunnel interface module 612 may verify the authenticity of the first gateway 650 with information previously stored (e.g., the shared secret or public key stored during registration) at the database server 616. For example, the gateway name, virtual IP address of the gateway, and shared secret may be stored in the database server 616 during the initial registration of the first gateway 650. When the stored shared secret matches the shared secret presented by the first gateway 650, the identity or authenticity of the first gateway 650 is established. Alternatively, other authentication techniques and/or public key exchange techniques may be used. Moreover, the authentication system may be eliminated in an environment where authenticity and trust are not a concern. Authentication using MD5 is described in RFC-1828, P. Metzger et al., (1995) titled "IP Authentication using Keyed MD5," which is incorporated herein by reference in its entirety. Accordingly, once the first gateway 650 is authenticated with the network operations center 610, the first gateway 650 may exchange information with the network operations center 610 in a secure manner through an IPSec tunnel. With the first gateway 650 authenticated, the network operations center 610 may update the tunnel database (step 1080) stored at database server 616.

The first gateway 650 may open a connection, such as a TCP connection to the controller module 614 (step 1090) using the gateway daemon. The TCP connection to the controller module may go through the TCP tunnel to the controller module 614. For example, the controller module 614 may permit a connection, such as a control path on a predetermined TCP port. The predetermined TCP port may be the only port accessible through the tunnel interface module 612. As a result, the gateway daemon may initiate the TCP connection through the TCP tunnel to the tunnel interface module 612, the switch 680, and one or more of the firewalls 617 to access the control path at the predetermined TCP port (e.g., port 500) of the controller module 614. This TCP connection between the controller module 614 and the gateway daemon may serve as the control path for exchanging control information.

Before establishing the TCP connection between the first gateway 650 and controller module 614, the network operations center 610 may perform a tunnel database lookup to ensure that the TCP tunnel is a pending tunnel and not an active tunnel. If the TCP tunnel is an active tunnel, the network operations center 610 may provide an alarm. If the TCP tunnel is listed as pending in the tunnel database, the network operations center 610 may establish the control path between the controller module 614 and the tunnel interface module 612.

The network operations center 610 may also implement alarms when predetermined events occur that suggest a possible security concern or risk. The network operations center 610 may generate an alarm when one or more of the following conditions exist: an unauthorized computer attempts to authenticate posing as an established gateway; a tunnel flood attack; a failure to authenticate a gateway; a loss of the control path to a gateway; an internal failure within the network operations center 610 or gateway; an IP address of a gateway changes (i.e., if DHCP is not being used); a MAC address of a gateway's network interface card changes; a spoofing attempt; an attempt to authenticate a non-existent or denied gateway; excessive traffic associated with control or monitoring information; a failed attempt to logon (e.g., multiple tries); performance overruns; and authorization failures.

When the control path is activated by the controller module 614 of the network operations center 610 (step 1096), the tunnel interface module 612 may exchange control information with the first gateway 650. Moreover, the network operation center 610 may communicate one or more of the following information with the first gateway 650 through the control path: the virtual IP address of each gateway on the partner list, the partner list, the network settings, media access control (MAC) addresses, IP addresses (e.g., the DHCP server address, the domain name server address, an Internet access device), a check sum, a shared secret, program code for providing, configuring, and/or controlling a firewall, DHCP server code, and a "cookie." This communication may take place using XML files. An exemplary set of XML files is shown below in Tables 1–6.

In one embodiment, the network operations center periodically receives through the control path monitoring information from the first gateway 660, such as the number of active tunnels, up/down times for each tunnel, and ping time between tunnels (i.e., latency). The monitoring information may be exchanged using XML files.

When the control path is activated (step 1096), the first gateway 650 may notify each of the other gateways that are listed on its partner list. Although steps 1010–1096 are described above with reference to the first gateway 650, each of the one or more gateways 650–652 may also perform steps 1010–1096. For example, the first gateway 650 may notify the second gateway 651 that it seeks to establish a third tunnel. The first gateway 650 and the second gateway 651 may then proceed to establish the third tunnel, after the third tunnel is enabled by the network operations center 610. Alternatively, the network operations center may enable the third tunnel by authorizing the third tunnel before the first gateway 650 and the second gateway 651 establish the tunnel. Accordingly, the first gateway 650 and the second gateway 651 may exchange information in a private and trusted manner through the established third tunnel that is enabled by the network operations center 610. The details of establishing the third tunnel are provided below.

Figure 11A:
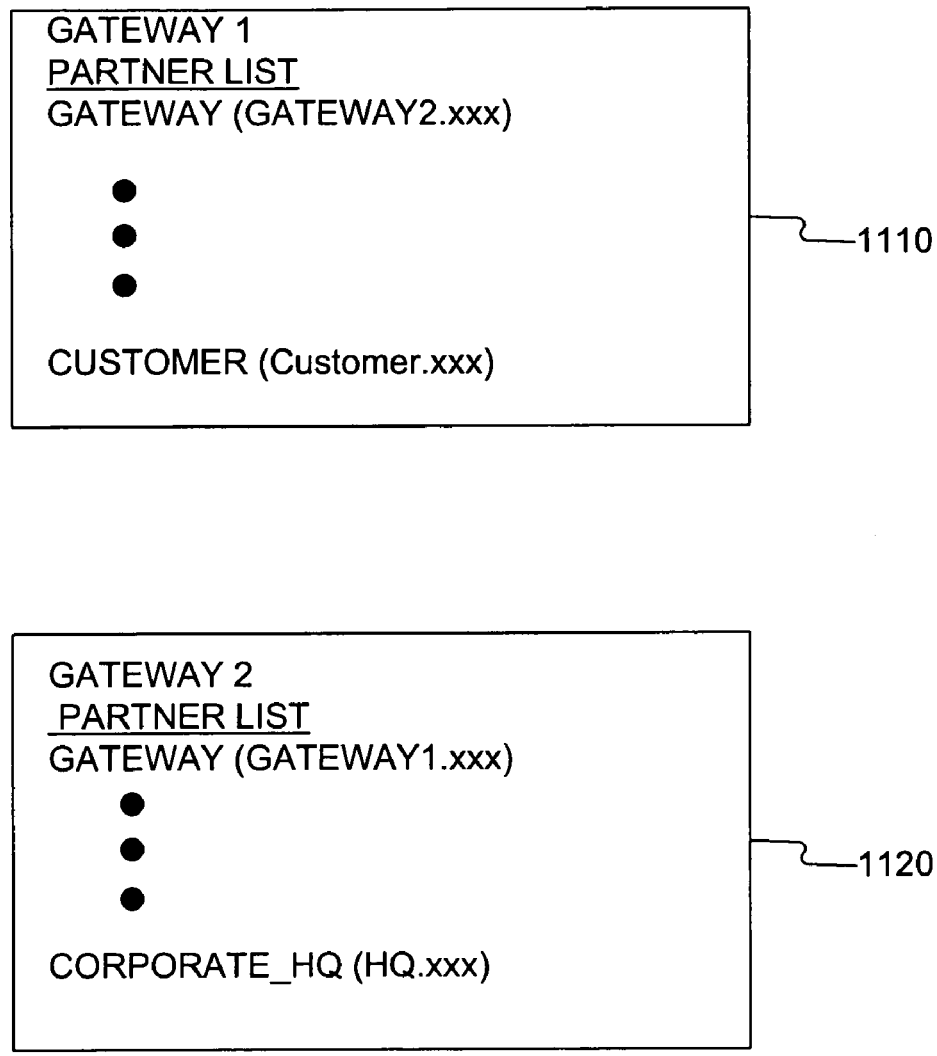
FIG. 11A illustrates exemplary partner lists in accordance with methods and systems consistent with the present invention.

FIG. 11A illustrates two exemplary partner lists 1110 and 1120, in accordance with an embodiment of the present invention. Each gateway 650–652 may consent to enabling one or more tunnels with another gateway by providing the network operations center 610 with a list of desired gateways from which it consents to enabling one or more tunnels. The network operations center 610 may determine whether two gateways consent to enabling a tunnel between the two gateways. If so, the network operations center 610 may place each gateway on a partner list of the other gateway. Accordingly, the partner list may reflect the mutual consent of the two gateways to enable one or more tunnels between the two gateways.

In the embodiment of FIG. 11A, the network operations center 610 may generate for the first gateway 650 a partner list that lists the second gateway 651 as a partner. Similarly, the network operations center 610 may generate for the second gateway 651 a partner list that also lists the first gateway 650. If this is the case, the first gateway 650 and the second gateway 651 may mutually consent to enabling one or more tunnels between the first gateway and the second gateway. As a result, the consent may be mutual in that each gateway consents to enabling one or more tunnels with other gateways. The consents may also be independent in that the first gateway 650 and the second gateway 651 may decide independently of each other.

The network operations center 610 may determine a partner list for each of the gateways enabled by the network operations center 610 and may store the partner list for each enabled gateway. For example, the network operations center 610 may store a partner list for each gateway in a database within the database server 616. This database may store each gateway's name with a corresponding partner list that includes each partner's virtual IP address, public portion of the public key, firewall information, and other stored information. As a result, the network operations center 610 may enable a tunnel between the first gateway 650 and the second gateway 651 by determining that each gateway consents to enabling the tunnel and providing sufficient information, such as a partner list that includes each partner's virtual IP address, public portion of the public key, firewall information, etc. to each gateway such that the gateways are capable of establishing the tunnel.

Figure 11B:
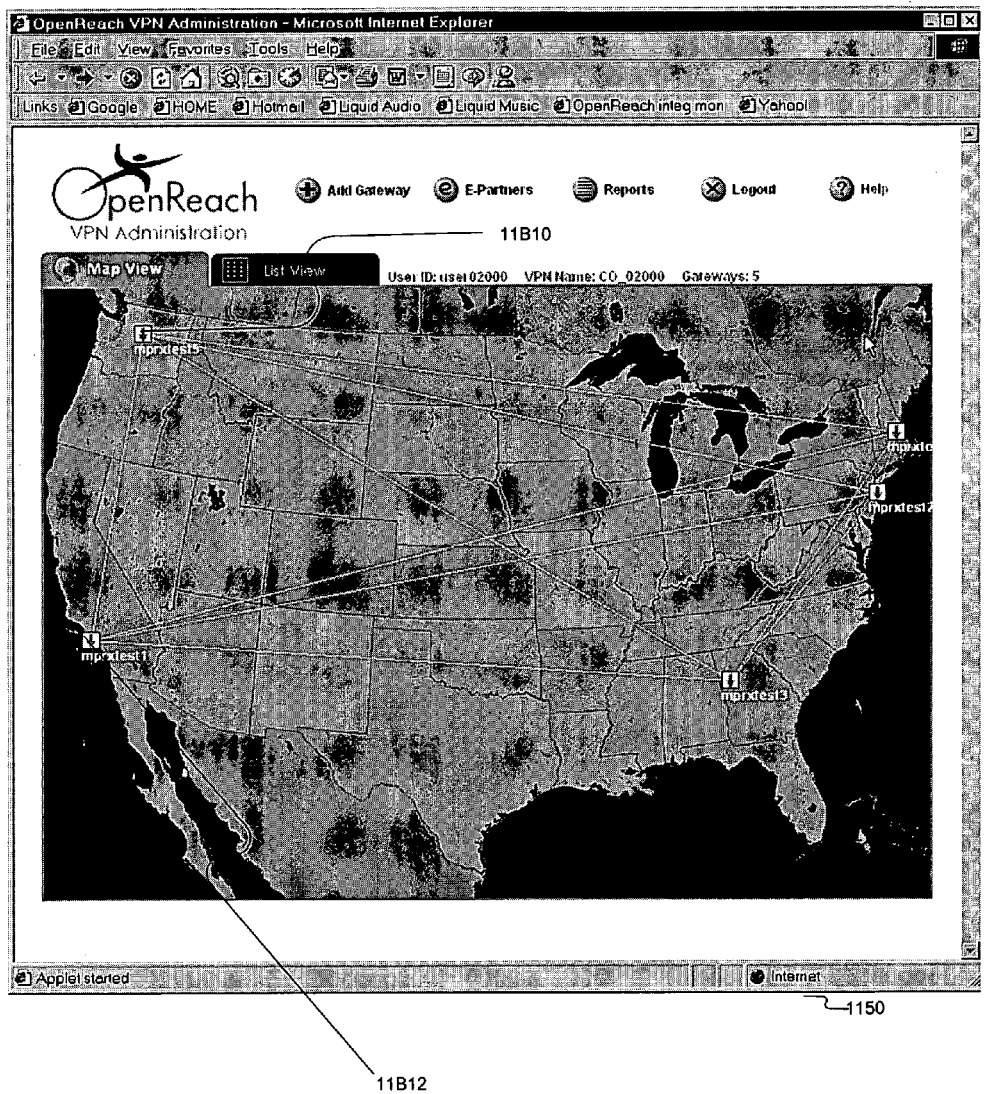
FIG. 11B is an exemplary screen for adding a gateway to the virtual private network in accordance with methods and systems consistent with the present invention.

FIG. 11B shows an exemplary screen 1150 for adding a gateway to a virtual private network enabled by the network operations center 610. FIG. 11B shows that a user may use the screen 1150 to graphically select one or more gateways from which the user's gateway would accept one or more tunnels. The screen 1150 may be presented to the user during the initial configuration of the user's gateway or whenever the user seeks to add a gateway to the user's virtual private network. The network operations center 610 may determine whether a gateway is selected by the user also consents to enabling one or more tunnels to the user's gateway. If the network operations center determines that the selected gateway and the user's gateway mutually consent, the network operations center 610 may place the selected gateway on a partner list for the user's gateway; place the user's gateway on the selected gateway's partner list, and add the selected gateway to the virtual private network depicted in FIG. 11.

Figure 11C:
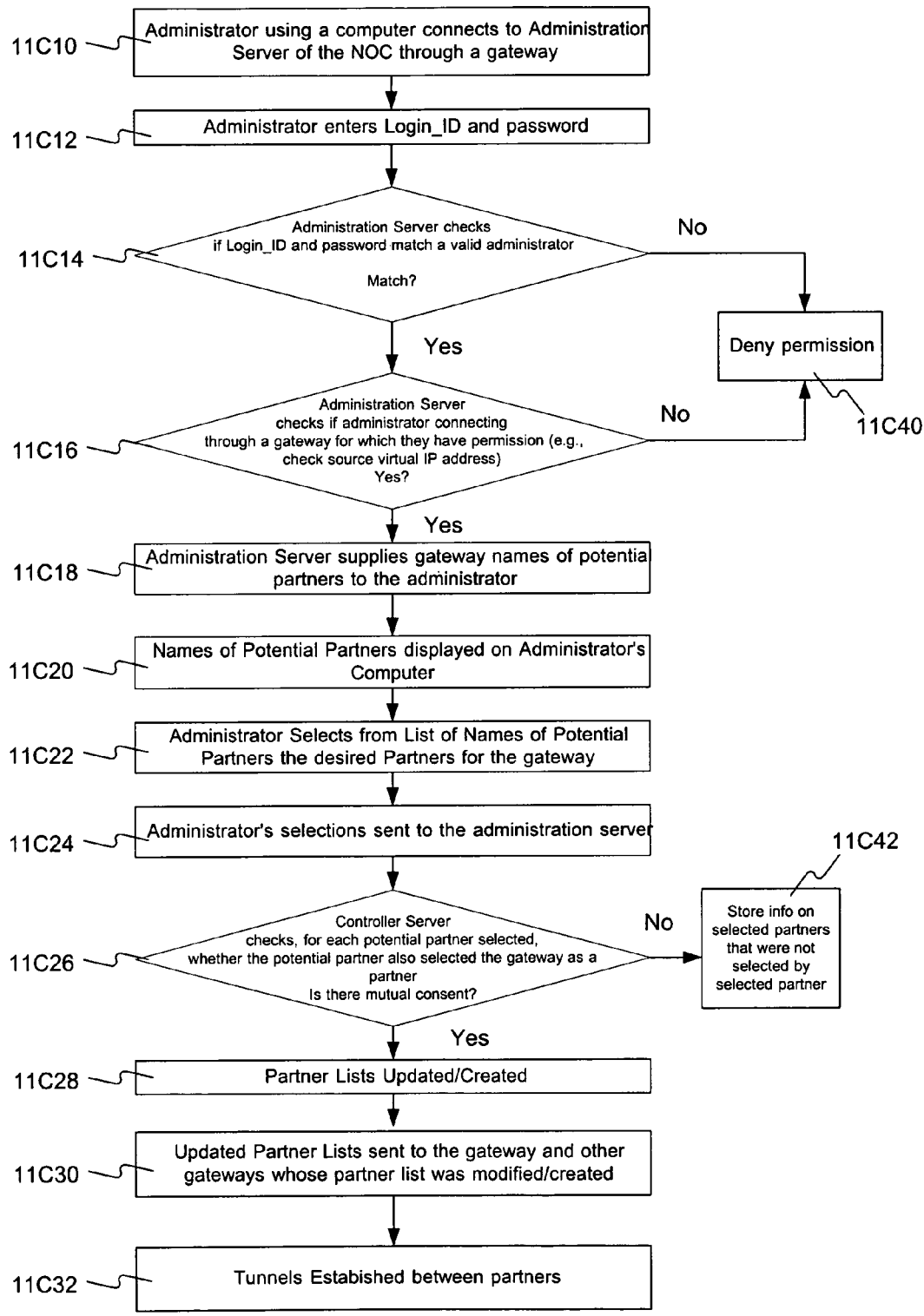
FIG. 11C illustrates a flow chart of a method for initially establishing a virtual network, in accordance with methods and systems consistent with the invention.

FIG. 11C illustrates a flow chart of a method for initially establishing a virtual network, in accordance with methods and systems consistent with the invention. Referring back to FIG. 4, an administrator using computer 401 may connect through the tunnel 425 and gateway 450 to the control system 175 (S11C10). The control system 175 may include, for example, the network operation center 610 shown in FIG. 6A including a controller 614, an administrative server 615, and a database server 616. The administrator may use a web browser or a specific piece of software for providing a graphical user interface (GUI) to connect and exchange information with administrative server 615. Further, as previously discussed, the connection between computer 401 and gateway 450 may be a direct connection, a connection through a LAN, or any other type of connection.

After connecting to the administrative server 615, the administrator may be prompted to enter their login ID and password (S11C12). This information may then be sent to the administrative server 615, which may determine whether the login id and password correspond to a valid administrator (S11C14).

Further, the administrative server 615 may verify that the administrator is connecting to the administrative server 615 through a gateway to which the administrator may authorize access (S11C16). In an embodiment using the IP protocol, the gateway 450 may replace the source IP address of IP packets sent from the administrator's computer 401 to the network operations center 610 with the virtual IP address of the gateway 450. Then, the administrative server 615 may check the virtual IP address with the administrator's login ID and password to ensure that the administrator is authorized to administer the gateway 450. Further, other techniques may be used to ensure the administrator has permissions for the gateway 450. If either the login ID and password don't correspond to a valid administrator or the administrator is not connecting through a proper gateway, the administrator is denied permission to administer the gateway (S11C40).

After, verifying the administrator's login ID and password and verifying the administrators authorization, the administrative server 615 may supply the computer 401 with a list of potential partners for gateway 450 (S11C18). Initially, this list may include the gateways (e.g., gateway 451) that were registered during step 320 shown in FIG. 3. This list may identify each gateway by name. As previously discussed each gateway may be identified by a two-level naming hierarchy ("domain_name.gateway_name"). For example, a customer known as the XYZ corp. may register its domain name as XYZ. Then, the customer may register separate gateways for its marketing and engineering divisions such that the gateways are respectively named "mkting" and "engr." Thus, for these two gateways, respective names of the gateways would be "XYZ.mkting" and "XYZ.engr."

Figure 11D:
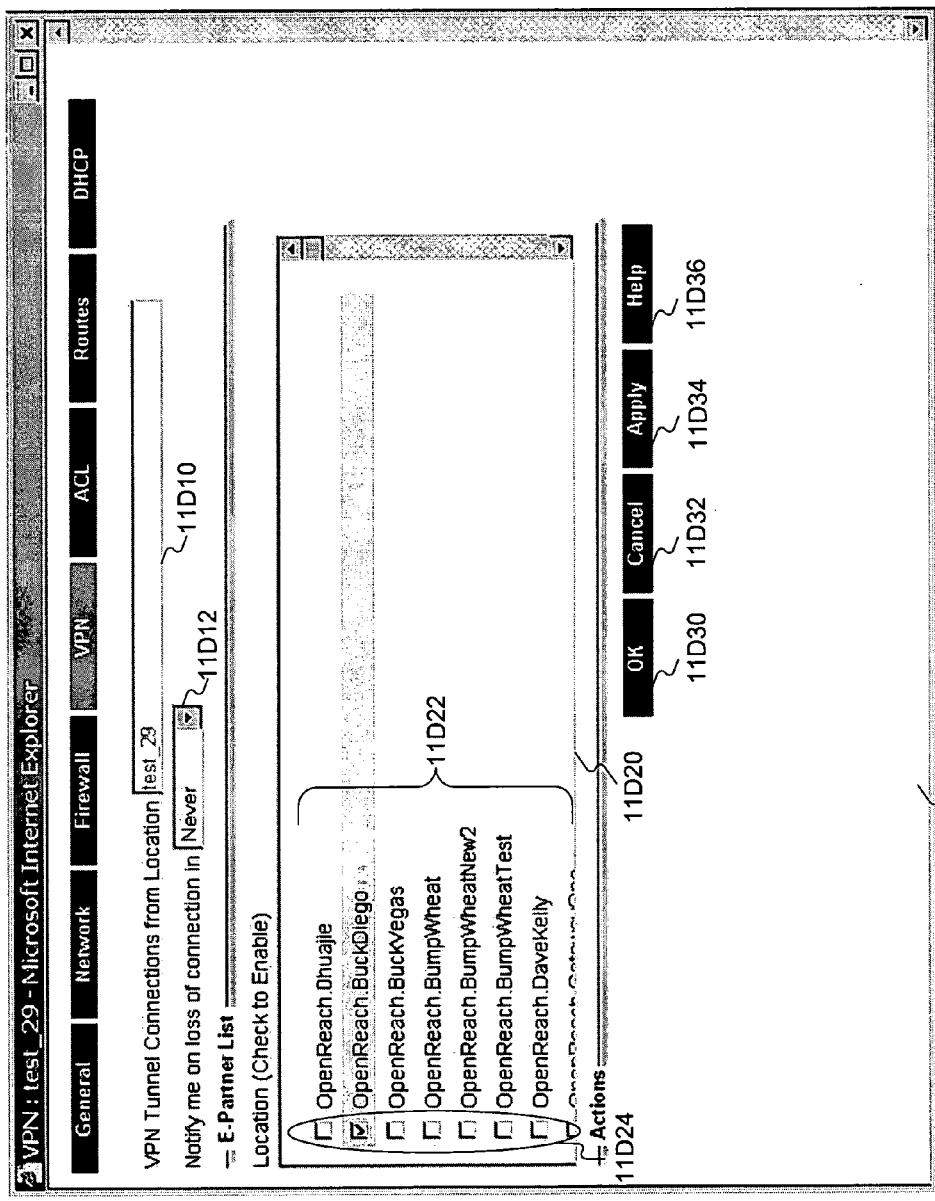
FIG. 11D illustrates an exemplary graphical user interface that displays a list of potential partners, in accordance with methods and systems consistent with the invention.

The list of potential partners (e.g., gateway 451) may then be displayed to the administrator using a graphical user interface, such as web page 11D00 shown in FIG. 11D, provided by the network operations center 610 (S11C20). As shown, web page 11D00 may display a list of potential partners to the administrator in accordance with method and systems consistent with the invention. This web page 11D00 may also display the name of the gateway being administered 11D10 and provide the administrator with an option 11D12 to be notified in the event any of the tunnels between the gateway and any of its partners are lost. In this example, the administrator may select to be notified immediately if any of the tunnels are lost, if a tunnel is lost for a period of 15 minutes, if the tunnel is lost for a period of 30 minutes, or never. Also illustrated are various buttons that a user can click on: an OK button 11D30, a cancel button 11D32, an apply button 11D34, and a help button 11D36.

Next, the administrator may select from the list of displayed potential partners 11D20 one or more gateways (e.g., gateway 451) with which one or more tunnels may be enabled from gateway 450 (S11C22). Then, the administrator may send the selections to the administrative server 615 (S11C24). For example, in the web page 11D00, to the left of each gateway name 11D22 is a check box 11D24 that the administrator may check if the administrator desires to establish a tunnel with that particular gateway. The administrator may then check or uncheck each box as desired. Once finished, the administrator may click on the OK button 11D30, to send their selections to the administrative server 615 and close the web page 11D00. Alternatively, the administrator may click on the Cancel button 11D32 to close the web page 11D00 without sending the selections to the administrative server 615. If the administrator desires to send the selections to the administrative server 615 but not close the web page 11D00, the administrator may click on the Apply button 11D34. Also, the administrator may select the Help button 11D36 to bring up a screen with help information. Further, as will be obvious to one of skill in the art, numerous other techniques may be used instead to permit an administrator to select the gateways.

Next, the administrative server 615 may receive the selections and check if an administrator for each of the selected gateways (e.g., gateway 451) also selected the gateway 450 (S11C26). That is, the administrative server 615 may receive a list of selected partners for each gateway (e.g., gateways 450 and 451). This list is then provided to the Controller 614 which may then check all of the selected partners received for the gateway 450 against these other lists to determine if the other gateways (e.g., gateway 451) also consent to enabling a tunnel with the gateway 450. If the selected partner (e.g., gateway 451) also selected the gateway 450, the gateways (e.g., gateways 450 and 451) have mutually consented to enabling a tunnel and as such each gateway is added to the partner list of the other gateway (S11C28). That is, for example, gateway 450 may be added to the partner list for gateway 451 and gateway 451 may be added to the partner list for gateway 450. If either of the gateways does not select the other as its partner, neither gateway is added to the partner list of the other gateway.

For example, if gateway 450 selected gateway 451 to be its partner but gateway 451 did not consent to a tunnel with gateway 450, the gateway 451 is not added to the partner list for gateway 450 nor is gateway 450 added to the partner list for gateway 451. Rather, this selection is simply stored by the administrative server 615 so that in the event gateway 451 in the future selects gateway 450, the administrative server 615 may recognize that there is then mutual consent and may add gateway 450 to the partner list for gateway 451 and gateway 451 to the partner list for gateway 450 (S11C42).

Further, if the administrator has the requisite permissions to administer both gateway 450 and the selected gateways (e.g., gateway 451), the administrative server 615 may treat the selections as granting consent for both the gateway 450 and the selected gateways (e.g., gateway 451). If the administrator does not have this permission, the administrative server 615 may check for mutual consent as discussed above and only add the selected gateway (e.g., gateway 451) to the partner list for gateway 450 if it also receives an indication of consent from the selected gateways (e.g., gateway 451).

After the controller 614 determines the partner list of the gateway 450, the controller 614 sends the partner list to the gateway 450 along with an updated partner list to each of gateway 450's partners (e.g., gateway 451)(S11C30). FIG. 11 illustrates an example of two partner lists that may be sent to two respective gateways. Further, in addition to just including the names of the gateways on the partner list, the administrative server may send additional information to each gateway regarding its partners. For example, as previously discussed, the controller 614 may send to each gateway the virtual IP address, the real IP address, access control lists, etc. for each of its partners.

After receiving the partner list, the gateway 450 may then attempt to establish a tunnel between itself and each of its partners (e.g., gateway 451) (S11C32).

Figure 11E:
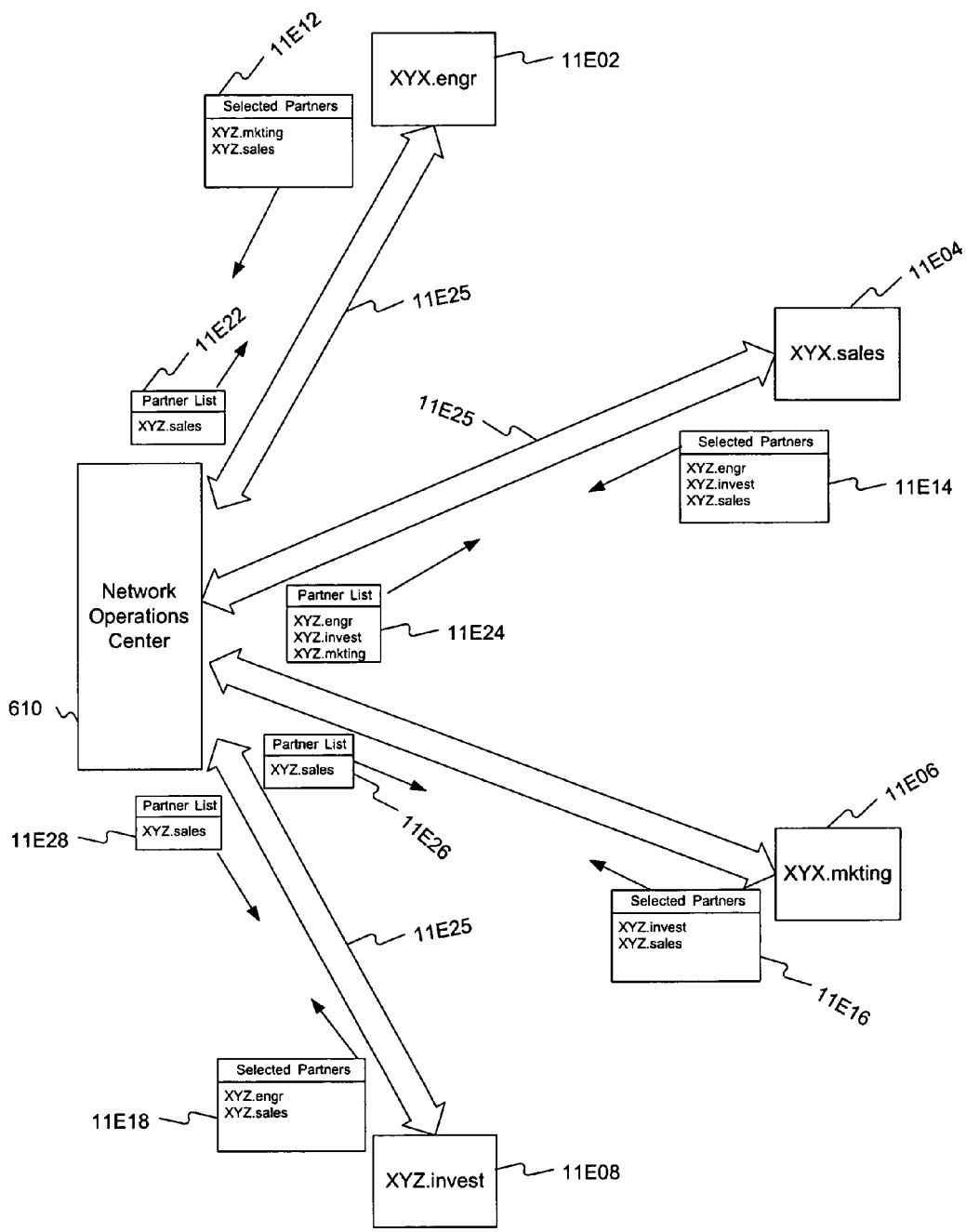
FIG. 11E illustrates a block diagram of an exemplary network, in accordance with methods and systems consistent with the invention.

FIG. 11E illustrates an exemplary network including gateways 11E02, 11E04, 11E06, and 11E08, named "XYZ.engr," "XYZ.mkting," "XYZ.sales," and "XYZ.invest," respectively, in accordance with methods and systems consistent with the invention. As illustrated, each of the gateways may connect to the network operations center 610 through a tunnel 11E25. In this example, an administrator of the gateway named "XYZ.engr" 11E02 consents to tunnels with the gateways named "XYZ.mkting" 11E04 and "XYZ.sales" 11E06 but not with the gateway named "XYZ.invest" 11E08. Tables 11E14, 11E16, and 11E18 each illustrate an example of the partners that are selected by gateways 11E06, 11E08, and 11E10, respectively. In this example, the XYZ.sales gateway's 11E04 selected partners 11E14 are XYZ.engr, XYZ.invest, and XYZ.sales; the XYZ.mkting gateway's 11E06 selected partners 11E16 are XYZ.invest and XYZ.sales; and, the XYZ.invest gateway's 11E08 selected partners 11E18 are XYZ.engr and XYZ.sales.

The network operations center 610 upon receipt of these selected partner lists may then check for mutual consent. If there is mutual consent, then each gateway is added to the partner list of the other consenting gateway.

For example, for the XYZ.engr gateway 11E02, the selected partners are XYZ.mkting and XYZ.sales. The XYZ.sales gateway's 11E04 selected partners include XYZ.engr. Thus, there is mutual consent by both the XYZ.engr gateway 11E02 and the XYZ.sales gateway 11E04 to enable a tunnel between each other and as such each gateway is added to the partner list of the other consenting gateway. For the XYZ.mkting gateway 11E06, the selected partners 11E16 do not include the XYZ.engr gateway 11E02. Thus, there is no mutual consent by both the XYZ.engr gateway 11E02 and the XYZ.mkting gateway 11E06. As such, neither gateway is added to the partner list for the other gateway. Rather, the network operations center 610 may simply store the information that the XYZ.engr gateway 11E02 consents to a tunnel with the XYZ.mkting gateway 11E06 in the database server 616 so that if in the future the XYZ.mkting gateway 11E06 consents to the tunnel, the network operations center 610 may determine that there is mutual consent. Tables 11E22, 11E24, 11E26 and 11E28 illustrate partner lists sent by the network operations center 610 to the respective gateways.

Accordingly, in this embodiment, the network operations center 610 may send to the XYZ.engr gateway 11E02 a partner list 11E22 that includes XYZ.sales, send to the XYZ.sales gateway 11E04 a partner list 11E22 that includes XYZ.engr, XYZ.mkting, and XYZ.invest, send to the XYZ.mkting gateway 11E06 a partner list 11E26 that includes XYZ.sales, and send to the XYZ.invest gateway 11E08, a partner list 11E28 that includes XYZ.sales.

Referring back to FIG. 11B, an administrator may use the illustrated web page 1150 to enable tunnels between gateways. For example, an administrator with the requisite permissions may click on one of the gateways, such as, for example gateway 11B10, appearing on the map and then drag it and place it on another gateway, such as, for example the gateway 11B12, to enable a tunnel between the two gateways. This selection is then sent to the network operations center, which determines whether the administrator is permitted to administer both of the gateways. If so, gateway 11B10 is added to the partner list for gateway 11B12. Likewise, gateway 11B12 is added to the partner list for gateway 11B10. After which, the network operations center may send the updated partner lists to each respective gateway. If the network operations center determines that the administrator lacks authorization to administer both gateways, the network operations center may ignore the administrators actions and may display on the web page 1150 an indication that the administrator lacks the proper permissions.

Figure 11F:
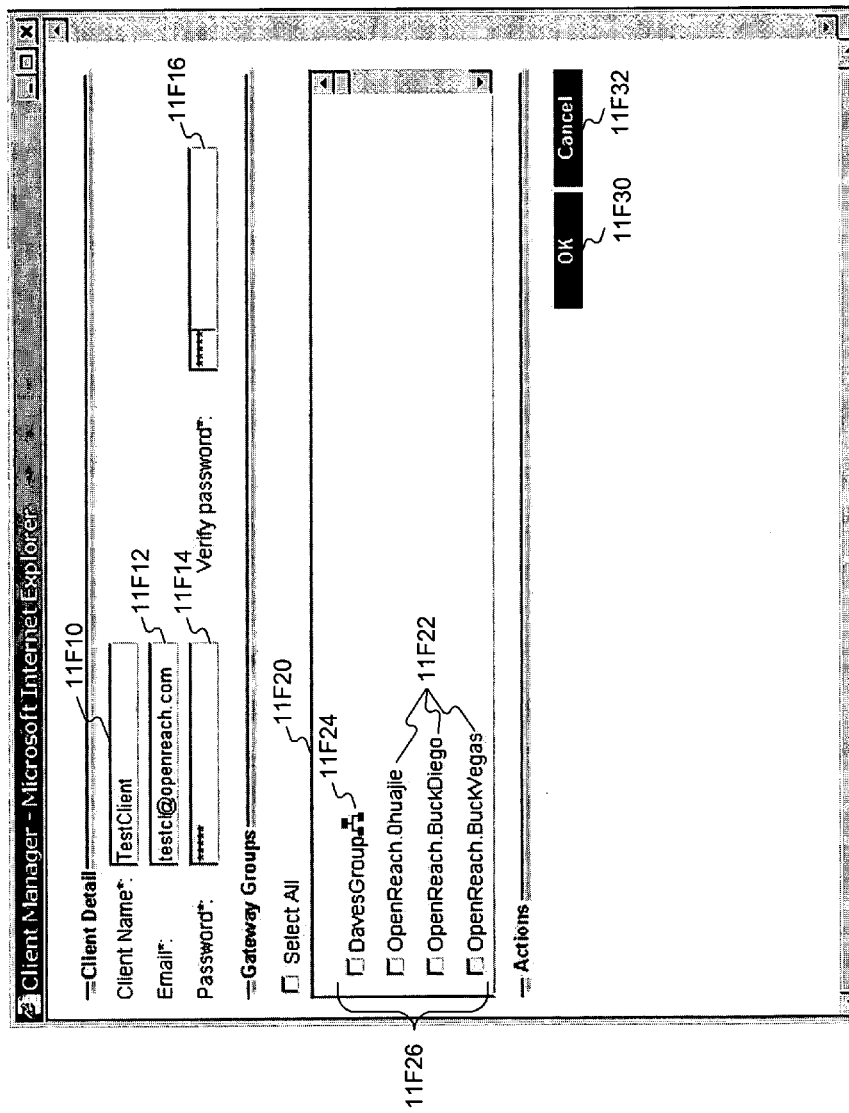
FIG. 11F illustrates an exemplary graphical user interface for administering a client, in accordance with methods and systems consistent with the invention.

Additionally, partner lists may be created for individual clients, thus permitting only specific gateways or clients to have access to the client. FIG. 11F illustrates an exemplary graphical user interface, such as web page 11F00 that the network operations center 610 may be provide to computer 410 to permit an administrator to define a client and consent to specific gateways or clients having access to the client, in accordance with methods and systems consistent with the invention. As illustrated, the web page 11F00 includes a client name box 11F10 for entering the name of the client, an email address 11F12, a password box 11F14, a verify password box 11F16, and a list of potential partners 11F20. When initially defining a client, an administrator may enter a name for the client in client name box 11F10 that will be used for identifying the client. Also, the administrator may set up a password for the client using password box 11F14 and verify password box 11F16. Thus, in the future an administrator may need to enter this password in order to be granted permission for administering the client.

The list of potential partners 11F20, like the list of potential partners discussed with reference to FIG. 11D may include the names 11F22 for all the gateways for the domain. In addition to the gateways, the list of partners 11F20 may include the names of other clients (not shown) that have been previously defined and groups of gateways 11F24. Although not discussed above with reference to FIG. 11D, the potential partner list 11D20 shown in FIG. 11D may also include client names and groups of gateways. Groups will be discussed in further detail below.

As with the web page 11D00 of FIG. 11D, the administrator may indicate a consent on behalf of the client by checking a box 11F26 next to a gateway name, client name, or group name. In addition, the administrator may give consent to all gateways by checking the box marked select all 11F22.

Once the administrator has made the selections, they can click on the OK box 11F30 to send the information to the network operations center 610 and close the web page 11F00. Alternatively, the administrator may click on the cancel box 11F32 to close the web page 11F00 without sending the information to the network operations center 610.

After the information is sent to the network operations center 610, the network operations center 610 may send an email to the email address identified in email address 11F12 along with instructions for setting up the client, as previously discussed. Further, the network operations center 610 may check for each of the selected gateways and clients if there is mutual consent, update the partner lists accordingly, and send the partner lists to the respective clients and gateways. Then, as previously discussed, only entities appearing on the client's partner list may be permitted access to the client.

Figure 11G:
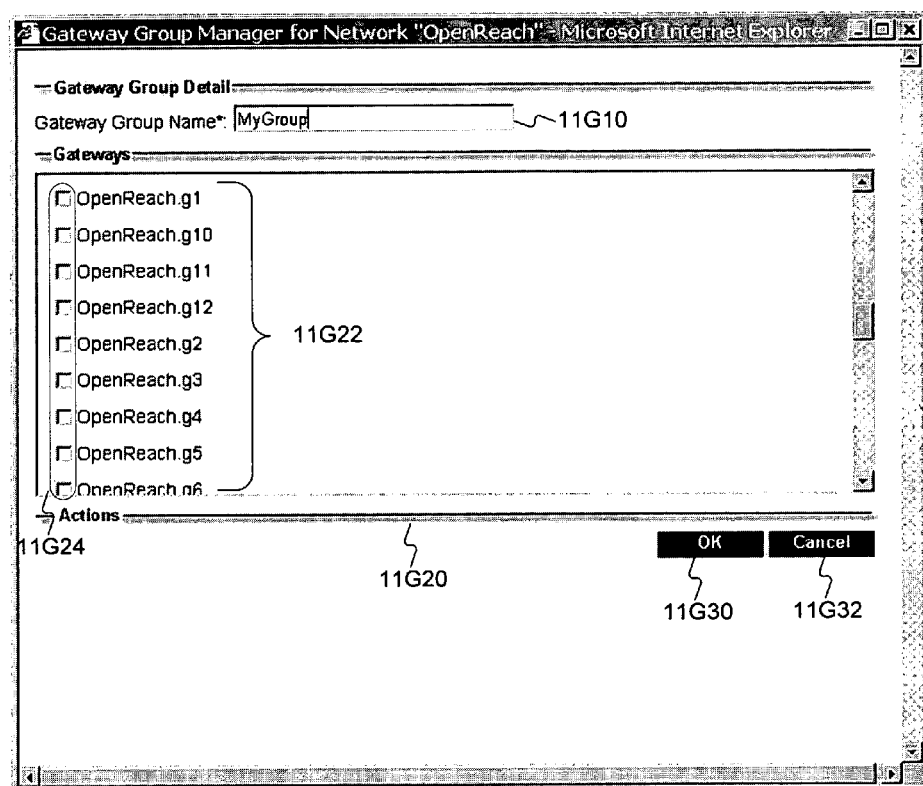
FIG. 11G illustrates an exemplary graphical user interface for defining a group, in accordance with methods and systems consistent with the invention.

FIG. 11G illustrates a graphical user interface, such as web page 11G00, for defining a group, in accordance with methods and systems consistent with the invention. As illustrated, the web page 11G00 may include a group name box 11G10 and of a list of gateways 11G20. Also, the list of gateways 11G20 may include the name 11G22 for each of the gateways for the domain along with a check box 11G24 to the left of each name. An administrator with the proper permissions may thus use this web page 11G00 to enter a name for a group in group box 11G10 and select the gateways that the administrator desires to be in the group. As illustrated, the administrator may select the gateways for the group by simply checking a box 11G24 next to a gateway name 11G22. Once the administrator has defined a name for the group and selected which gateways should be included in the group, the administrator may click on the OK button 11G30 to send this request to the network operations center 610. Alternatively, the administrator may click on the cancel button 11G32 to close the web page 11G00 without sending this information to the network operations center.

Once a group is defined, it may appear on the list of potential partners that is displayed whenever an administrator wishes to either initially establish or alter the partner list for a gateway or client. The administrator may then check the box 11G24 appearing next to group name to consent to enabling a tunnel with every gateway in the group. Likewise, an administrator may modify the partner list for all the gateways in a group using a web page such as that illustrated in FIG. 11G where the administrator may enter the group name in box 11G10 and then select from the gateways listed. Thus, an administrator accessing the web page 11G00 may grant consent for each and every gateway in the group to enable tunnels with the selected gateway.

As previously discussed, after the controller 614 determines that two gateways have mutually consented to enabling a tunnel, the administrative server 615 may add each gateway to the partner lists of the other consenting gateway and forward the respective partner lists to each of the gateways. In addition, as previously discussed, the partner list supplied to each gateway may include each partner's virtual IP address, public portion of the private key, firewall information, etc.

Thus, an administrator may simply provide the administrative server 615 with the names of the gateways with which the administrator desires enabling tunnels from the gateway 450. Then, if there is mutual consent, the network operations center 610 may determine the virtual IP address, etc. for each of the consenting gateways, add each consenting gateway to the partner list for gateway 450, add gateway 450 to the partner lists for each of the consenting gateways, and forward the updated partner lists including the virtual IP address, public portion of the private key, etc. to the gateway 450 and each of the consenting gateways. The gateways may then, as previously discussed, use the provided information to establish one or more tunnels between themselves.

Further, the information regarding each partner, such as the virtual IP address, may be provided to the gateway 450 in multiple tables, in a single file, or simply included in the partner list supplied to the gateway 450. For example, the information described in tables 1 through 5 may be combined into a single table for each of the gateways appearing on the partner list for gateway 450, or the information for all of the partners appearing on the partner list for gateway 450 may be combined into a single table. FIG. 12 illustrates an example table 1200 that network operations center 610 may provide a gateway regarding one of its partners, in accordance with methods and systems consistent with the invention. As illustrated, this table combines the information previously discussed with reference to tables 1 through 5. For example, the table may include information regarding XML name value pairs for configuring the partner 1210, XML name value pairs for configuring a media access layer interface for the partner 1212, XML name value pairs for a local area network interfacing the partner 1214, XML name value pairs for cryptographic information for the partner 1216, and XML name value pairs for firewall information regarding the partner 1218. Further, as will be obvious to one of skill in the art there are numerous other mechanisms that may be used in providing information to the gateway regarding each of its partners.

Figure 13:
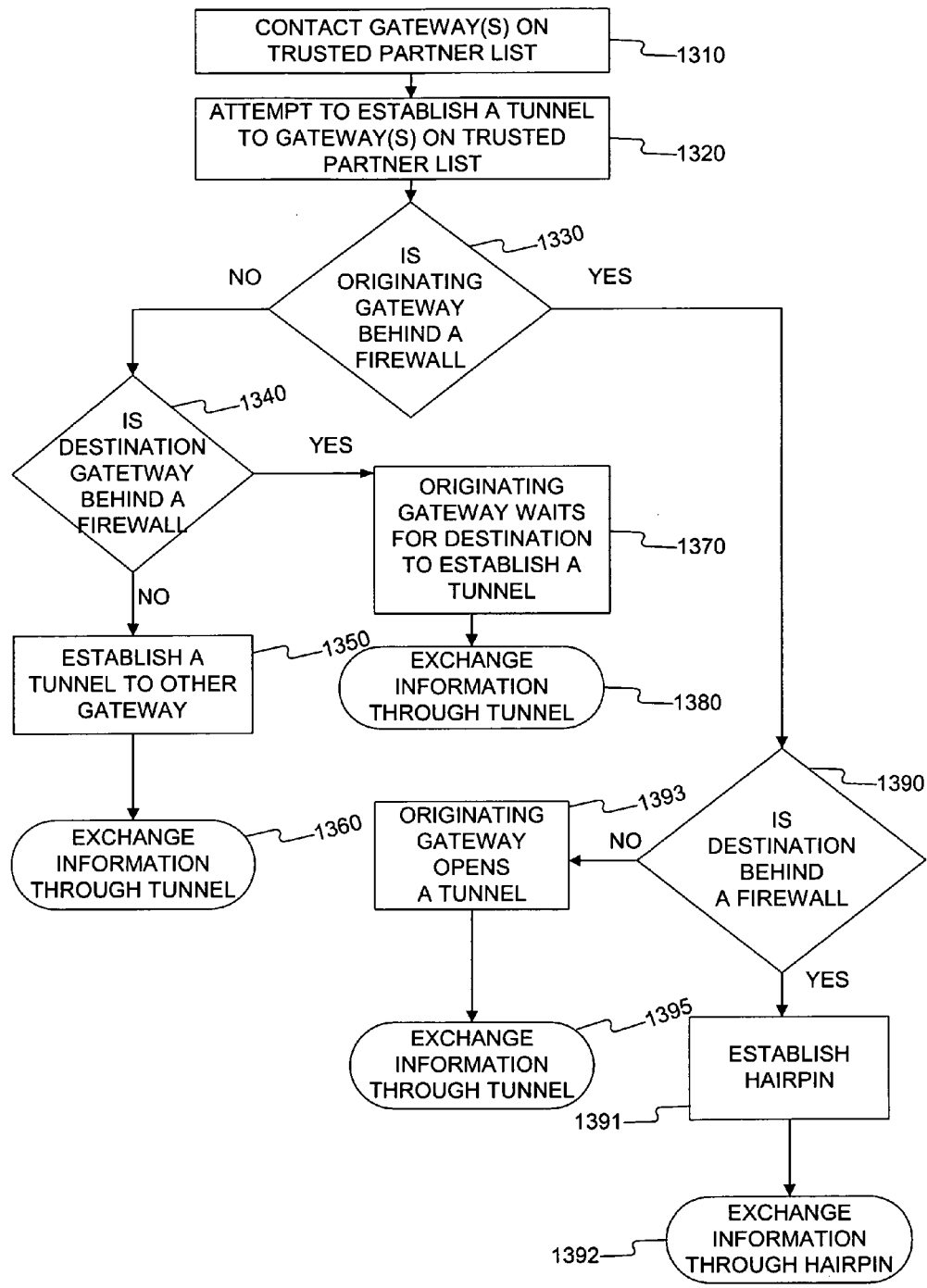
FIG. 13 is an exemplary flow chart for establishing a tunnel in accordance with methods and systems consistent with the present invention.

FIG. 13 is an exemplary flow chart depicting steps for establishing a tunnel between at least two gateways in the network 600 shown in FIG. 6A. A gateway may seek to establish a tunnel, such as an IPSec tunnel with another gateway that is behind a firewall and is not accessible because the firewall selectively restricts information flowing to the gateway.

For example, after the first gateway 650 and the second gateway 651 have registered and established control paths with the network operations center 610, the first gateway 650 may seek to establish a tunnel to the second gateway 651. The network operations center 610 may enable the tunnel by providing the first gateway 650 with an indication that the second gateway 651 also consents to the enabling the tunnel. The network operations center 610 may acknowledge the mutual consent of the gateways by, for example, placing each gateway on the partner list of the other gateway.

The network operations center 610 may enable the tunnel by communicating the mutual consent to the first gateway 650 and the second gateway 651. This consent may be communicated in the form of providing a partner list to each gateway that consents to enabling the tunnel. The partner list may also include configuration information for each gateway listed in the partner list. The configuration information may provide sufficient information for establishing the tunnel and may include, for example, the following for each gateway listed on the partner list: a gateway name, a virtual IP address, a real IP address, and a shared secret for authentication with the network operations center and with other gateways enabled by the network operations center 610.

With the partner list, the network operations center 610 may also provide configuration information that includes, for example, firewall information indicating whether a gateway listed on a partner list is accessible or whether the gateway is not accessible behind a firewall. For example, when the first gateway 650 contacts the second gateway 651 (step 1310) and attempts to establish a tunnel to the second gateway 651 (step 1320), the first gateway 650 may be notified by the network operation center 610 that the second gateway 651 is behind (i.e., not accessible behind) a firewall. In this example, the network operations center 610 may also provide the first gateway 650 with an indication that the first gateway is behind a firewall.

If the first gateway 650 is not behind a firewall, the first gateway 650, as the originating gateway for tunnel request, may determine whether the destination gateway (i.e., the second gateway 651) is behind a firewall (step 1340). If the destination gateway (i.e., the second gateway 651) is not behind a firewall (step 1340), the first gateway 650 may establish the tunnel to the second gateway 651 (step 1350) and exchange information with the second gateway 651 through the tunnel (step 1360). In one embodiment, the gateway with a lower IP address waits for a gateway with a higher IP address to establish a tunnel. In this embodiment, the gateway with the higher IP address is referred to as the originating gateway.

If the destination gateway (e.g., the first gateway 650) is not accessible behind a firewall (not shown) (step 1340), the originating gateway may wait for the destination gateway (e.g., the second gateway 651) to establish the tunnel (step 1370). When the second gateway 651 (i.e., the destination gateway) establishes the tunnel, the first gateway 650 and the second gateway 651 may exchange information through the established tunnel (step 1380).

If both the originating gateway (e.g., the first gateway 650) and the destination gateway (e.g., the second gateway 651) are not accessible behind firewalls (not shown) (steps 1330 and 1390), a direct tunnel between the originating gateway and the destination gateway may not be possible because the firewall may hide the real or public IP addresses of the originating gateway and destination gateway, respectively. As a result, the network operations center 610 may enable at the proxy module 613 a proxy (also referred to herein as a "Hairpin") (step 1391) to enable a tunnel between the first gateway and the second gateway 651 through the proxy.

When the Hairpin is enabled, the originating gateway that is not accessible behind a firewall and the destination gateway that is not accessible behind a firewall may exchange information through the Hairpin, bypassing the firewall of the other gateway (step 1392). The proxy module 613 may function as a Hairpin that may be enabled by the network operations center 610.

In one embodiment, the proxy module 613 may forward packets from one TCP port to another TCP port without examining the contents of the packets (e.g., reading the payload or decrypting the payload). Although the proxy module 613 shown in FIG. 6A may reside in the network operations center 610, the proxy module 613 may reside within any other device in the base network including, for example, another gateway. For example, if two gateways 650, 651 need a Hairpin, the third gateway 652 may serve as a Hairpin.

If the originating gateway is accessible a firewall (not shown) (step 1330) and the destination gateway is not behind a firewall (step 1390), the originating gateway may open a tunnel to the destination gateway (step 1393) and proceed to exchange information with destination gateway (step 1395) through the established tunnel.

Figure 14:
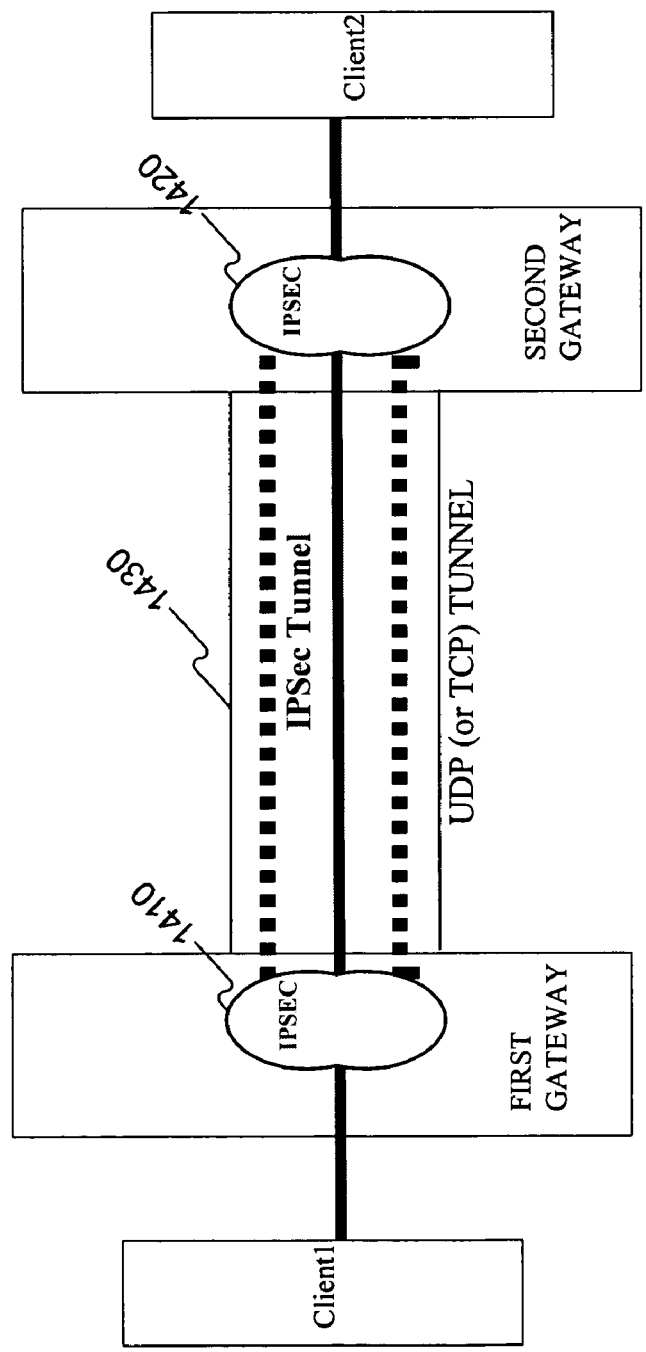
FIG. 14 is a general block diagram of a tunnel between two gateways in accordance with methods and systems consistent with the present invention.

FIG. 14 depicts a tunnel 1430 established between a first gateway 1410 and a second gateway 1420, in accordance with the steps depicted in the flow chart shown in FIG. 13. To establish the tunnel 1430, the first gateway 1410 may contact the second gateway 1420 (step 1310) and attempt to establish the tunnel 1430 to the second gateway 1420 (step 1320). In the embodiment of FIG. 14, the second gateway 1420 appears on the partner list of the first gateway 1410 and the second gateway 1420 may include the first gateway 1410 on its partner list. In this embodiment, neither the first gateway 1410 (i.e., the originating gateway) nor the second gateway 1420 (i.e., the destination gateway) is behind a firewall (steps 1330 and 1340). The first gateway 1410 may then establish the tunnel to the second gateway 1420 (step 1350) and proceed to exchange information with the second gateway 1420 through the established tunnel 1430 (step 1360).

Although the second gateway 1420 is not shown as being behind a firewall in FIG. 14, the second gateway 1420 may alternatively be placed behind a firewall. If the second gateway 1420 is placed behind a firewall (step 1340) and the second gateway is not accessible behind the firewall, the originating gateway (i.e., the first gateway 1410) may wait for the destination gateway (i.e., the second gateway 1420) to establish the tunnel 1430 (step 1370). While the originating gateway waits for the destination to establish the tunnel, the second gateway 1420 establishes a tunnel to the first gateway 1410 since the first gateway 1410 is accessible because it is not behind a firewall.

Figure 15A:
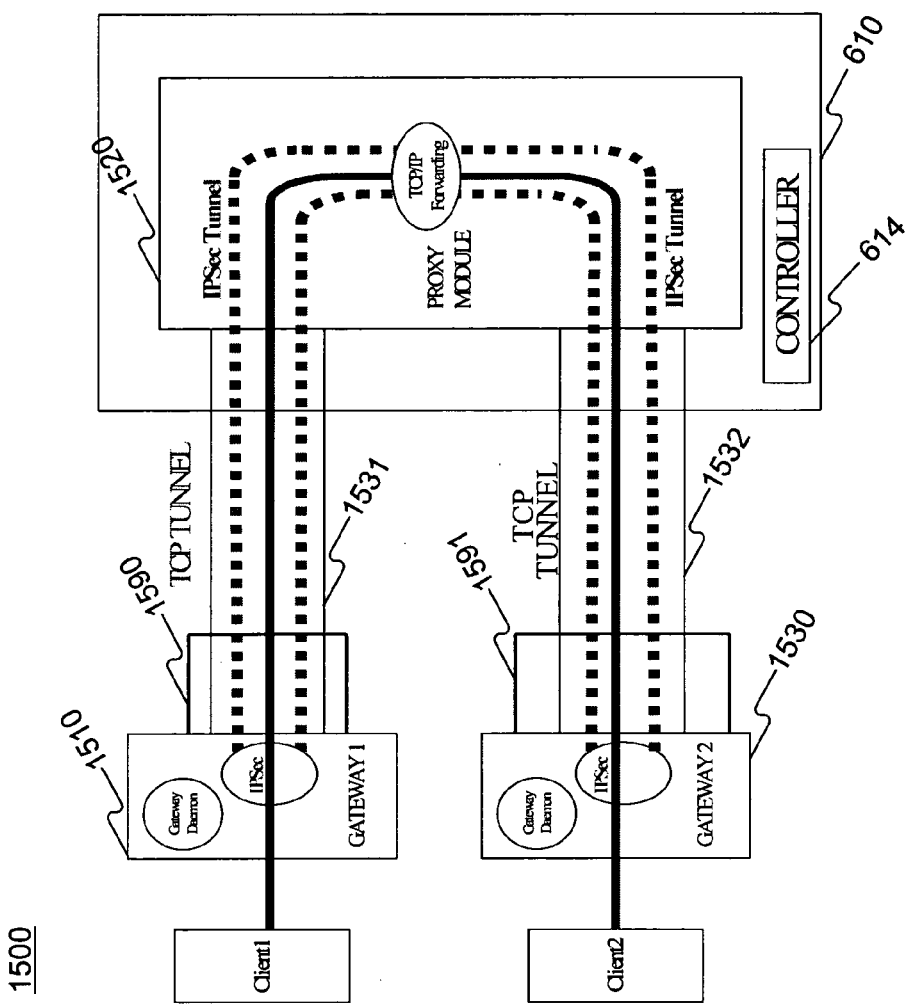
FIG. 15A is a general block diagram of two gateways, each not accessible behind a firewall, in accordance with methods and systems consistent with the present invention.

FIG. 15A illustrates a network 1500 that includes a first gateway 1510, a second gateway 1530, a network operations center 610, a proxy module 1520, a first tunnel 1532, a second tunnel 1531, and a control module 614. The gateways 1510 and 1530 are each behind firewalls 1590, 1591, respectively, that selectively restricts access to each of the gateways 1510, 1530. In this embodiment, the proxy module 1520 may reside in the network operations center 610. The first gateway 1510 may be the originating gateway that is not accessible behind a firewall 1590 (step 1330). Because the destination gateway (i.e., the second gateway 1530) may not be accessible behind a firewall 1591 (step 1390), the first gateway 1510 may not establish a tunnel directly to the second gateway 1530 and instead may use the proxy module 1520 as a Hairpin, bypassing the firewall 1591 of the second gateway 1530.

To enable the Hairpin (step 1391), the first gateway 1510 may use the configuration data provided by the network operations center 610 to determine that the second gateway 1530 is not accessible behind the firewall 1591. Alternatively, the first gateway may determine that the second gateway 1530 is not accessible behind the firewall 1591 through other means, such as sending packets to a real IP for the second gateway 1530. The first gateway 1510 may contact the controller module 614 to request enabling a tunnel to the second gateway 1530. The controller module 614 may then send a message to the proxy module 1520 to enable a Hairpin for the first gateway 1510 and the second gateway 1530.

The proxy module 1520 may allocate a TCP port at the proxy module 1520 for the first gateway 1510 and another TCP port for the second gateway 1530. The proxy module 1520 may then provide the first gateway 1510 with the TCP port information and provide the second gateway 1530 with the other TCP port information. The proxy module 1520 may then initiate a TCP forwarding process that listens to both TCP ports allocated to the first gateway 1510 and the second gateway 1530, respectively. The controller module 614 may then proceed to inform the first gateway 1510 through the control path to establish a tunnel 1531 to the proxy module 1520 at the IP address of the proxy module 1520 and at the TCP port previously allocated to the first gateway 1510. The controller module 614 may also inform the second gateway 1530 to establish a separate tunnel 1532 to the proxy module 1520 at the IP address and at the TCP port allocated to the second gateway 1530.

The first gateway 1510 may then proceed to open a TCP connection to the TCP port previously allocated to the first gateway 1510 at the proxy module 1520. Similarly, the second gateway 1530 may open a TCP connection to the TCP port previously allocated to second gateway 1530 at the proxy module 1520. The proxy module 1520 may use the TCP protocol to forward TCP packets received from the first gateway 1510 to the second gateway 1530 and forward TCP packets received from the second gateway 1530 to the first gateway 1510. In the embodiment of FIG. 15A, a tunnel from each of the gateways 1510, 1530 to the network operations center 610 may provide out-of-band signaling to enable the Hairpin at the proxy module 1520.

Accordingly, the proxy module 1520 may provide the capability to establish a tunnel between the first gateway 1510 and the second gateway 1530 by bypassing their respective firewalls 1590, 1591. Since firewalls may be configured to allow TCP traffic to originate from behind a firewall (i.e. outbound) but not allow arbitrary TCP traffic in (i.e. inbound), the first gateway 1510 and the second gateway 1530 may both send their respective TCP traffic to the proxy module 1520. Using TCP forwarding, the proxy module 1520 may act as a proxy to enable the exchange of information through a Hairpin even when the originating gateway and the destination gateway are both behind firewalls that selectively restrict access to the originating and destination gateways.

The network operations center 610 may control a firewall that selectively allows in-bound and out-bound traffic (e.g., firewalls 1590, 1591) based on a set of rules. For example, the rules may be used to restrict all in-bound and all out-bound traffic through the tunnels 1531, 1532. Furthermore, the network operations center 610 may turn-off the rules, thus allowing an in-bound and out-bound traffic through the firewall. Although the firewalls shown in FIG. 15A reside outside of their respective gateways 1510 and 1530, the firewalls 1590 and 1591 may alternatively reside in their respective gateways 1510 and 1530.

If the network operation center 610 allows in-bound and out-bound traffic through the firewalls 1591, 1592 based on a set of rules, the firewalls 1590, 1591 may each be "on" and may filter packets received from the client side of their respective gateways and the tunnel side of their respective gateways. In this mode, by default, outgoing TCP, UDP, and Internet Control Message Protocol (ICMP) traffic originating on the client side may be allowed to reach the tunnel side. Similarly, the associated return packets from the tunnel side may be allowed to reach the client side. Furthermore, ICMP ping, traceroute traffic, and Domain Name Server (DNS) response traffic (i.e., UDP traffic including responses to a DNS request that originates from a processor on the client side) may also be allowed to reach the client side from the tunnel side. Finally, all other traffic originating from any other source on the tunnel side may be blocked.

The network operations center 610 may prompt the user of the network 1500 to select particular protocols that pass from the tunnel side to the client side. For example, the network operations center 610 may prompt a user of the gateway 1510 to select additional protocols, such as file transfer protocol (FTP), hypertext transfer protocol (HTTP), secure socket layer protocol (SSL), mail retrieval protocols (e.g., POP3), simple mail transfer protocol (SMTP), and remote login protocol (e.g., TELNET). The user may also be prompted to create additional firewall parameters, such as selecting an allowable protocol, port, and direction for packets allowed through a firewall. For example, when a user is prompted to select an allowable protocol, port number, and direction, the user may select a TCP port number at a gateway to serve as a destination port for all TCP/IP packets received from the tunnel side of the firewall.

In another embodiment, a firewall maybe "on" and all client side and tunnel side packets other than packets destined for a tunnel enabled by the network operations center 610 are blocked.

The network operations center 610 may also turn-off the rules associated with a firewall. In this mode, the firewall is essentially "off" and packets are allowed to reach the client side of the firewall from the tunnel side.

Figure 15B:
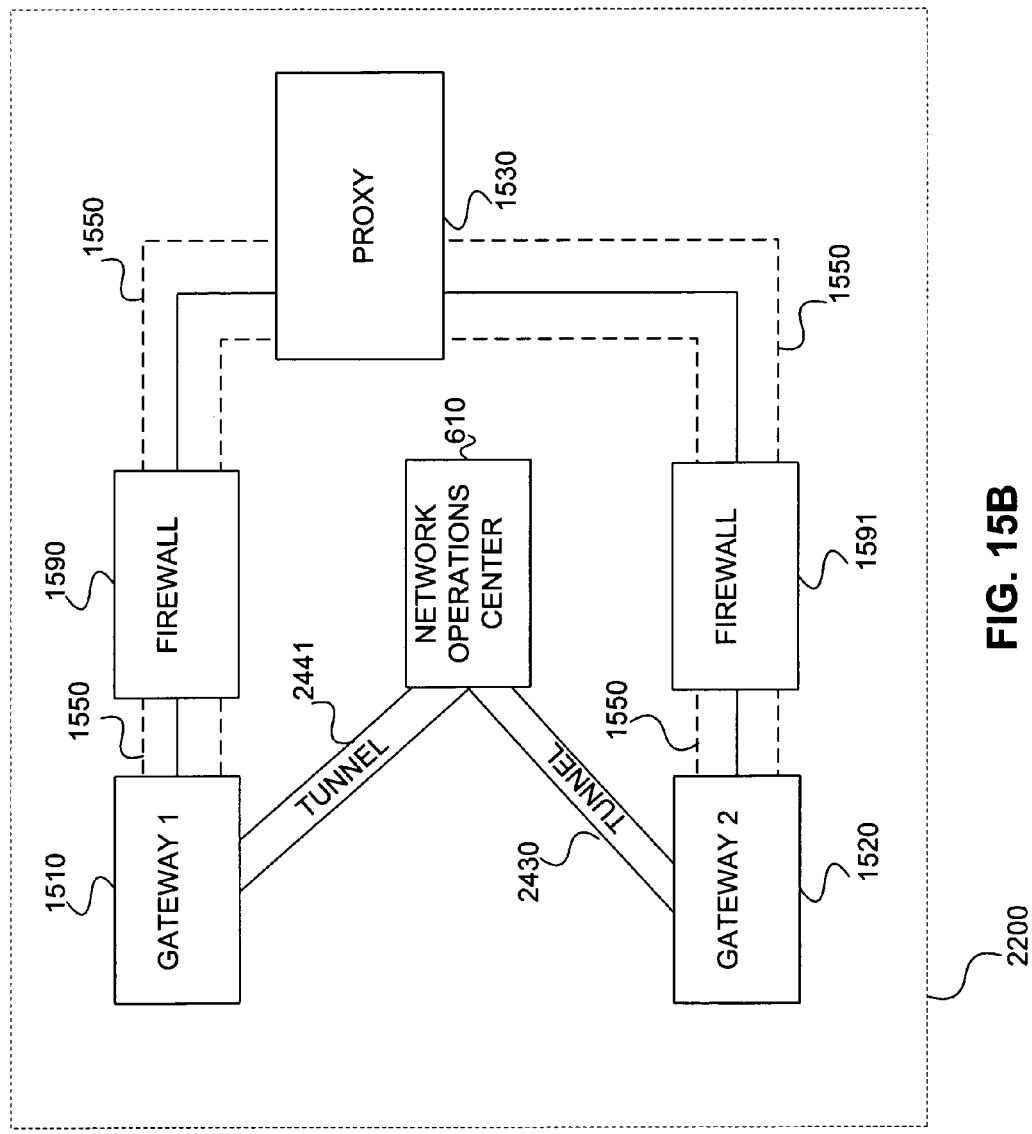
FIG. 15B is another general block diagram of two gateways, each not accessible behind a firewall, in accordance with methods and systems consistent with the present invention.

FIG. 15B illustrates a network 2200 that may be enabled by the network operations center 610 and established through or over a base network, such as the Internet. The network 2200 may include a first gateway 1510, a second gateway 1520, a network operations center 610, a proxy 1530, a first firewall 1590, and a second firewall 1591. The firewalls 1590, 1591 may include one or more rules for selectively restricting communications to and/or from the gateways 1510 and 1520. That is, the first and second gateways may not be accessible behind the firewalls 1590, 1591. In this embodiment, the proxy 1530 may reside in a gateway, the network operations center 610, or any other processor, such as any processor connected to a base network.

When the first gateway 1510 and the second gateway 1520 are behind (i.e., not accessible) the firewalls 1590, 1591, respectively, the first gateway 1510 may not be able to establish an information flow, such as a tunnel directly to the second gateway 1520. Instead, the first gateway 1510 may use the proxy 1530 as a hairpin such that the firewalls 1590, 1591 allow communication between the first and second gateways 1510, 1520, bypassing the firewall rules that restrict the communication. The hairpin may provide a communications medium at the proxy 1530 such that communication between the first and second processor is allowed by the firewalls 1590, 1591.

Figure 15C:
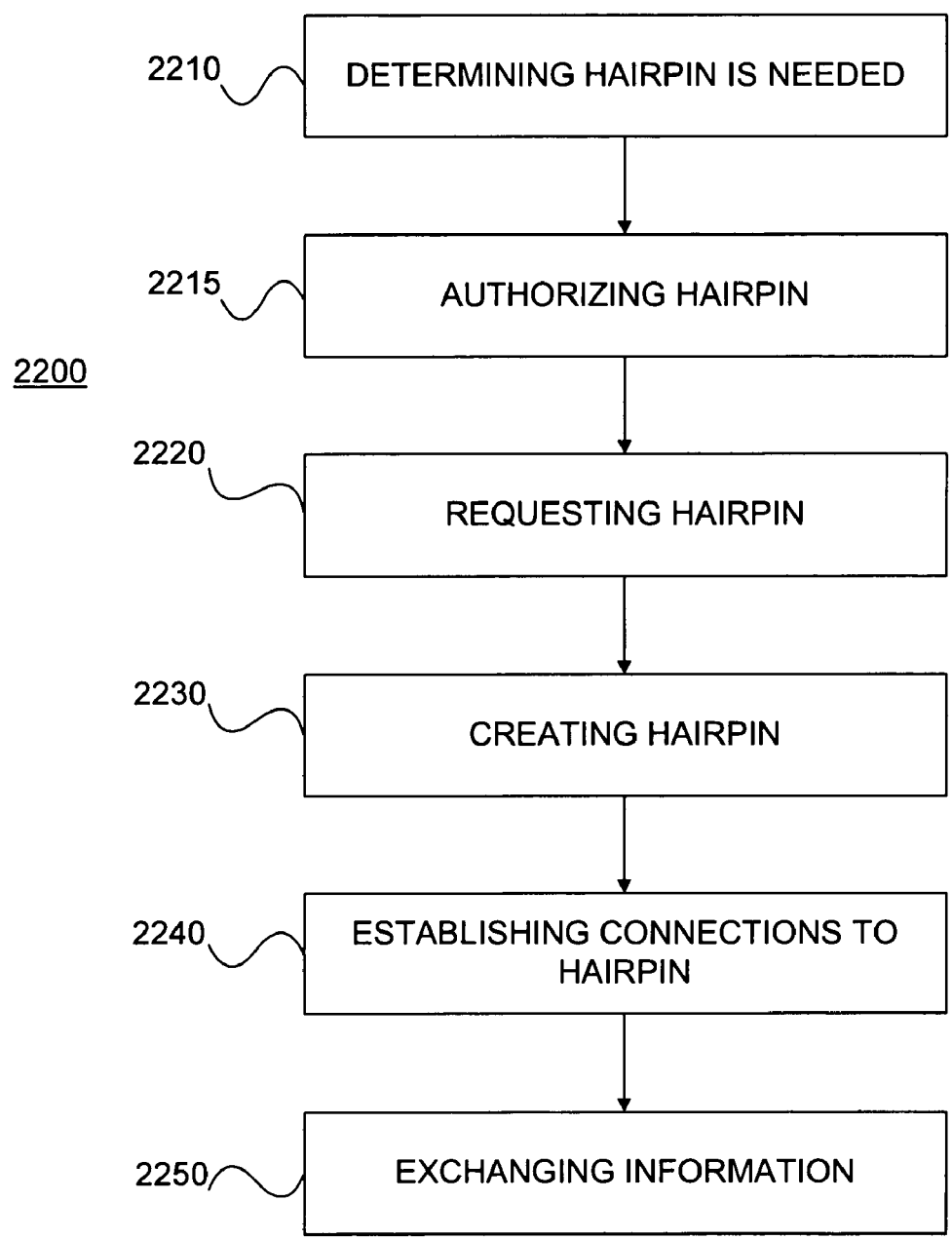
FIG. 15C is an exemplary flow chart for exchanging information between two gateways when firewalls selectively restrict communication between the gateways, in accordance with methods and systems consistent with the present invention.

FIG. 15C is an exemplary flow chart for exchanging information between the first and second gateways 1510 and 1520 when the firewalls selectively restrict communication between these gateways. As noted above, the firewall 1590 may be configured with one or more rules to allow traffic, such as TCP traffic originating from behind that firewall (i.e.

outbound from the first gateway 1510) but not allow arbitrary TCP traffic in (i.e. inbound to the first gateway 1510). Similarly, the firewall 1591 may be configured to allow TCP traffic originating from behind that firewall (i.e. outbound from the second gateway 1520) but not allow arbitrary TCP traffic in (i.e. inbound to the second gateway 1530). But the firewalls 1590, 1591 may selectively permit inbound packets that correspond to outbound packets. For example, the first gateway 1510 may send outbound packets to the proxy 1530 through the firewall 1590. The firewall 1590 may then allow the corresponding inbound packets from the proxy 1530 that return in response to the outbound packets. Accordingly, although the firewalls 1590, 1591 may inhibit establishing a direct connection between the first gateway 1510 and the second gateway 1520, the first and second gateways 1510, 1520 may exchange information by sending their respective packets to the hairpin at the proxy 1530.

To determine that a hairpin is required (step 2210), the first gateway 1510 may determine that the second gateway 1520 is not accessible behind firewall 1591 by reading configuration information associated with the second gateway 1520. For example, when the network operations center 610 provides the first gateway 1510 with a partner list that includes the second gateway 1520, the network operations center 610 may also provide configuration information (e.g., Table 1 above) for the second gateway 1520 that includes whether the second gateway 1520 is accessible behind a firewall. Alternatively, the first gateway 1510 may determine that the second gateway 1520 is not accessible behind the firewall 1591 using a network autodiscovery approach, such as sending packets to an IP address for the second gateway 1520 and waiting for a response from the second gateway 1520. If the first gateway 1510 does not receive a response from the second gateway 1520, the first gateway 1510 may assume that a firewall, such as firewall 1591 selectively restricts access to the second gateway 1520.

To authorize a hairpin (step 2215), the first gateway 1510 may contact the network operations center 610 through a tunnel (e.g., tunnel 2441), requesting the network operations center 610 to enable a hairpin with the second gateway 1520. Similarly, the second gateway may contact the network operations center 610 through tunnel 2430, requesting the network operations center to enable a hairpin with the first gateway 1510. In one embodiment, the network operations center 610 may determine that the first and second gateways 1510, 1520 mutually consent to enabling a hairpin between the first and second gateways 1510, 1520. For example, the network operations center 610 may use the partner list stored in the database server 616 to determine that each of the first and second gateways 1510, 1520 consents to enabling a tunnel between the first and second gateways 1510, 1520. If each of the first and second gateways 1510, 1520 consents to enabling a tunnel, the network operations center 610 may determine that the first and second gateways 1510, 1520 also consent to enabling a hairpin between the first and second gateways 1510, 1520. If the first and second gateways 1510, 1520 consent to enabling a hairpin, the network operations center 610 may then authorize the hairpin for the first and second gateways 1510, 1530 at the proxy 1530. The hairpin may then permit the first and second gateways 1510, 1520 to communicate and thus exchange information even when the firewalls 1590, 1591 may not allow a direct connection between the first and second gateways 1510, 1520.

To request a hairpin (step 2220), the network operation center 610 may send a message to the proxy 1530 to enable the hairpin for the first gateway 1510 and the second gateway 1520. In one embodiment, the message may include addresses, such as IP addresses for the first gateway 1510 and for the second gateway 1520. The message may also include information that limits the hairpin to a time period (e.g., 1 PM–2 PM), a bandwidth, and/or a predetermined quality of service. In one embodiment, the message may be sent from the network operations center 610 to the proxy module 1530 in a secure manner, such as through a tunnel (not shown) between the network operations center 610 and proxy 1530.

To create the hairpin (step 2230), the proxy 1530 may allocate a first port for the first gateway 1510 and a second port for the second gateway 1520. In one embodiment, the first and second ports may include TCP ports although any other types of ports may be used instead, such as UDP ports. The proxy 1530 may also provide the first gateway 1510 with information describing the first port, such as the IP address and port address or number for the first port. Similarly, the proxy 1530 may also provide the second gateway 1520 with information describing the second port. For example, the proxy 1530 may send to the first gateway 1510 a message that includes the IP address and port number for the first port and send to the second gateway 1520 another message that includes the IP address and port number for the second port. In one embodiment, the proxy module 1530 may provide the information describing the first port and the information describing the second port through a tunnel to the network operations center 610 (not shown), which forwards the information describing the first port and the information describing the second port to the tunnels 2441, 2430, respectively.

The proxy 1530 may then initiate a forwarding process. The forwarding process may listen to the first and second ports and forward TCP packets received at the first port to the second port and forward TCP packets received at the second port to the first port.

The first gateway 1510 may then proceed to open an information flow, such as a TCP connection to the first port previously allocated to the first gateway 1510, and the second gateway 1520 may also open a connection to the second port previously allocated to second gateway 1520 (step 2240). For example, the first and second gateways 1510, 1520 may each use the TCP protocol to establish a connection with the first and second ports, respectively. Each of the first and second gateways 1510, 1520 may then send out one or more packets, such as TCP/IP packets to the first and second ports, respectively. The proxy 1530 may then forward TCP/IP packets received from the first gateway 1510 to the second gateway 1520 and forward TCP/IP packets received from the second gateway 1520 to the first gateway 1510, permitting the establishment of the tunnel 1550. In one embodiment, the proxy 1530 may also forward the TCP packets without decoding or decrypting the TCP/IP packets. Accordingly, the first gateway 1510 and the second gateway 1520 may exchange information (step 2250) through the tunnel 1550 using a hairpin at the proxy 1530.

Figure 16A:
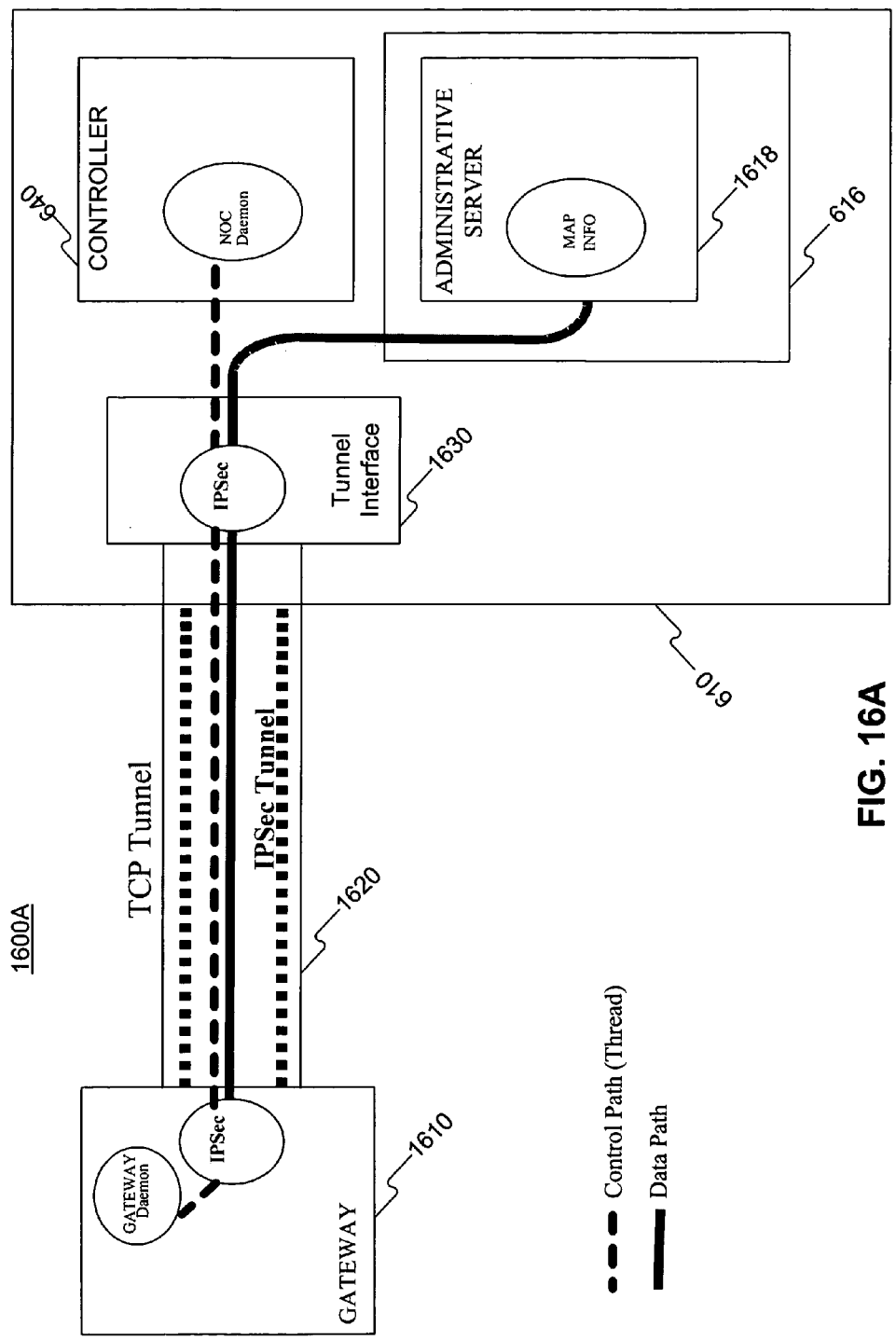
FIG. 16A is a general block diagram of a tunnel between a gateway and a network operations center in accordance with methods and systems consistent with the present invention.

FIG. 16A shows a network 1600A that includes a gateway 1610, a tunnel 1620, and the network operations center 610. The network operations center 610 may include a tunnel interface module 1630, a controller module 640, a database server 616 with an administrative server 1618. The gateway 1610 may include a gateway daemon as described above. The gateway 1610 may include a TCP tunnel driver that generates TCP packets forming a TCP tunnel that encapsulates an IPSec tunnel; an IPSec program code, such as the IPSec program code provided by Free S/Wan to establish the IPSec tunnel; and a virtual device adapter that functions as a virtual network interface card for recognizing a virtual IP address corresponding to the gateway 1610. The tunnel 1620 may include a data path for voice, video, and/or data and a control path for control and monitoring information.

Figure 16B:
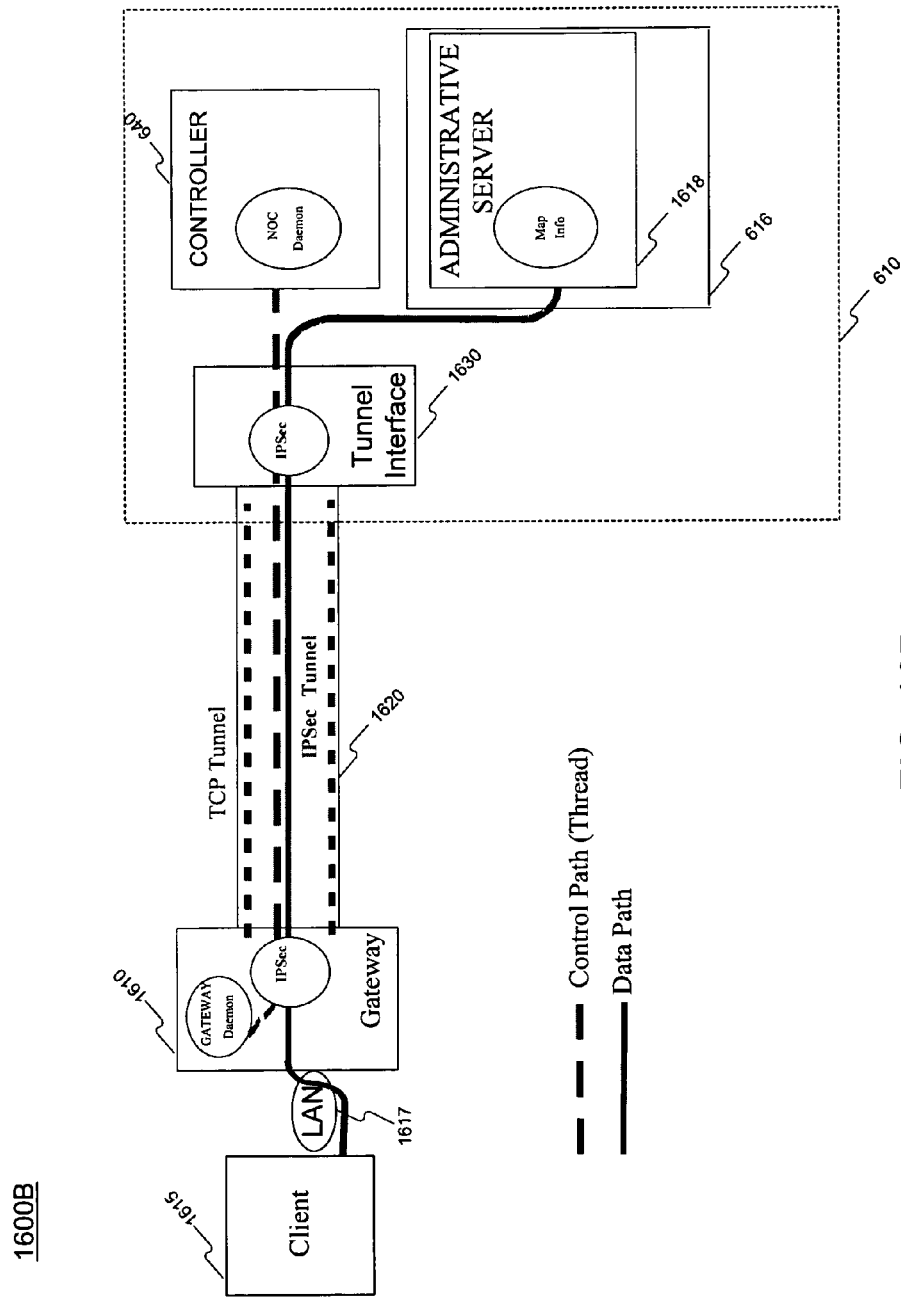
FIG. 16B is a general block diagram of a tunnel between a network operations center and a gateway that includes a client computer in accordance with methods and systems consistent with the present invention.

FIG. 16B illustrates a network 1600B that includes a gateway 1610, a client 1615, a tunnel 1620, the network operations center 610, and a local area network 1617. The client 1615, which may include a processor such as a personal computer or any other processing device, may connect to the gateway 1610 through the local area network 1617. The gateway 1610 may then route the client's 1615 packets through the tunnel 1620 to a destination, such as the network operations center 610. Alternatively, the gateway 1610 may route the client's 1615 packets to other gateways (not shown) through one or more tunnels that are enabled by the network operations center 610.

The client 1615 may also use a data path within the tunnel 1620 to retrieve administrative information from the administrative server 1618. Furthermore, a control path may also be established to the controller 640 through the tunnel interface module 1630. The control path may carry control information, such as out-of-band signaling information for enabling one or more tunnels from the gateway 1610. The control information may include, for example, a partner list exchanged between the network operations center 610 and the gateway 1610.

Figure 17:
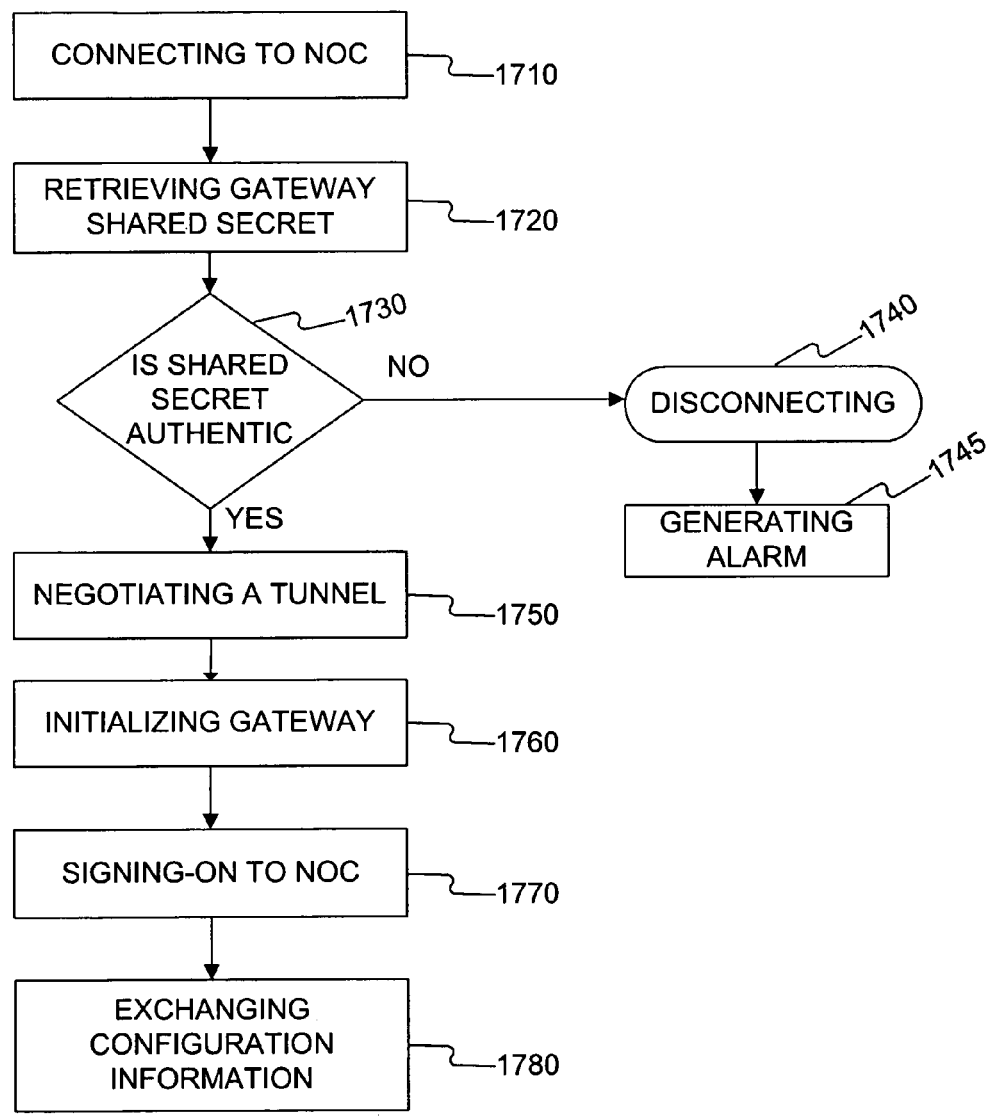
FIG. 17 is an exemplary flow chart for performing the protocol associated with a connection from a gateway to a network operations center in accordance with methods and systems consistent with the present invention.

FIG. 17 is an exemplary flow chart for a protocol that may be implemented to communicate between the gateway 1610 and the network operation center 610 shown in FIG. 16A. The gateway 1610 may connect to the tunnel interface module 1630 in the network operations center (NOC) 610 using a TCP tunnel (step 1710) and provide to the tunnel interface mode 1630 a virtual IP address and shared secret to authenticate with the network operations center 610.

The tunnel interface module 1630 may use the virtual IP address of the gateway 1610 to search and retrieve a shared secret stored within the network operation center 610 (step 1720). The shared secret may consist of a simple password, a simple bit string, a public key, or an MD5 hash. Alternatively, a public portion of a Public-Private Key pair may be used for authentication. If the shared secret provided by the gateway 1610 is authentic and thus corresponds to the shared secret that is stored for the gateway 1610 (step 1730), the gateway 1610 may proceed to negotiate a TCP tunnel (step 1750) with the tunnel interface module 1630. If the shared secret is not authentic (step 1730), the tunnel interface module 1630 may disconnect the gateway 1610 (step 1740) and generate an alarm (step 1745).

To initialize the gateway (step 1760), the gateway 1610 may send to the tunnel interface module 1630 an initiation message that includes a public portion of the Public-Private Key (PPK) pair (i.e., generated with the RSA algorithm) and a name for the gateway 1610 (step 1750). In one embodiment, program code compliant with RSA signature algorithm, such as RSAsig program code included in the Free S/WAN may be used to generate the public part of the key pair.

The network operations center 610 may determine whether to accept or reject a tunnel requested by the gateway 1610 by authenticating that gateway based on the shared secret.

The gateway 1610 may first request to sign-on to the network operations center 610 (step 1770). The network operations center 610 may then acknowledges the sign-on request. The gateway 1610 may then proceed to sign-on to the network operations center 610 (step 1770). This permits the gateway 1610 and the network operations center 610 to exchange configuration information (step 1780) including, for example, a partner list for the gateway 1610; virtual IP addresses and real IP addresses for the gateway 1610, network operations center 610, and any other gateways on the partner list for the gateway 1610; and/or public key information for authenticating the gateway 1610 with other gateways and the network operations center 610. In one embodiment, the configuration information is exchanged using XML files. Further, as the configuration of the gateway 1610 changes, the network operations center 610 may broadcast the configuration information to any other gateway listed on the partner list of the gateway 1610. Although FIG. 16A shows one gateway (e.g., the gateway 1610), a plurality of gateways (not shown) may connect to the network operations center 610 by performing the steps shown in FIG. 17.

Network operations center 610 may provide a means for a client 1615 to establish a connection via a tunnel of the gateway 1610 to the network operations center 610. Although FIG. 16B shows one client 1615, a plurality of clients (not shown) may be connected to the gateway 1610. If a plurality of clients are connected to the gateway 1610, each of the clients may access one or more tunnels to the network operations center 610 through the LAN 1617 and the gateway 1610. Accordingly, each of these clients may participate in the virtual private network of FIG. 16B.

Table 1 lists exemplary Extensible Markup Language (XML) name value pairs provided by the network operations center 610 for configuring a gateway. For example, a gateway may receive the configuration information for itself and for each gateway on its partner list. Moreover, a gateway may receive this XML information whenever the gateway is connected to the network operations center 610.

Referring to Table 1, the network operations center 610 may provide each gateway enabled by the network operations center with one or more of the following: a gateway name, a domain name for the virtual private network, a virtual Internet Protocol (IP) address, and a public IP address visible to the Internet 620. Moreover, the network operations center 610 may provide information describing one or more of the following: whether a gateway is accessible behind a firewall; a network configuration for a gateway; whether a dynamic host configuration protocol (DHCP) is used at a gateway; IP addresses of the primary and secondary domain name servers associated with a local area network interfacing a gateway; and an IP address of a local IP proxy device providing Internet access to a local area network interfaced to a gateway.

Table 2 lists exemplary XML name value pairs provided by the network operations center for configuring a media access layer interface (e.g., an Ethernet interface) at a gateway configured by the network operations center 610. Moreover, the gateway may receive this configuration information for itself and each gateway on its partner list. The network operations center 610 may provide a name for the media access interface, a local IP address for the media access interface, a gateway IP address for the media access layer interface associated with the gateway, a subnet mask for the media access layer interface associated with the gateway, and whether addresses for the media access layer interface are assigned using a DHCP.

TABLE 1

Configuration Information

```
<local computer information>
computer_name =         "org5"
domain_name =           "bugwheat2"
virtualip_address =     "10.0.11.130"
visibleip_address =     "208.185.39.2"
firewall_in_place =     "no"
network_config =        "Inline (i.e., GATEWAY AND IAD)"
dns_from_dhcp =         "no"
dns_primary =           "10.10.10.2"
dns_secondary =         "10.10.10.3"
ProxyIp =               "208.185.40.2"
</local computer information>
```

TABLE 2

Local Interface Information

```
<local interface information>
name =                  "eth0"
mac_layer_address =     "00:90:27:EE:02:3B"
local_IP_address =      "208.185.39.2"
gateway =               "208.185.39.1"
subnet_mask =           "255.255.255.0"
dhcp =                  "none"
</local interface information>
```

Table 3 lists exemplary XML name value pairs provided by the network operations center for a local area network interfacing a gateway. Moreover, the gateway may receive the information for itself and each gateway on its partner list.

For example, the network operations center 610 may provide a gateway with information describing a local area network, such as the local area networks 661, 660 interfacing each of the gateways 650, 651 shown in FIG. 6A. The XML name value pairs may include configuration information describing an IP address range for the local area network, describing one or more members of an Access Control List and whether to include a tunnel access privilege for each member of the Access Control List, and specifying a gateway address for a subnet interfacing the local area network.

TABLE 3

Local_LAN_Information

```
<local LAN Information><address range>
    startip_address_range =     "208.185.49.1"
    endip_address_range =       "208.185.49.255"
    Type =                      "included"
    Gateway =                   ""
</address range>
</local_LAN_Information>
```

Table 4 lists exemplary XML name value pairs for cryptographic information provided by the network operations center 610 to a gateway. For example, a gateway may receive the cryptographic information for itself and each gateway on its partner list. The network operations center 610 may provide the cryptographic information to enable an encrypted information flow, such as an encrypted tunnel between the gateway and another gateway or the network operations center 610. This cryptographic information may include the type of encryption algorithm, format (e.g., standard associated with the algorithm), the key information for the algorithm (e.g., a public key), and other parameters for the encryption algorithm.

TABLE 4

Cryptographic Information

```
<cryptographic key>
Kind =              "PublicKey"
Type =              "NOC's_Primary_Key"
Format =            "RSA"
Encryption =        "3DES"
Modulus =           "0x . . . 01"
modulus_bits =      "1024"
public_exp =        "0 x 03"
</cryptographic key>
```

Table 5 lists exemplary XML name value pairs for firewall information provided by the network operations center 610 to a gateway. For example, the gateway may receive the firewall information for itself and each gateway on its partner list. The firewall information may modify and/or configure a firewall and may include rules for the firewall, such as the protocol type permitted to traverse the firewall, a direction for the permitted protocol, allowable source and destination addresses (e.g., IP addresses and port addresses), a flag to enable the rules, a name for each rule, whether to accept packets from another firewall, and a number indicating the order in which rule is executed in a firewall.

In one embodiment, Tables 1–5 may be stored in the network operations center 610 and indexed according to gateway name and/or virtual IP address of a gateway.

Table 6 lists exemplary XML name value pairs for monitoring information received by the network operations center 610. In one embodiment, a gateway may provide monitoring information about tunnels enabled by the network operations center 610. This monitoring information may permit the network operations center 610 to monitor the latency and bandwidth associated with a tunnel. For example, every 5 minutes a gateway may send to the network operations center 610 information corresponding to the accumulated number of packets and bytes transmitted at the gateway; the accumulated number of packets received at the gateway; the minimum round-trip time, maximum round-trip time, and 5 minute average round-trip time (i.e., in milliseconds) for packets traveling between the gateway and each gateway on the partner list of the gateway.

TABLE 5

Firewall Information

```
<firewall rule>
    protocol = "tcp"
    direction = "in"
    src_ip_mask = "$any"
    src_port = "1024:65535"
    dst_ip_mask = "$1"
    dst_port = "21"
    action = "ACCEPT"
    rule_number = "1"
<firewall rule>
```

TABLE 6

Monitoring Information

```
<bandwidth>
    time_of_day =       "1800Z"
    interval =          "5"
    xmit_packets =      "10000"
    xmit_bytes =        "160000"
    rcv_packets =       "5"
```

TABLE 6-continued

Monitoring Information

| | |
|---|---|
| rcv_bytes = | "40" |
| </bandwidth> | |
| <latency> | |
| tod = | "1800Z" |
| interval = | "500" |
| minimum = | "50" |
| maximum = | "500" |
| average = | "100" |
| </latency> | |

Figure 18:
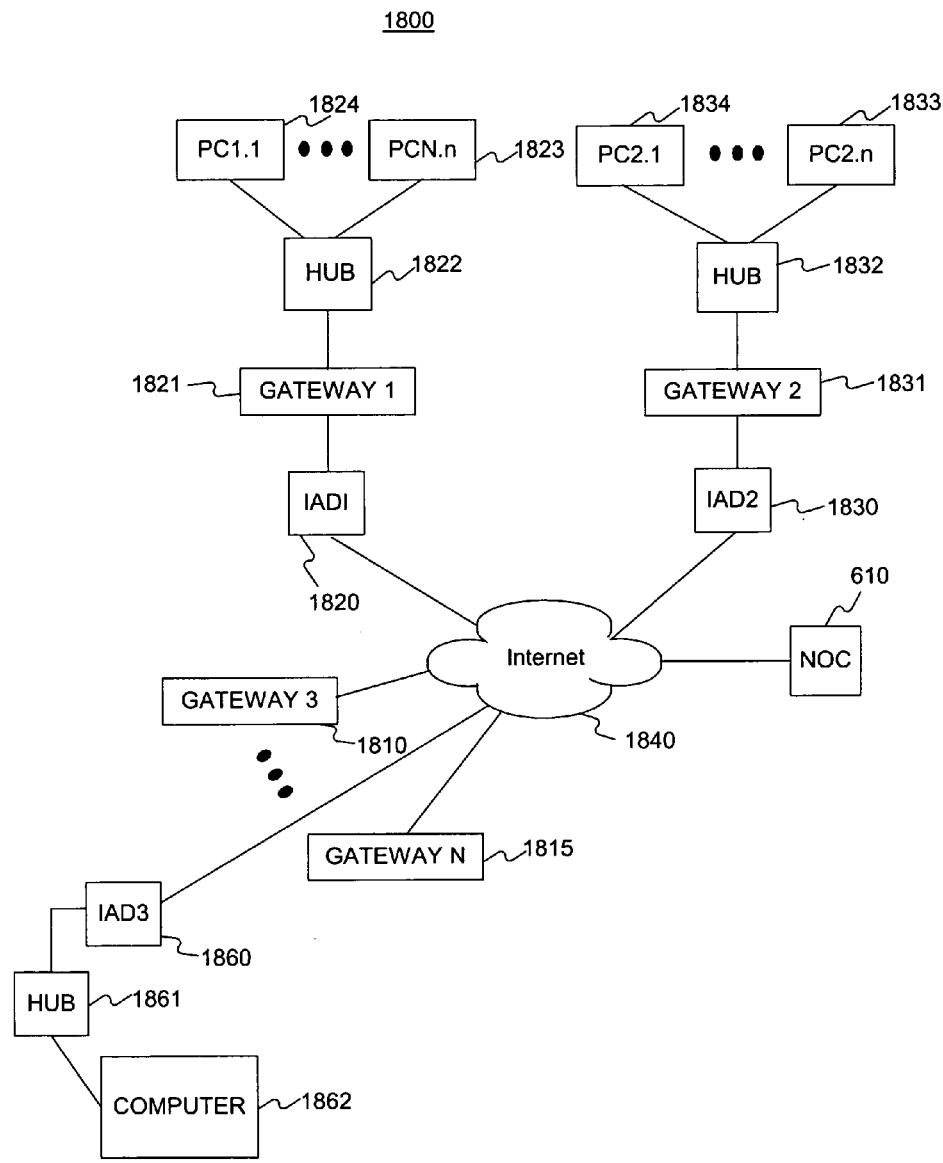
FIG. 18 is a general block diagram of an alternative exemplary network in accordance with methods and systems consistent with the present invention.

FIG. 18 shows a network 1800 including one or more client computers 1824, 1823 connected to a hub 1822 that interfaces a first gateway 1821. The first gateway 1821 may interface the Internet 1840 through an Internet Access Device (IAD) 1820 (see, e.g., IAD1 in FIG. 18). The hub, gateway, and IAD may be in an in-line configuration. The network 1800 may also include one or more client computers 1834, 1833 that are connected to a hub 1832 interfacing a second gateway 1831. The second gateway 1831 may connect to a second IAD 1830 that provides access to the Internet 1840. The network operations center 610 may also interface the Internet 1840. Although the in-line configuration is shown, other configurations of the network 1800 may also be implemented. For example, the hub 1822 may connect directly to the IAD 1820 instead of connecting to the gateway 1821.

A tunnel may be enabled between the first gateway 1821 and the second gateway 1831 by the network operations center 610. Once established, the tunnel may pass through the IAD 1820, the Internet 1840, and an IAD 1830.

Figure 19:
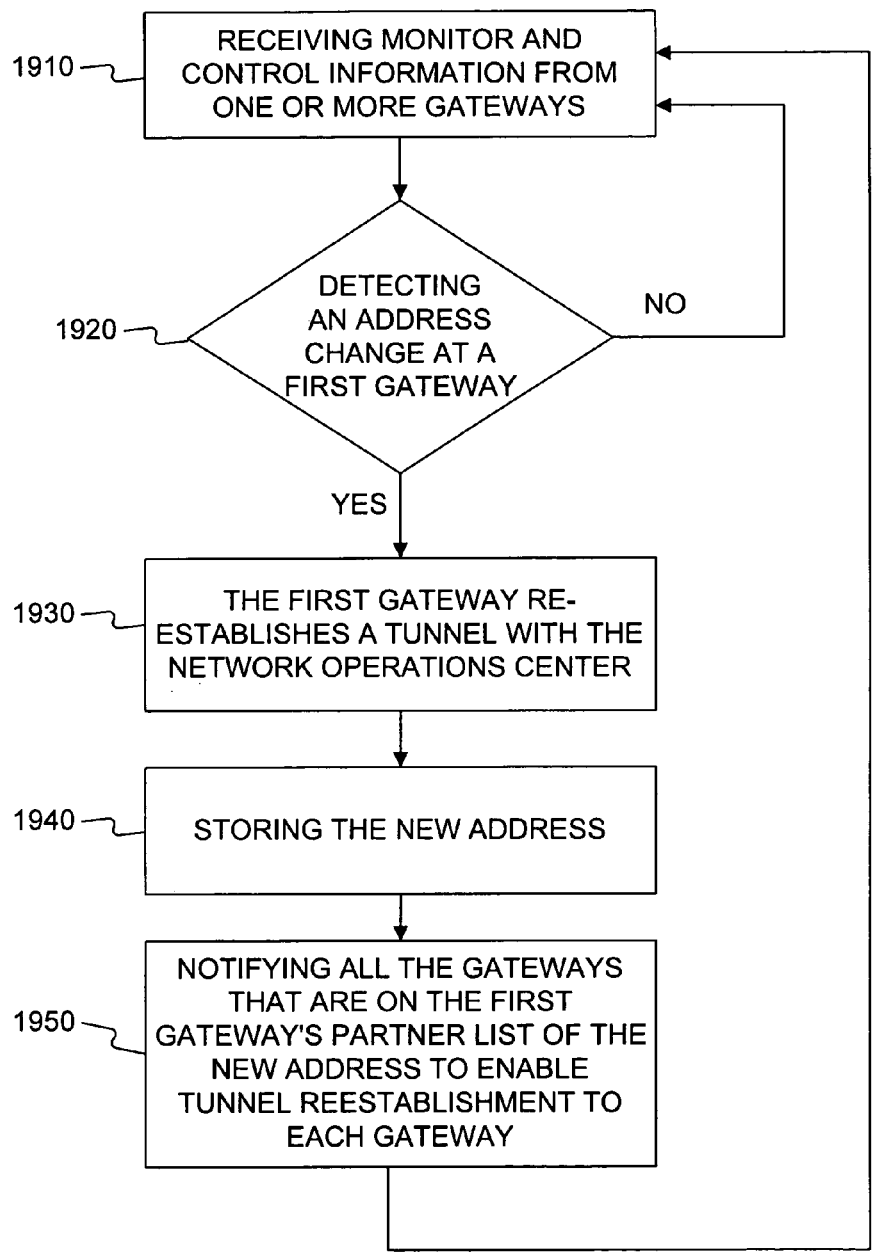
FIG. 19 is an exemplary flow chart for detecting an address change in a network in accordance with methods and systems consistent with the present invention.

FIG. 19 is an exemplary flowchart for detecting address changes in the network 1800 shown in FIG. 18. The network operations center 610 may establish a first tunnel (not shown) to the first gateway 1821 and a second tunnel (not shown) to the second gateway 1831. Each of these tunnels may be established through a base network, such as the Internet 1840 and may permit the network operations center 610 to exchange information including, for example, configuration information and/or monitoring information (see, e.g., Tables 1–6 above) with each of the gateways 1821, 1831 (step 1910).

To detect an address change (step 1920), the network operations center 610 may monitor the status of each gateway 1821, 1831 through the first and second tunnels, respectively. When a real or public address, such as a real or public IP address of gateway 1821 changes, the network operations center 610 may detect the change by determining that the first tunnel between the network operations center and the gateway 1821 is terminated. For example, when an Internet Service Provider (ISP) changes the public IP address associated with the IAD 1820, the network operations center 610 may drop the first tunnel to the first gateway 1821 and detect an address change at the first gateway 1821 (step 1920). The gateway 1821 may then use its new IP address (i.e., the new public IP address associated with the IAD 1820) to reestablish the first tunnel to the network operations center 610 (step 1930) by performing the steps shown in FIG. 17.

Before reestablishing the first tunnel, the network operations center 610 may first authenticate the gateway 1821 (e.g., using a public key for gateway 1821). Once the first tunnel is reestablished, the network operations center 610 may then store the new IP address associated with the gateway 1821 (step 1940) and inform other gateways as to the new IP address (step 1950).

When the public IP address (i.e., the real IP address) of the first gateway 1821 changes, the second gateway may 1831 also drop a third tunnel (not shown) between the second gateway 1831 the first gateway 1821. The first gateway 1821 and the second gateway 1831 may then proceed to reestablish the third tunnel after the first gateway 1821 authenticates with the network operations center 610 and provides the public IP address to the network operations center 610. Although FIG. 18 is described in connection with only two gateways, additional gateways (e.g., the gateways 1810–1815) may also be added to a virtual network, such as a virtual private network enabled by the network operations enter 610.

In the embodiment of FIG. 18, when additional gateways (e.g., the gateways 1810 through 1815) are present and are included in the partner list of the first gateway 1821, the network operations center 610 may notify the additional gateways and/or computer 1862 as to the new public IP address of the first gateway 1821 (step 1950). For example, the network operations center 610 may broadcast the new public IP address to all of the gateways on the partner list of the first gateway 1821.

Figure 20:
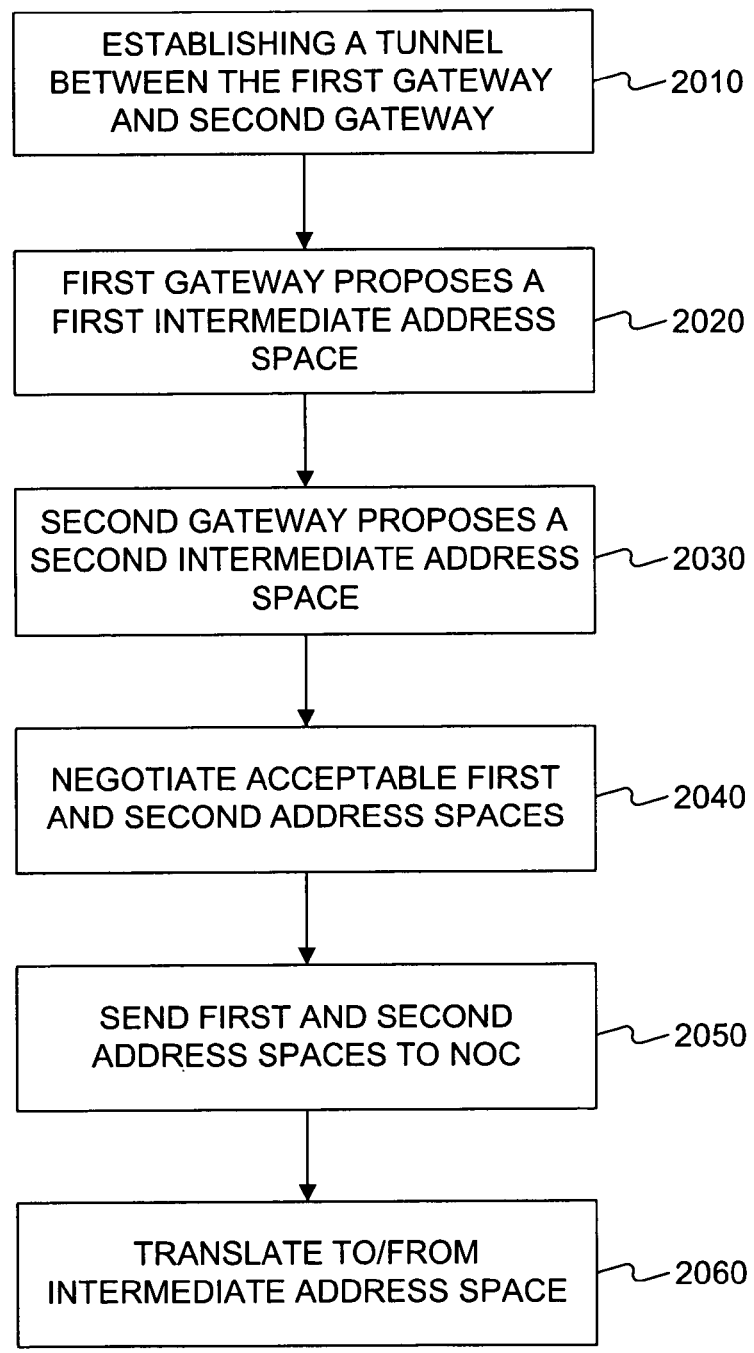
FIG. 20 is an exemplary flow chart for resolving address conflicts in a local network in accordance with methods and systems consistent with the present invention.

FIG. 20 is an exemplary flow chart for resolving IP address conflicts in a local area network interfacing a gateway. One or more client computers 1823, 1824 interfacing the first gateway 1821 may use IP addresses that are local or private and conflict with the local IP addresses of the client computers 1834, 1833 interfacing the second gateway 1831. For example, the locally assigned IP address associated with the clients 1823, 1824 of the first gateway 1821 may be identical and thus may conflict with the locally assigned IP addresses associated with the clients 1833, 1834 of the second gateway 1831. This address conflict may be possible because the IP addresses of the client computers 1824, 1823 may be private or local addresses that are routable within the local area network served by the first gateway 1821. Thus, if a client of the first gateway 1821 has the same IP address as a client of the second gateway 1831, information may not be routed between the clients with conflicting addresses. Although detecting such address conflicts may be applicable in various environments, when an extranet is established, a client may be external to an organization and thus may use a local address that is not compatible with the local addresses used on the organization's network, such as the organization's intranet, wide area network, or local area network.

An address conflict may be detected when the first gateway 1821 establishes a tunnel to the second gateway 1831 (step 2010). For example, the first gateway 1821 may receive an IP address range (see, e.g., Table 3) for the second gateway 1831 and determine that an address conflict exists. When an address conflict exists during the establishment of the tunnel between the first gateway 1821 and the second gateway 1831, the first gateway 1821 may propose a first intermediate address space (step 2020). The second gateway 1831 may propose a second intermediate address space (step 2030). Each gateway 1821, 1831 may then negotiate an intermediate address space that does not conflict with the range of local addresses for the clients interfacing the gateway.

To negotiate the first intermediate address space and the second intermediate address (step 2040), the second gateway 1831 may accept the first intermediate address space proposed by the first gateway 1821 if the second gateway 1831 finds the first intermediate address space acceptable. An address space may be acceptable when the proposed address space does not conflict with the second gateway's

1831 local addresses. If the second gateway 1831 does not find the first intermediate address space acceptable, the second gateway may request from the first gateway 1821 another first intermediate address space If the first gateway 1821 finds the second intermediate address space proposed by the second gateway 1831 acceptable, the first gateway 1821 may accept the second intermediate address space. If the first gateway 1821 does not find the second intermediate address space acceptable, the first gateway 1821 may request another second intermediate address space from the second gateway 1831.

The first gateway 1821 and the second gateway 1831 may provide the range of addresses in the first intermediate address space and the second intermediate address, respectively, to the network operations center 610 (step 2050). For example, the first gateway 1821 and the second gateway 1831 may send the first and second virtual address intermediate address ranges to the network operations center 610 through the first and second tunnels, respectively.

To translate the address of a packet based on the first intermediate address space and the second intermediate address space (step 2060), the first gateway 1821 may convert addresses, such as the IP addresses of packets destined for the second gateway 1831 into the first intermediate address space. The second gateway 1831 may then detect the packets addressed in the first intermediate address space. Similarly, the second gateway 1831 may convert the IP addresses of packets destined for the first gateway 1821 into the second intermediate address space. The first gateway 1821 may also detect the packets addressed in the second intermediate address space. Consequently, each gateway may be responsible for determining if a local address conflict exists with another gateway; resolving the address conflict; and translating addresses of the packets to and from the negotiated address space such that the translation is transparent to clients interfacing each gateway.

As additional gateways are added to the network 1800, each additional gateway may establish one or mores tunnels enabled by the network operations center 610 (step 2010); propose and negotiate an intermediate address space(s) if an address conflict exists with another gateway (steps 2020–2040); send the intermediate address space(s) to the network operations center 610 (step 2050); and translate packets to and from the negotiated intermediate address spaces(s) (step 2060).

For example, when a third gateway 1810 is added to the network 1800, the third gateway 1810 may establish a tunnel enabled by the network operations center 610 to the first gateway 1821 (step 2010). The third gateway 1810 may also perform the steps 2020–2060 if an IP address conflict exists with the clients 1824, 1823 of the first gateway 1821. The third gateway 1810 may then establish a tunnel to the second gateway 1821 and perform steps 2020–2060 if an address conflict exists with the clients 1834, 1833 of the second gateway 1831. As each gateway is added to the network 1800, the added gateway may negotiate an intermediate address space with each existing gateway to resolve any local address conflicts. Accordingly, one or more intermediate address spaces may be negotiated in a pair-wise manner between pairs of gateways enabled by the network operations center 610.

Figure 21:
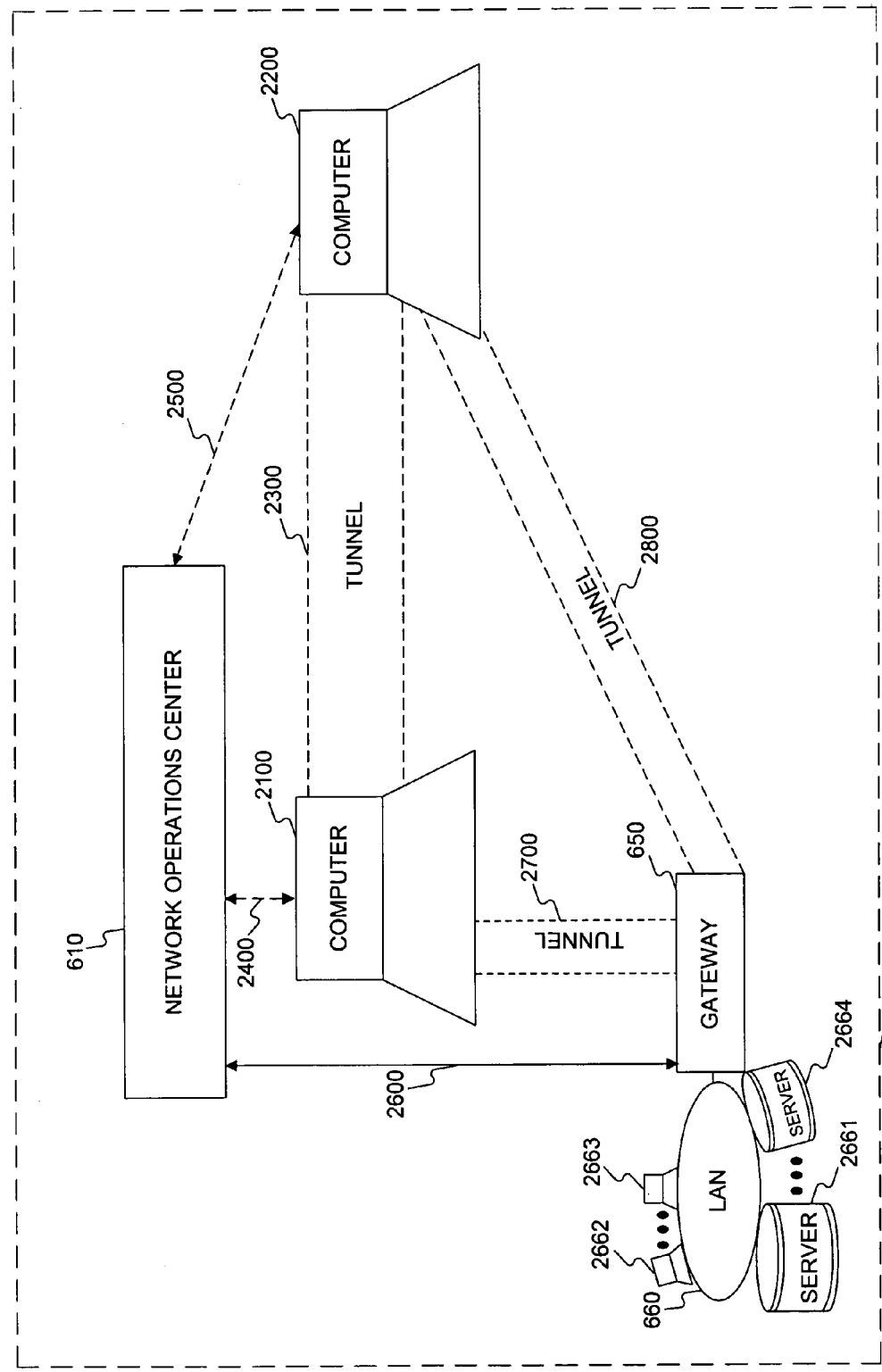
FIG. 21 is a general block diagram of another exemplary network in accordance with methods and systems consistent with the present invention.

FIG. 21 is a block diagram of another exemplary virtual private network 2000 enabled by the network operations center 610. The network 2000 may include a first computer 2100, a second computer 2200, a network operations center 610, and a gateway 650 connected to a local area network 660 that includes one or more host or client computers 2662, 2663 and servers 2661, 2664. Moreover, the network 2000 may include one or more tunnels 2300, 2700, 2800 enabled by the network operations center for exchanging information between first computer 2100, second computer 2200, and gateway 650 and one or more tunnels 2400, 2500, and 2600 for exchanging information including configuration information and/or monitoring information (see, e.g., Tables 1–6) with the network operations center 610.

The host computers 2662, 2663 and servers 2661, 2664 may include computers similar to the host computers 154, 155. Furthermore, the servers 2661, 2664 may include servers that support printing, file sharing, electronic mail, image storage, video storage, application hosting, hosting network services, and other functions capable of being hosted on a server.

The first 2100 computer 2200 may include processors, such as the host computers 154 and 155. In one embodiment, the first computer 2100 and the second computer 2200 may include a Windows™ operating system. Alternatively, the first computer 2100 and the second computer 2200 may include a Linux operating system. The first computer 2100 and the second computer 2200 may each be capable of establishing tunnels enabled by the network operations center 610.

The first computer 2100 and the second computer 2200 may be part of different subnets. If that is case, the network operations center 610 may assign a virtual IP address to the first computer 2100 and another virtual IP address to the second computer 2200 and resolve any local address conflicts using, for example, the steps shown in FIG. 20. Unlike the gateway 650 that routes information to host computers 662, 663 and servers 661, 664, the first computer 2100 and the second computer 2200 are stand-alone computers that may route packets to a tunnel 2300, 2700, 2800. Moreover, unlike the gateway 650 that may maintain a dedicated control path 2600 to the network operations center 610, the first computer 2100 and second computer 2200 may each connect to the network operations center 610 through tunnels 2400, 2500 when required to exchange control and/or monitoring information with the network operations center 610.

To enable a tunnel between the first and second computers 2100, 2200, the network operations center 610 may enable the tunnel 2300 between the first and second computers 2100, 2200 after the first and second computers 2100, 2200 perform the steps shown in FIG. 17 (see, e.g., steps 1710–1780). For example, in the embodiment of FIG. 21, the first computer 2100 may connect to the network operations 610 through the tunnel 2400 to exchange information, such as Tables 1–6 above. This information may include an indication that the first computer 2100 consents to the establishment of the tunnel 2300 with the second computer 2200. The second computer 2200 may also connect to the network operations 610 through the tunnel 2500 to exchange information and to indicate consent to enabling the tunnel 2300 between the first computer 2100 and the second computer 2200.

After indicating consent and the network operation center 610 enabling the tunnel 2300, the first computer 2100 and/or the second computer 2200 may disconnect the tunnels 2400, 2500 and establish the enabled tunnel 2300.

The first computer 2100 and/or the second computer 2200 may reconnect tunnels 2400, 2500 to the network operations center when necessary to exchange information. For example, if the address of the first computer 2100 changes, the second computer 2200 may drop the tunnel 2300 to the first computer 2100. The first computer 2100 may reestablish the tunnel 2400, authenticate with the network operations center 610, and provide a new IP address for the first computer 2100. Similarly, the second computer 2200 may reestablish the tunnel 2500, authenticate with the network operations center 610, and receive the new IP address for the first computer 2100. The first computer 2100 and second computer 2200 may then disconnect the tunnels 2400, 2500 to the network operations center 610 and reestablish the tunnel 2300.

If the first computer 2100 has limited communications capability, a user of the first computer 2100 may dial in to the network operations center 610 using a wired or wireless Internet connection to create the tunnel 2400. For example, the first computer 2100 may include a mobile processor, such as a laptop computer, a personal digital assistant, or an Internet appliance or any other processor capable of establishing one or more tunnel enabled by the network operations center 610. Using the first computer 2100, the user may exchange over the tunnel 2400 configuration information to enable one or more tunnels. The first computer 2100 may then disconnect the tunnel 2400 to the network operations center 610 and then establish a tunnel 2700 to the gateway 650 to exchange information securely with the host computers 2662, 2663 or servers 2661–2664 interfacing the gateway 650 through the local area network 660. As a result, the user of the first computer 2100 may exchange information securely in mobile and/or wireless environments.

In the embodiment of FIG. 21, the network operations center 610 may also enable one or more tunnels between networks that are administered independently of each other or are otherwise incompatible with each other, thus enabling instant extranets. For example, if a user seeks to provide limited access through gateway 650 to one or more resources of LAN 660, such as a server 2661, the gateway 650 may consent to enabling a tunnel from an external network or processor, such as computer 2100 and/or computer 2200. In one embodiment, the computers 2100, 2200 may not have addresses, protocols, or security features that are compatible with those of the gateway 650. Moreover, the gateway 650 may deny the computers 2100, 2200 access to other resources on the LAN 660, limiting access only to the server 2664 based on an access control list provided by the network operations center 610.

As previously discussed with reference to FIG. 21, one or more tunnels may be enabled between gateways to form a extranet. For example, if the "ABC Corp." wishes to make its marketing gateway, named "ABC.mkting," available to the "XYZ Corp.," an administrator may export the "ABC-.mkting" gateway to the XYZ Corp. domain in general or solely to a single gateway in the XYZ Corp. domain. Such a network, is commonly referred to as an extranet.

Figure 22:
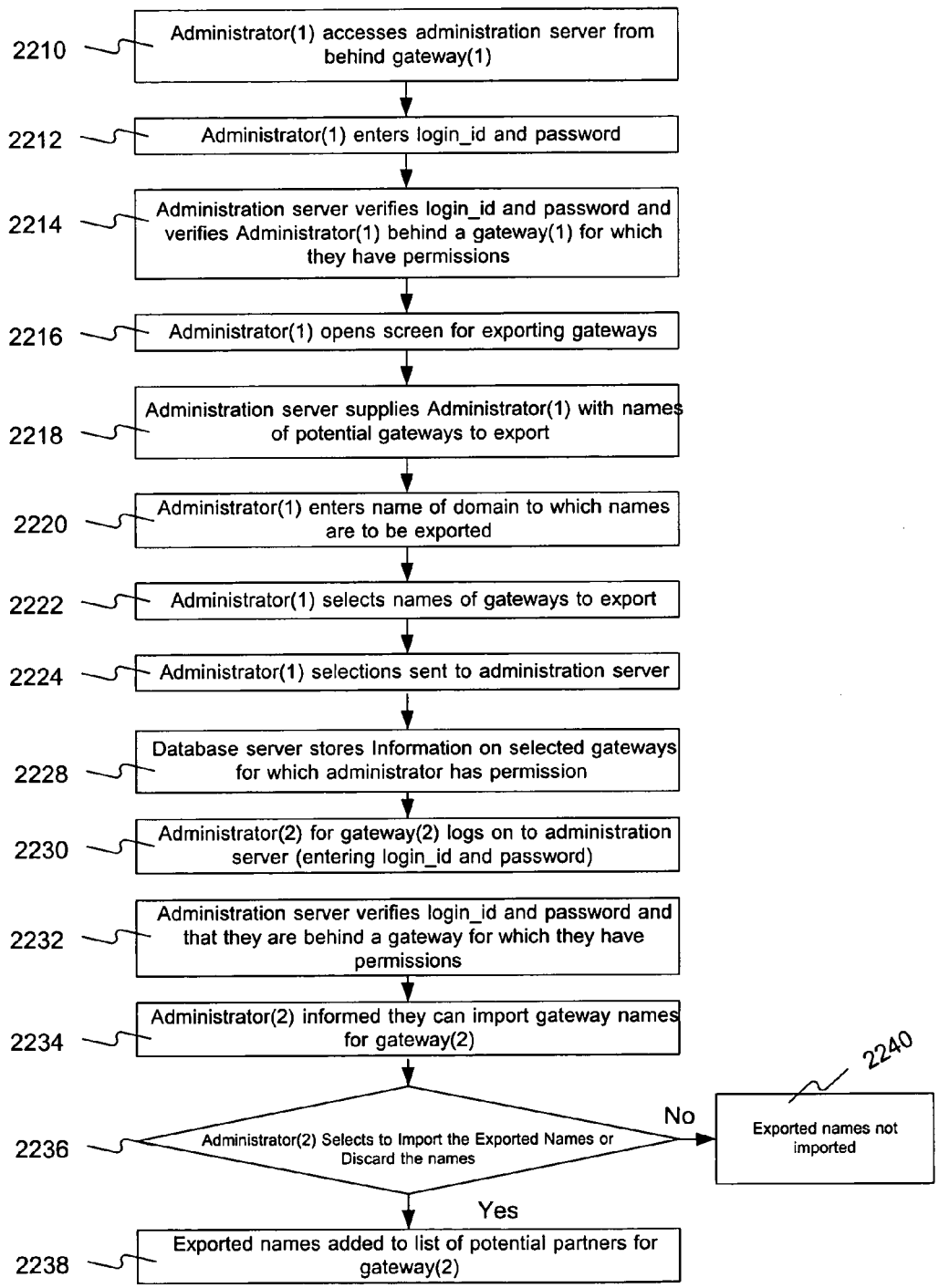
FIG. 22 illustrates a flow chart for an exemplary method for establishing an extranet, in accordance with methods and systems consistent with the invention.

FIG. 22 illustrates an flow chart of an exemplary method for establishing an extranet, in accordance with methods and systems consistent with the invention. This flow chart is discussed below with reference to previously discussed FIG. 4. As previously discussed, the control system 175 may include a network operations center 610 including an administrative server 615.

First, an administrator using computer 401 may connect through tunnel 425 and gateway 450 to the administrative server 615 of the network operations center 610 (S2210). The administrator may use a web browser or a specific piece of software for providing a graphical user interface (GUI) to connect and exchange information with administrative server 615. After connecting to the administrative server 615, the administrator may be prompted to enter a login id and password (S2212). This information may then be sent to the server, which may verify whether the login id and password correspond to a valid administrator (S2214). Further, the administrative server 615 may preferably verify that the administrator is connecting to the administrative server 615 through a gateway to which the administrator has authorized access. Next, the administrator of the gateway 450 may access a web page provided by the network operations center 610 for exporting gateways and for establishing an extranet (S2216). After which, the administrative server 615 may send to the administrator's computer 401 the names of all the gateways in the gateway 450's domain (S2218). The administrator may then enter the name of a gateway for which the administrator wishes to establish an extranet, such as for example, a gateway belonging to a different domain and administered independently of gateway 450 (S2220).

Figure 23:
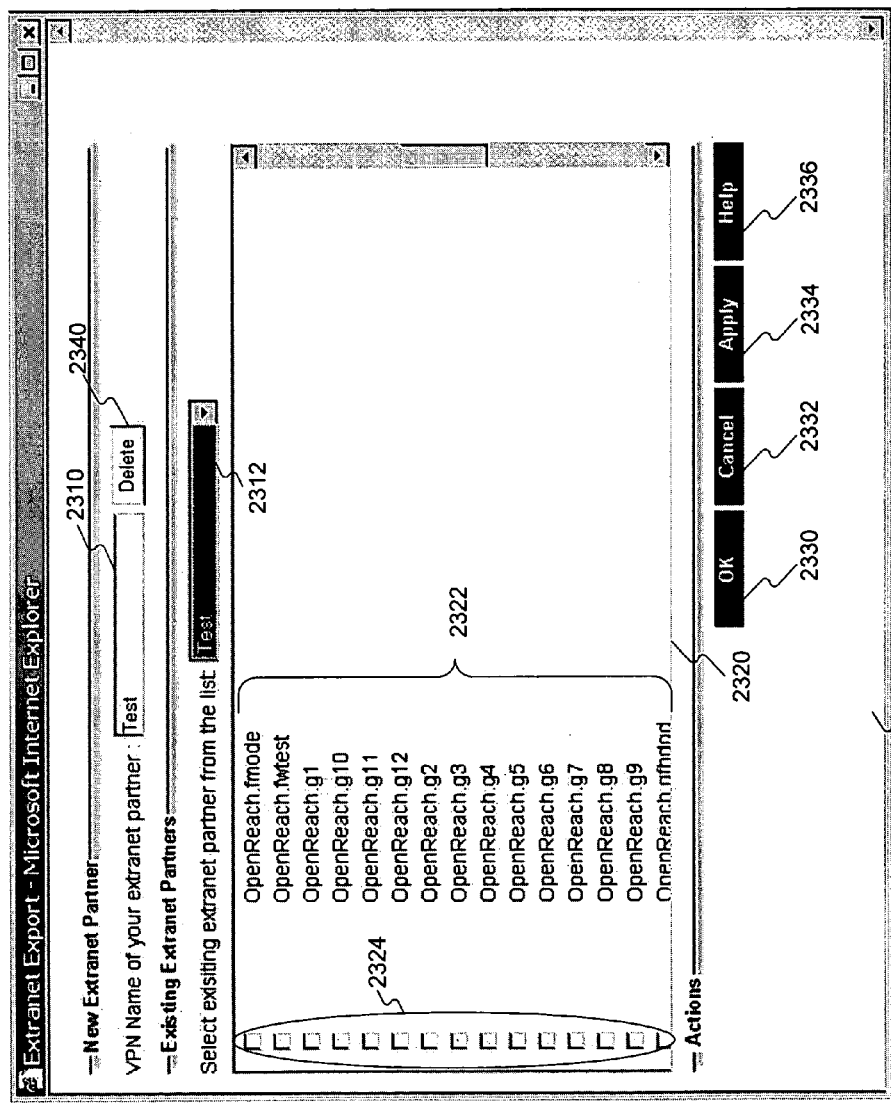
FIG. 23 illustrates an exemplary graphical user interface for exporting gateways in establishing an extranet, in accordance with methods and systems consistent with the invention.

FIG. 23 illustrates an exemplary graphical user interface, such as web page 2300, that may be provided by the network operations center 610 to computer 450 where the web page 2300 may be displayed to an administrator wishing to establish an extranet, in accordance with methods and systems consistent with the invention. As illustrated, web page 2300 may include an extranet partner box 2310, an existing extranet partner scroll list 2312, and a list of gateways 2320. The list of gateways may include the name 2322 for each of the gateways in the domain along with a check box 2324 to the left of each name. The administrator may use the extranet partner box 2310 to enter the name of the domain for which the administrator wishes to establish an extranet with. Once a domain has been enter ed in the extranet partner box 2310, it may appear in the existing extranet scroll list 2312. The administrator then may modify the list of gateways 2320 exported to one of the domains appearing in the scroll list 2312 simply by selecting the name of the gateway from the scroll list 2312, after which the name appears in the extranet partner box 2310. Further, the administrator may terminate any extranets with the domain appearing in box 2310 by simply clicking on the delete box 2340; after which, the domain name, which may be referred to as an extranet partner, is deleted from the scroll list 2312.

The administrator may then select from this list which gateways to export (S2222). For example, the administrator may simply check the box 2324 appearing to the left of each gateway name 2322 that they wish to export.

The administrator then may send the selections to the administrative server 615 (S2224). For example, the administrator may simply click on the OK box 2330 to close the web page 2300 and send their selections to the administrative server 615. Alternatively, the administrator may click on the Apply button 2334 to send the selections to the administrative server 615 without closing the web page 2300. The administrator may also click on the Cancel button 2332 to close the web page 2300 without sending the selections; or, the administrator may click on the Help button 2336 to bring up a screen including help information.

The administrative server 615 may then store information including that selected gateways were exported (S2228). Then, at some later time, the administrator of the domain for which the selected gateways are exported (e.g., the gateway identified in extranet partner box 2310) may log on to the administrative server 615 and enters a login id and password (S2230). The administrative server 615 may then verify the login id and password and ensure that the administrator is logging on from behind a gateway for which the administrator has permissions (S2232).

The network operations center 610 may then inform the administrator that gateways are exported to the gateway and that the administrator may elect to import the exported gateway names (S2234).

Figure 24:
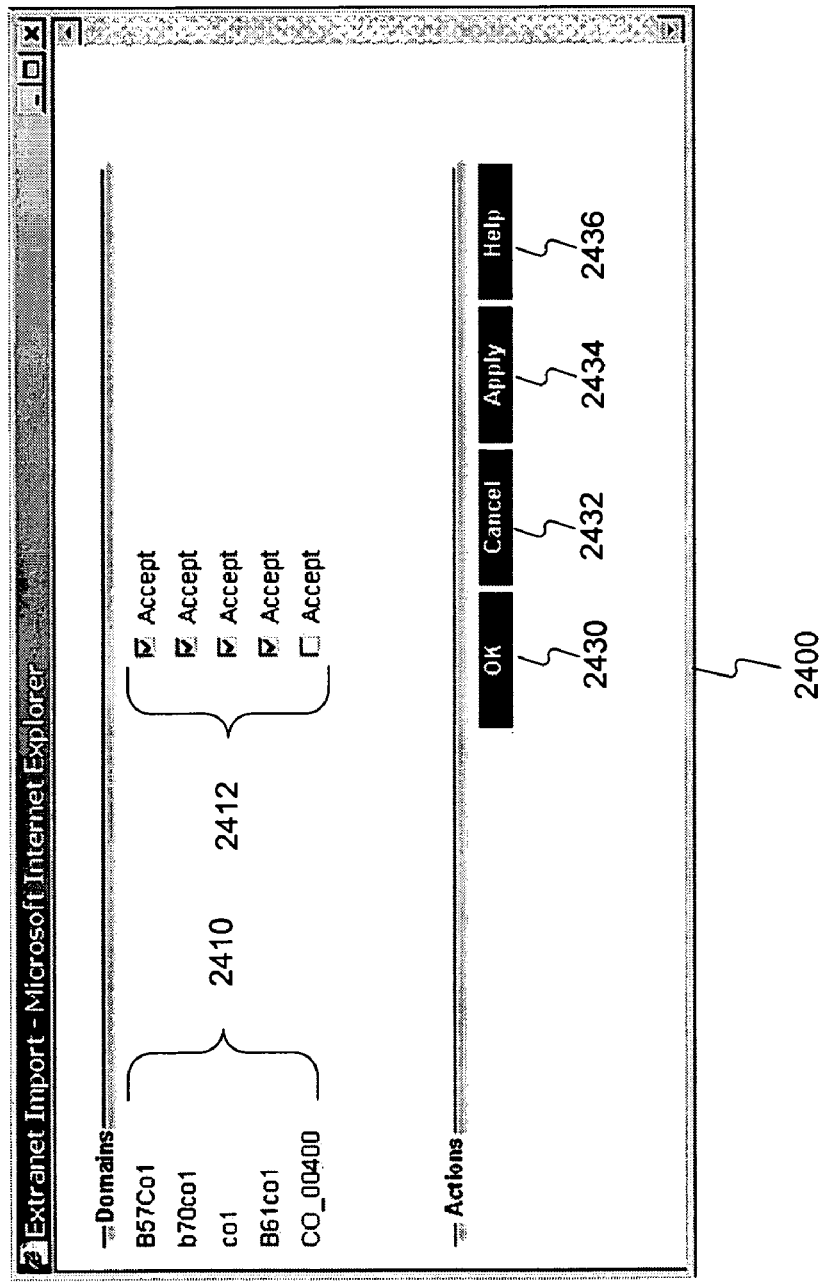
FIG. 24 illustrates an exemplary graphical user interface 2400 for importing gateways in establishing an extranet, in accordance with methods and systems consistent with the invention.

FIG. 24 illustrates an exemplary graphical user interface, such as web page 2400, that the network operation center 610 may provide to computer 450. The computer 450 may display the web page 2400 to indicate to the administrator that gateways are exported to the domain. As illustrated, web page 2400 may provide a list of domain names 2410 that exported gateways. Further, to the right of each domain name is a check box 2412 that the administrator may check if the administrator desires to import the exported gateway names. Once the administrator has made the selections they may click on the OK button 2430 to send the selections to the network operations center and close the web page 2400, click on the Apply button 2434 to send the selections without closing the web page 2400, click on the Cancel button 2432 to close the web page 2400 without sending their selections, or click on the Help button 2434 to bring up a screen with help information.

Thus, the administrator may elect to either import the exported gateway names or not (S2236). If the administrator elects not to import the exported gateway names, the gateway names are not imported and the following steps need not be performed (S2240).

If the administrator elects to import the gateway names, each of the selected gateways may be added to the list of potential partners for the gateways (S2238). For example, referring back to FIG. 11D, the imported gateway names may then appear in the list of potential partners 11D20 displayed to an administrator when the administrator desires to set up or modify a gateway's partner list. In this example, the names 11D22 may be displayed using the previously discussed two-level naming hierarchy. As such, the imported gateway names may be readily identifiable because they have a different domain name. For example, the domain names for each of the gateway names listed in the potential partner list 11D20 of FIG. 11D is "Openreach." If gateways are imported from another domain they would appear in the potential partner list 11D20 with a different domain name, such as "XYZ.***."

Once the gateways are imported into the list of potential partners, the gateways may establish tunnels between each other using a mechanism such as that discussed with reference to FIGS. 11C and 11D. That is, the administrator of the gateway may use a graphical user interface such as the one illustrated in FIG. 11D to consent to a tunnel between the gateway from different domains. The network operations center 610 may then check for mutual consent, and if found may add each gateway to the partner list for the other consenting gateway.

In an other embodiment, rather than sending to the administrator all gateway names in a domain in step S2218, the administrative server 615 may only send the gateways names for which the administrator has the proper permissions. Alternatively, the administrative server 615 may send all the names but with an indication that the administrator lacks the requisite permissions for certain gateways. For example, the administrator may simply be disabled from checking the box next to the gateways for which the administrator lacks permission.

As previously discussed with reference to FIGS. 18 and 20, IP address conflicts may exist between local area networks interfacing a gateway. For example, as discussed with reference to FIG. 18, the locally assigned addresses associated with clients 1823, 1824 of the first gateway 1821 may be identical and thus may conflict with the locally assigned IP addresses of the second gateway 1823. As previously discussed, this conflict may arise for both intranets and extranets.

For example, the first gateway 1821 may have been established and be administered by the "ABC" corporation, while the second gateway was established and is administered by the "XYZ" corporation. In such a situation, it is possible that a local area network interfacing the ABC gateway may use the same local IP addresses as a local area network interfacing the XYZ gateway. As such, the gateways may use a process such as discussed with reference to FIG. 20 to resolve this conflict and enable a tunnel between them.

Figure 9B:
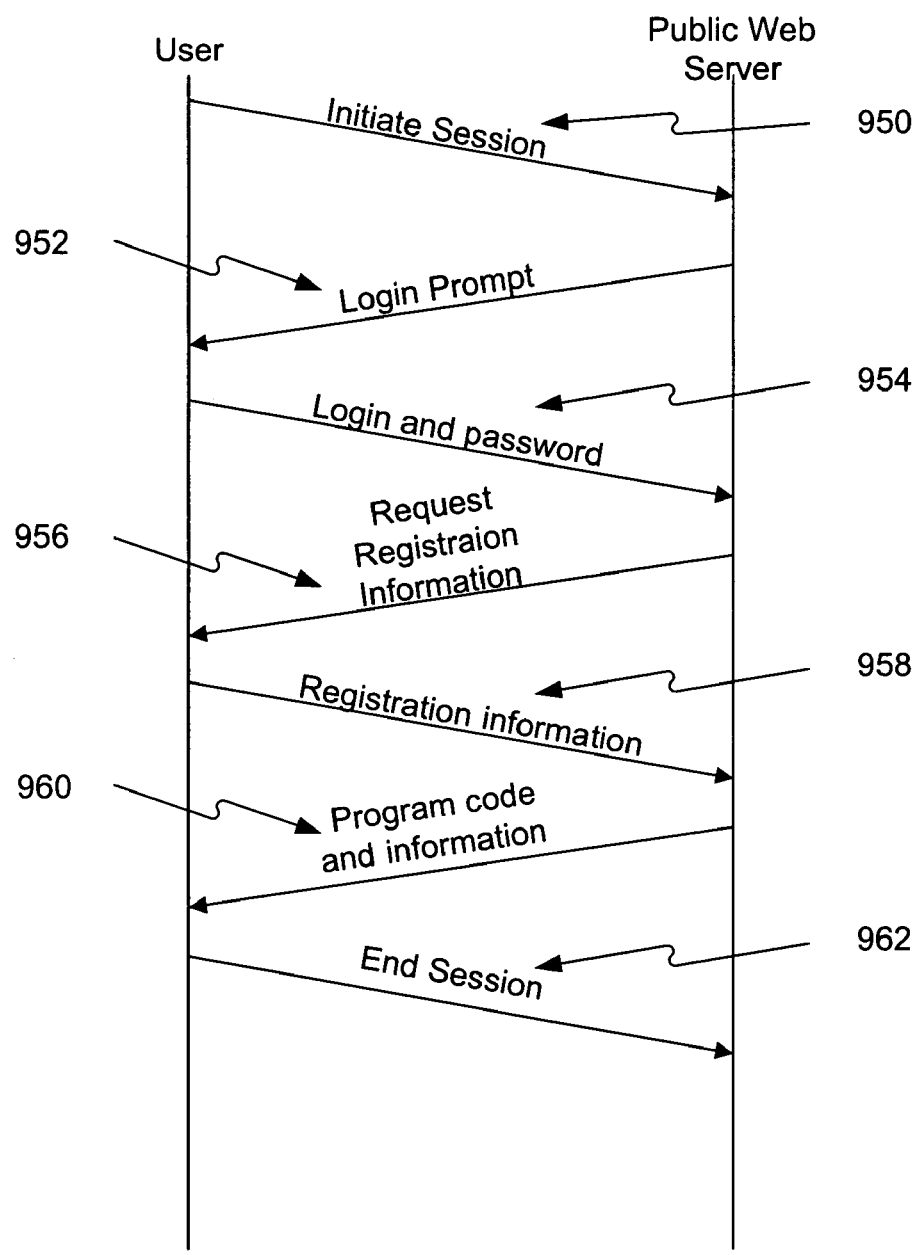
FIG. 9B is an exemplary flow chart illustrating communications between a browser program and a network operations center for registering a processor with the network operations center, in accordance with methods and systems consistent with the present invention.

FIG. 9B is an exemplary flow chart illustrating communications between a browser program and the network operations center 610 for registering a processor, such as a personal computer with the network operations center 610 (shown in FIG. 6A), in accordance with methods and systems consistent with the present invention. The browser program may include the Netscape Navigator developed by Netscape or the Internet Explorer developed by Microsoft. The user using the browser program may be a person or organization with the authority to administer the gateway 650, such as an administrator or a third party organization acting on behalf of the administrator, for example, a service provider.

The user may initiate a session with the network operations center 610 to register the processor using the web browser (step 950). For example, the user may enter into the browser a uniform resource locator (URL) for the public web server 611 in the network operations center 610. The browser may initiate the session with the public web server 611 over the Internet 620. The browser may use a secure data transfer protocol, such as SSL over HTTP (HTTPS) to enhance the security of the session over the Internet 620. Alternatively, the browser may use a non-secure data transfer protocol, such as the hypertext transport protocol ("HTTP") in an environment where security is not a concern.

The public web server 611 may send to the browser program code for a login prompt, such as code in the form of an HTTPS message including a JAVA™ script and a hypertext markup language ("HTML") document (step 952). The browser may then receive and execute the program code to present the login prompt to the user. The login prompt may request information, such as a login name and a password. Other information may also be requested, such as an email address for the user.

After the user enters the information requested in the login prompt, the browser may send the requested information to the public web server 611 (step 954). For example, the browser may send the requested information in the form of one or more HTTPS response messages.

Upon receiving the requested information, the public web server 611 may authenticate the user and begin requesting information for registering the processor as, for example, the gateway 650 (step 956). The public web server 611 may authenticate the user by referring to registration information previously stored for the gateway 650 in the database server 616. Alternatively, the public web server 611 may allow the user to create a new login for the gateway 650. Using the browser, the user may provide initial account information, such as a login, email address, an administrator's name and email, and a proposed password. When creating a new login for the gateway 650, the initial account information may then be later verified by an administrator.

After authenticating the user, the public web server 611 may send program code to the browser, requesting information for registering the processor as the gateway 650. For example, the public web server 611 may send to the browser a series of online forms configured as HTML documents. The public web server 611 may categorize the online forms based on the types of registration information requested. In one embodiment, the public web server 611 may send the following categories of forms: billing and contact information; technical support contact information; information for configuring one or more virtual private networks that the user may desire to establish over the Internet 620; and information for administering the virtual private networks. Alternatively, other registration information may be requested, such as a sales person assigned to the user and a contract number assigned to the user.

Billing and contact information may include: the name of a person responsible for billing; an address; a phone number; an email address; and billing format information. The billing format information may include: a requested medium such as paper, electronic, diskette, or compact disk; criteria for sorting the billing information, such as department names or location names; discounts; and pricing information. Billing and contact information may also include a proposed login name and password to access billing and contact information at a later time.

Technical support contact information may include: name of a technical support person; an address; a phone number; an email address; and cell phone number. Technical support contact information may also include a proposed login name and password to access trouble ticket information and online help information at a later time.

The configuration information may include information for configuring the processor as the gateway 650, such as a name for the gateway 650; a real IP address for the gateway 650; a shared secret for the gateway 650; and a partner list indicating one or more gateways to which the gateway 650 consents enabling one or more tunnels. The configuration may also include: the media access control (MAC) address for the gateway 650; a proxy server IP address for the gateway 650; and firewall information for the gateway 650.

The administrative information may include: the name of an administrator responsible for operations and maintenance of virtual private networks established over the Internet 620; an address; a phone number; and an email address. The administrative information may also include a proposed administrator's login name and password to access for configuring the gateway 650.

Alternatively, all or a portion of the registration information for the gateway 650 may be presented by the browser for confirmation rather than requiring the user to enter the information. For example, the public web server 611 may retrieve previously stored registration information for the gateway 650 from the database server 616. The public web server 611 may then send this retrieved registration information to the browser as an HTML document. The browser may then prepopulate the online form with the retrieved registration information before presenting the online form to the user and requesting confirmation from the user.

In addition, the public web server 611 may send program code to the browser for automatically determining a portion or all of the registration information. For example, the browser may execute the program code, such as a script for executing a traceroute to determine the real IP address for the gateway 650. The browser may then prepopulate the online form with the registration information before presenting the online form to the user and requesting confirmation from the user.

Upon the user entering (or confirming) the registration information, the browser may send the registration information to the public web server 611 (step 958). Alternatively, the public web server 611 may request the user to confirm the registration information entered at various times, such as after entering information for each category of registration information. For example, the browser may send to the public web server 611 the registration information entered (or confirmed) by the user in the form of one or more HTTPS response messages.

After receiving the registration information, the public web server 611 may then retrieve and provide to the user the program code and information for configuring the processor as the gateway 650 (step 960). For example, the public web server 611 may provide the registration information to the administrative server 615 (shown in FIG. 6A). Accordingly, the administrative server 615 may then generate and/or assemble the program code and information based upon the registration information. The program code and information may include the following: program code for IPSec; program code for communications between the network operations center 610 and the gateway 650; the Linux Operating System (OS) including kernel and device drivers; the configuration of the IP stack such as a Dynamic Host Configuration Protocol (DHCP) client and a DHCP Server; a virtual IP address for the gateway 650; program code for routing packets through one or more tunnels established with the gateways 650; access control information for limiting the functions performed through one or more tunnels established with the gateway 650; program code for the SOCKS Proxy code; program code for a web browser; and any other software that may be installed based on the registration information entered or confirmed by the user. In addition, the LINUX operating system may be a "hardened" version of Linux to improve the security of the operating system. The public web server 611 may then provide the program code and information to the browser in the form of a file transfer protocol ("FTP") download. Alternatively, the public web server 611 may send the browser an HTTPS message indicating that registration of the processor is complete and the program code and information will be mailed to the user in the form of a disk image stored on a diskette or compact disk.

Upon receiving the program code and information (or receiving notice that the registration of the processor is complete), the user may end the session (step 962). The public web server 611 may require the user to end the session to limit the user's range of permissible functions. For example, the public web server 611 may deny the user the privilege to change firewall rules, administer partner lists, show tunnel status, show partner list information, delete administrators, and/or define groups of gateways. Accordingly, the user may be required to end the session with the public web server 611 upon completing the registration of the processor as the gateway 650.

Figure 10B:
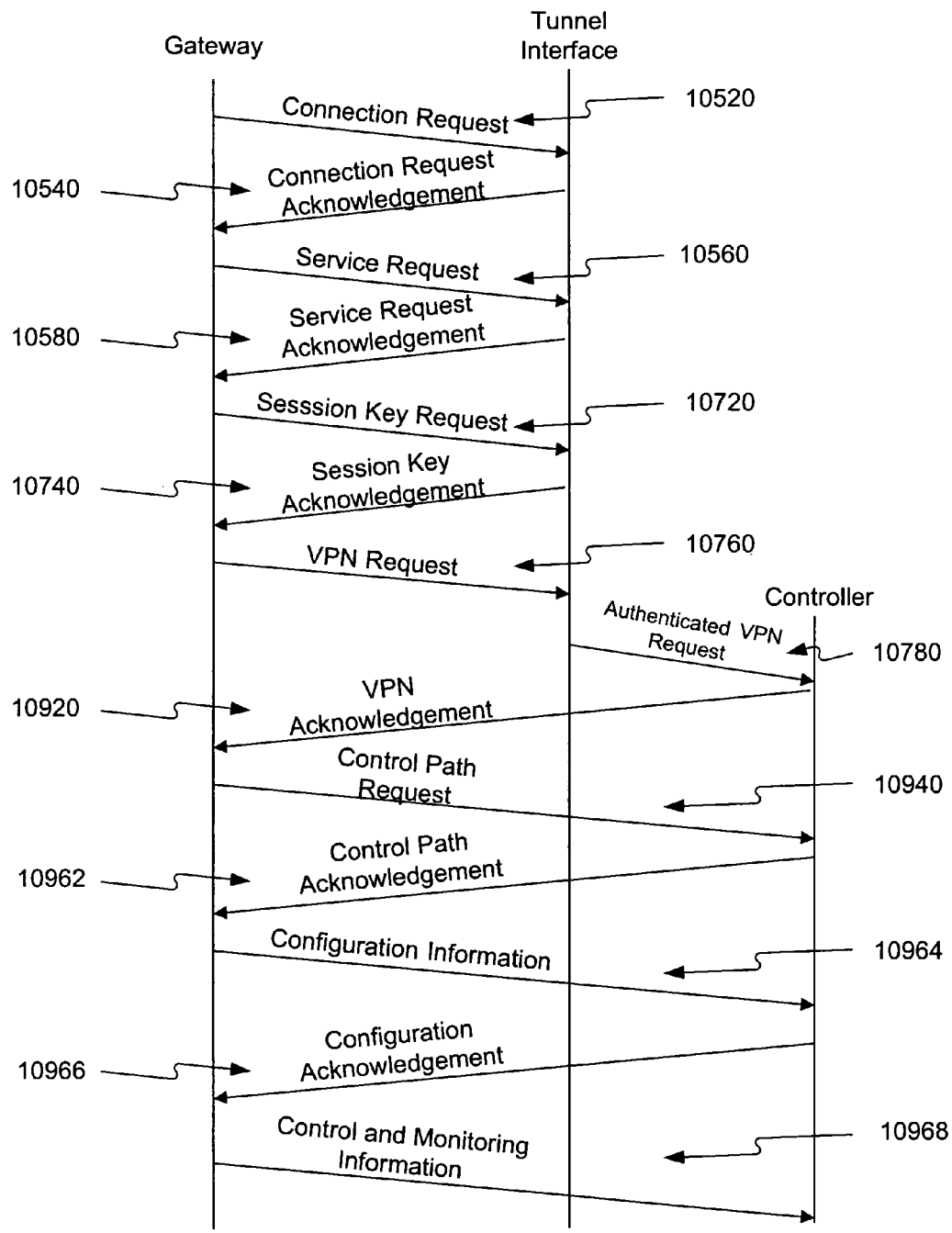
FIG. 10B is an exemplary call flow chart illustrating communications between a processor and a network operations center for configuring the processor as a gateway, in accordance with methods and systems consistent with the present invention.

FIG. 10B is an exemplary call flow chart illustrating communications between the registered processor and the network operations center 610 for configuring the registered processor as the gateway 650 and establishing a secure tunnel, in accordance with methods and systems consistent with the present invention. The user may boot-up the processor with the program code and information to configure itself as the gateway 650. Once configured, the gateway 650 may send a connection request 10520 to the tunnel interface module 612 in the network operations center 610 (shown in FIG. 6A). For example, the gateway 650 may send the connection request 10520 to the tunnel interface module 612 over the Internet 620.

The gateway 650 may determine the public IP address for the tunnel interface 612 by referring to a routing table in the gateway 650. Alternatively, the gateway 650 may use an Internet/Intranet access device and/or a Dynamic Host Configuration Protocol (DHCP) server. The gateway 650 may also use a domain name server to resolve the real IP address of the tunnel interface driver 612.

The connection request 10520 may include information for establishing a TCP/IP connection between the gateway 650 and tunnel interface module 612. For example, the connection request 10520 may include: the public IP address of the gateway 650; a request to use TCP port 551; a beginning sequence number; a maximum segment size that the gateway 650 is willing to receive; and a proposed a window size and scale. The connection request 10520 may use other TCP/IP parameters consistent with the standards for TCP/IP. A description of TCP is disclosed in RFC-793, "Transmission Control Protocol," Information Sciences Institute for Defense Advanced Research Projects Agency (DARPA), (1991), which is incorporated herein by reference in its entirety. A description of the IP header portion 10008 is disclosed in RFC-791, "Internet Protocol DARPA," Information Sciences Institute for Defense Advanced Research Projects Agency (DARPA), (1991), which is incorporated herein by reference in its entirety.

In response to the connection request 10520, the tunnel interface module 612 may send a connection request acknowledgement 10540 to the gateway 650. For example, the tunnel interface module 612 may send a TCP acknowledgement message to the provided real IP address of the gateway 650. The connection request acknowledgement 10520 may, for example, agree to repeat the TCP/IP parameters proposed in the connection request 10520. Alternatively, the connection request acknowledgement 10540 may propose different TCP/IP parameters requested by the tunnel interface module 612. The gateway 650 and tunnel interface module 612 may continue to exchange messages, such as the connection request 10520 and the connection request acknowledgment 10540, until they mutually agree on the TCP/IP parameters.

Once the gateway 650 and tunnel interface module 612 mutually agree on the TCP/IP parameters, the gateway 650 may send a service request 10560 to the tunnel interface module 612. Upon receiving the service request 10560, the tunnel interface module 612 may start a TCP tunnel driver to encapsulate and encrypt information within TCP packets. The tunnel interface module 612 may also start a User Datagram Protocol (UDP) tunnel driver to encapsulate and encrypt information within UDP packets. After starting the TCP tunnel driver and/or UDP tunnel driver, the tunnel interface module 612 may send a service request acknowledgement 10580 to the gateway 650.

Upon receiving the service request acknowledgement 10580, the gateway 650 may send a session key request 10720 to the tunnel interface module 612. For example, the session key request 10720 may be encapsulated within a UDP packet (e.g., at UDP port 500) including: a request for an encryption algorithm; a key for encryption; and a first random number encrypted by the key. The encryption algorithm may be based upon a shared secret or may be based on a public key encryption algorithm as described above. The key may have various bit lengths including, for example, 56, 112, 168, 1024, or 2048 bits.

After receiving the session key request 10720, the tunnel interface module 612 may send a session key acknowledgement 10740 to the gateway 650. The session key acknowledgement 10740 may be encapsulated within a UDP packet (e.g., at UDP port 900) including: an acknowledgement of the requested encryption algorithm; a confirmation of the key; and a second random number encrypted by the key. Accordingly, the gateway 650 and tunnel interface module 612 may generate the session key based on the shared secret and both of the first and second random numbers to securely communicate with each other. Alternatively, other methods for negotiating a session key may be used instead.

After establishing the session key, the gateway 650 may send a VPN request 10760 to the tunnel interface module 612. The VPN request 10760 may be encapsulated within a TCP packet including: the virtual IP address of the gateway 650; the shared secret of the gateway 650; the public key for the gateway 650; version information of the program code currently used by the gateway 650; and the name of the gateway 650.

The tunnel interface module 612 may then authenticate the VPN request 10760 and send an authenticated VPN request 10780 to the controller module 614 in the network operations center 610 (shown in FIG. 6A). The tunnel interface module 612 may authenticate the VPN request 10780 by verifying that the virtual IP address provided in the VPN request 10760 matches the virtual IP address stored for the gateway 650 in the database server 616. Alternatively, the tunnel interface module 612 may authenticate the VPN request 10760 based on the shared secret or the name of the gateway 650. In addition, the VPN request 10760 may be authenticated using other techniques, such as public key exchange techniques or MD5 signatures. Authentication of the VPN request 10760 may not be performed in an environment where authenticity and trust are not a concern.

Once the VPN request 10780 is authenticated, the tunnel interface module 612 may send the authenticated VPN request 10780 to the controller module 614. The authenticated VPN request 10780 may be encapsulated within a TCP packet including: the virtual IP address of the gateway 650; the shared secret of the gateway 650; the public key for the gateway 650; version information of the program code currently used by the gateway 650; and the name of the gateway 650. For example, the tunnel interface module 612 may send to the controller module 614 the authenticated VPN request 10780 encapsulated within a TCP packet (e.g., at TCP port 900).

After receiving the authenticated VPN request 10780, the controller module 614 may send via the tunnel interface module 612 a VPN acknowledgement 10920 to the gateway 650. The VPN acknowledgement 10920 may include: the virtual IP address of the gateway 650; the virtual IP address of the network operations center 610; the shared secret of the gateway 650; the public key for the gateway 650; the public key for the network operations center 610; version information of the program code currently used by the gateway 650; and information for establishing an IPSec tunnel consistent with the IPSec standard. For example, the controller module may send the VPN acknowledgement 10920 within an IPSec packet that is encapsulated within a TCP packet (e.g., at TCP port 551) to the tunnel interface module 612. The tunnel interface module 612 may then send the VPN acknowledgment 10920 (encapsulated as described above) encapsulated within another TCP packet (e.g., at TCP port 551) through the established TCP/IP connection.

Upon receiving the VPN request acknowledgement 10920, the gateway 650 may send a control path request 10940 for confirming the IPSec tunnel with the controller module 614 via the tunnel interface module 612. For example, the control path request 10940 may include: information confirming the IPSec parameters proposed by the controller module 614; and an MD5 signature using a nonce (i.e., a one-time randomly generated word or number).

The controller module 614 may then authenticate the control path request 10940 by verifying the MD5 signature and send a control path acknowledgement 10962 to the gateway 650. The control path acknowledgement 10962 may include: the virtual IP address of the controller module 614; the shared secret of the gateway 650; the public key for the network operations center 610; version information of the program code currently assigned to the gateway 650; and a new signature using a new nonce.

After receiving the control path acknowledgement 10962, the gateway 650 may send configuration information 10964 to the controller module 614. For example, the gateway 650 may send to the controller module 614 a set of XML files (as described above with reference to Tables 1–6) encapsulated within the IPSec tunnel encapsulated within the TCP tunnel.

Upon receiving the configuration information 10964, the controller module 614 may verify the configuration information 10964, in the XML files and send a configuration acknowledgement 10966. The controller module 614 may verify the configuration information 10964 by referring to the database server 616 and the administrative server 615. The controller module may also determine any changes or additional registration information for the gateway 650. For example, the controller module 614 may determine that the gateway 651 consents to enabling a tunnel with the gateway 650. Accordingly, the controller module 614 may send within the configuration acknowledgment 10966 an updated set of XML files including an updated partner list that includes the real IP address of the gateway 651; the virtual IP address of the gateway 651; the public portion of the public key for the gateway 651; and firewall information for the gateway 651. Upon receiving the configuration acknowledgement 10966, the gateway 650 may then begin establishing the tunnel to gateway 651.

After receiving the configuration acknowledgement 10966, the gateway 650 may begin sending control and monitoring information 10968. The gateway 650 may send the control and monitoring information 10968 at various times, such as on a periodic basis every 5 minutes. The control and monitoring information 10968 may include: the accumulated number of packets and bytes transmitted at the gateway 650; the accumulated number of packets received at the gateway 650; the minimum round-trip time, maximum round-trip time, and 5 minute average round-trip time (i.e., in milliseconds) for packets traveling between the gateway 650 and each gateway on the partner list of the gateway 650. In addition, the control and monitoring information 10968 may include a signature, such as an MD5 signature using a nonce to enhance security. For example, the gateway 650 may send the control and monitoring information 10968 (e.g., the XML files) encapsulated within the IPSec tunnel encapsulated within the TCP tunnel as described above.

Figure 10C:
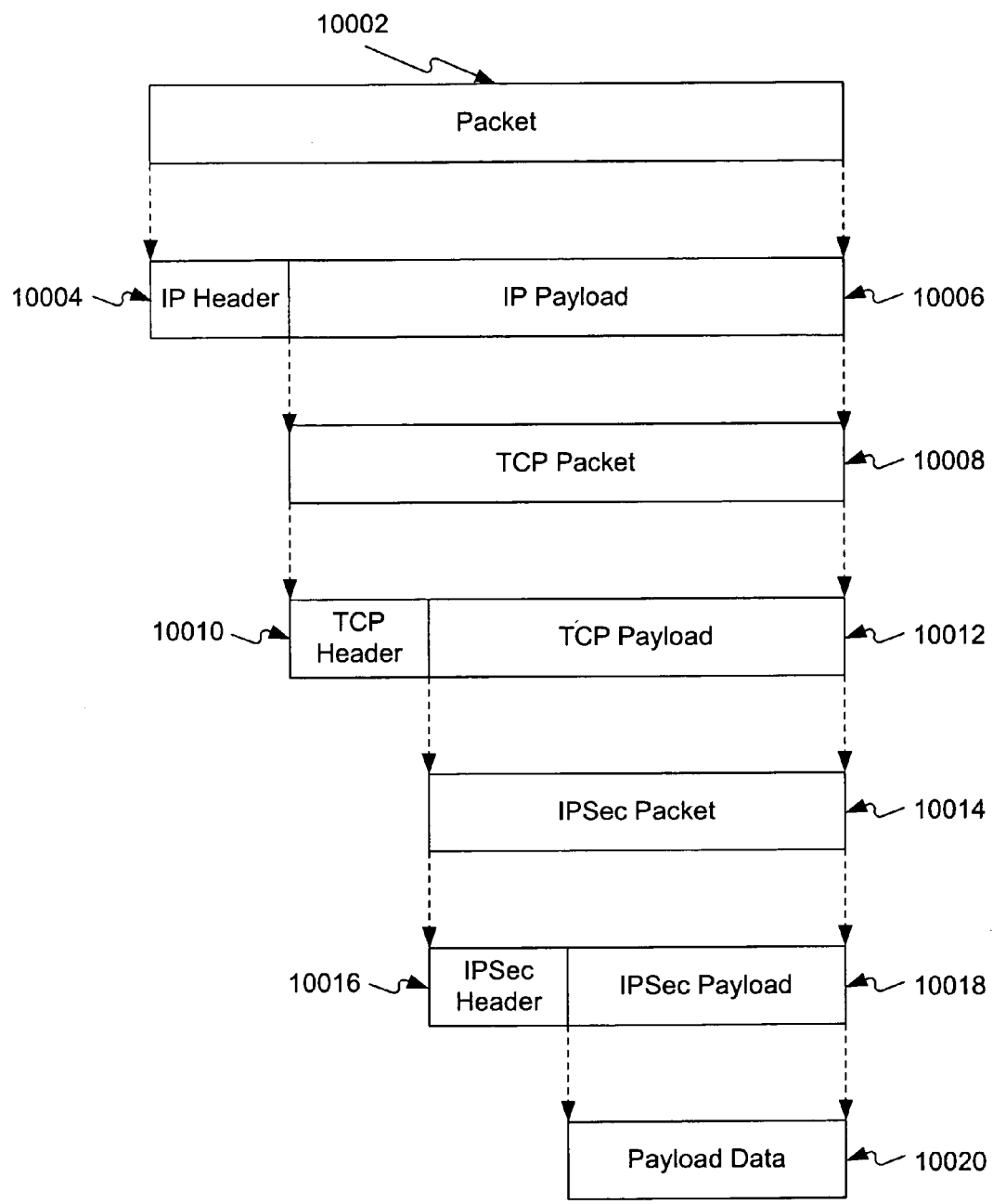
FIG. 10C is an exemplary diagram illustrating a packet communicated between a gateway and a network operations center, in accordance with methods and systems consistent with the present invention.

FIG. 10C is an exemplary diagram of a packet 10002 communicated between the gateway 650 and the network operations center 610, in accordance with methods and systems consistent with the present invention. As shown, the packet 10002 may include an IP header portion 10004 and an IP payload portion 10006. The IP header portion 10004 may include information for enabling the gateway 650 and the network operations center 610 to forward the packet 10002 through the Internet 620. For example, the IP header portion 10004 may include the real IP address of the tunnel interface driver 612 in the network operations center 610 and the real IP address of the gateway 650 (e.g., 193.168.100.5 shown in FIG. 6B).

The IP payload portion 10006 may encapsulate a TCP packet 10008. The TCP packet 10008 may include a TCP header portion 10010 and a TCP payload portion 10012. The TCP header portion 10010 may include information for the TCP tunnel between the gateway 650 and the network operations center 610. For example, the TCP header portion 10010 may include a destination port number of 551.

The TCP payload portion 10012 may encapsulate and encrypt an IPSec packet 10014. As described above, the IPSec packet 10014 may be consistent with the IPSec standard to form an encrypted tunnel. The IPSec packet 10014 may include an IPSec header portion 10016 and an IPSec payload portion 10018. For example, as described above, the IPSec header portion 10016 may include: the virtual IP address of the gateway 650 (e.g., 10.0.1.1); the virtual IP address of the network operations center 610 (e.g., 10.10.0.1); and information for authentication, data integrity, and encryption consistent with the IPSec standard. The IPSec payload portion 10018 may encapsulate and encrypt payload data 10020 from, for example, the gateway 650. The payload data 10020 may include, for example, application user data and control and monitoring information from the gateway 650.

In accordance with another embodiment of the present invention, a user may access a web site, such as a network operations center to configure as gateways existing equipment and/or personal computers, and using the gateways, establish one or more virtual networks through a base network, such as the Internet. The user may use a web browser to log onto the network operations center and provide basic information about each site the user desires to include as part of the virtual network. Each site may include a gateway interfacing a local area network, and the information provided by the user may include a site name and a base address that is routable through a base network, such as the Internet. Based on the provided information, the network operations center may automatically generate appropriate program code and information for self-configuring the user's computers as gateways. The user may then navigate through one or more web pages displayed on the browser and "point and click" on graphical icons to configure and administer the virtual networks from the network operations center. In addition, the network operations center may monitor the gateways and provide technical support to the user.

Figure 25:
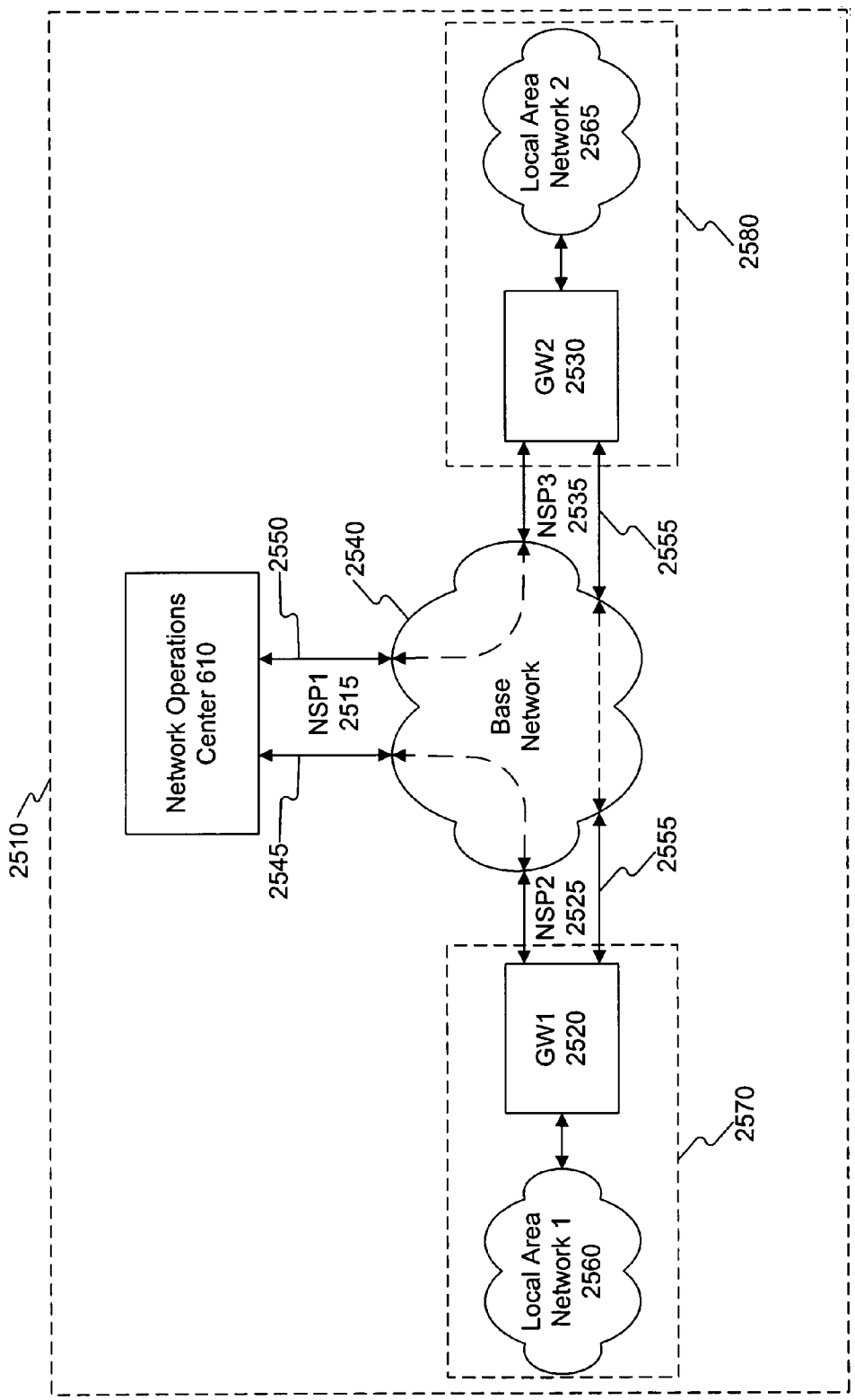
FIG. 25 is a general block diagram of an exemplary network, in accordance with methods and systems consistent with the present invention.

FIG. 25 is a general block diagram of an exemplary network 2510, in accordance with methods and systems consistent with the present invention. As shown, the network 2510 may include the network operations center 610, a base network 2540, a first site 2570, and a second site 2580. The network operations center 610 may access the base network 2540 through an interface provided by a first network service provider (NSP) 2515. The first site 2570, which may include a first gateway 2520 interfacing a local area network 2560, may access the base network 2540 through a second network service provider (NSP) 2525. The second site 2580, which may include a second gateway 2530 and a local area network 2565, may access the base network 2540 through a third network service provider (NSP) 2535. In an alternative embodiment (not shown), the second site 2580 may include a the second gateway 2530 configured as a stand-alone processor that may access the base network 2540 through the third network service provider (NSP) 2535. The first NSP 2515, second NSP 2525, and third NSP 2535 may be the same or different network service providers.

The first gateway 2520 may communicate with the network operations center 610 through a tunnel 2545 established through the base network 2540. The second gateway 2530 may communicate with the network operations center 610 through another tunnel 2550 established through the base network 2540. Based on information exchanged with each of the first and second gateways 2520 and 2530, the network operations center 610 may enable a tunnel 2555 between the first and second gateways 2520 and 2530. After the tunnel 2555 is enabled by the network operations center 610, the first and second gateways 2520 and 2530 may establish the tunnel 2555 through the base network. The first and second local area networks 2560 and 2565 may then communicate with each other through the tunnel 2555, making their respective resources, such as files, printers, computers, etc. available to each other.

Figure 26:
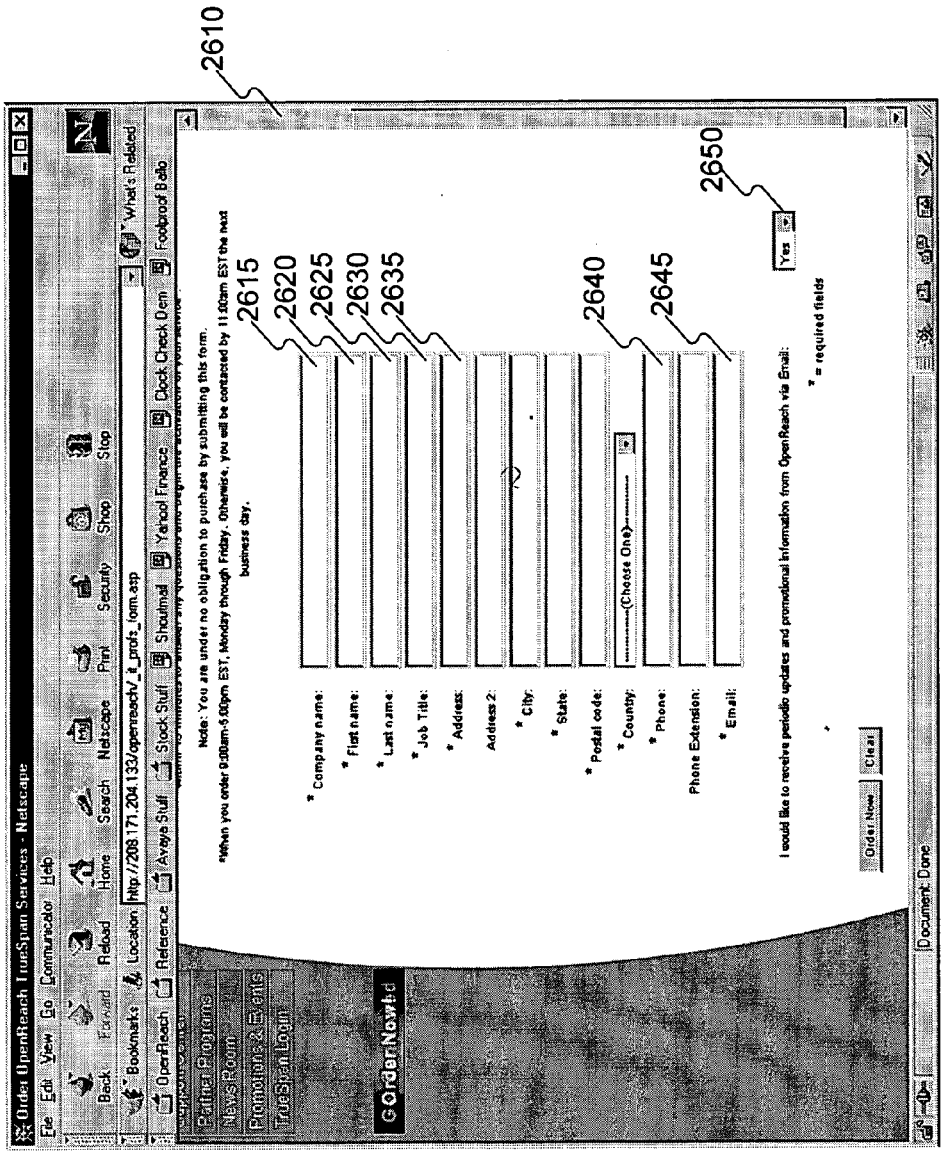
FIG. 26 is an exemplary graphical user interface for registering a user with a network operations center, in accordance with methods and systems consistent with the present invention.

To initially configure the gateways 2520 and 2530 and establish a virtual network over the base network 2540, the user may first access the network operations center 610 using a personal computer (not shown) and register with the network operations center 610. When the user accesses the network operations center 610, the network operations center 610 may provide a graphical user interface, such as a web page 2610 shown in FIG. 26 through which the user may provide contact information, such as company name 2615, first name 2620, last name 2625, job title 2630, mailing address 2635, telephone number 2640 and email address 2645. The user may also indicate a desire to receive periodic updates and promotional information from the network operations center 610 via email.

Figure 27:
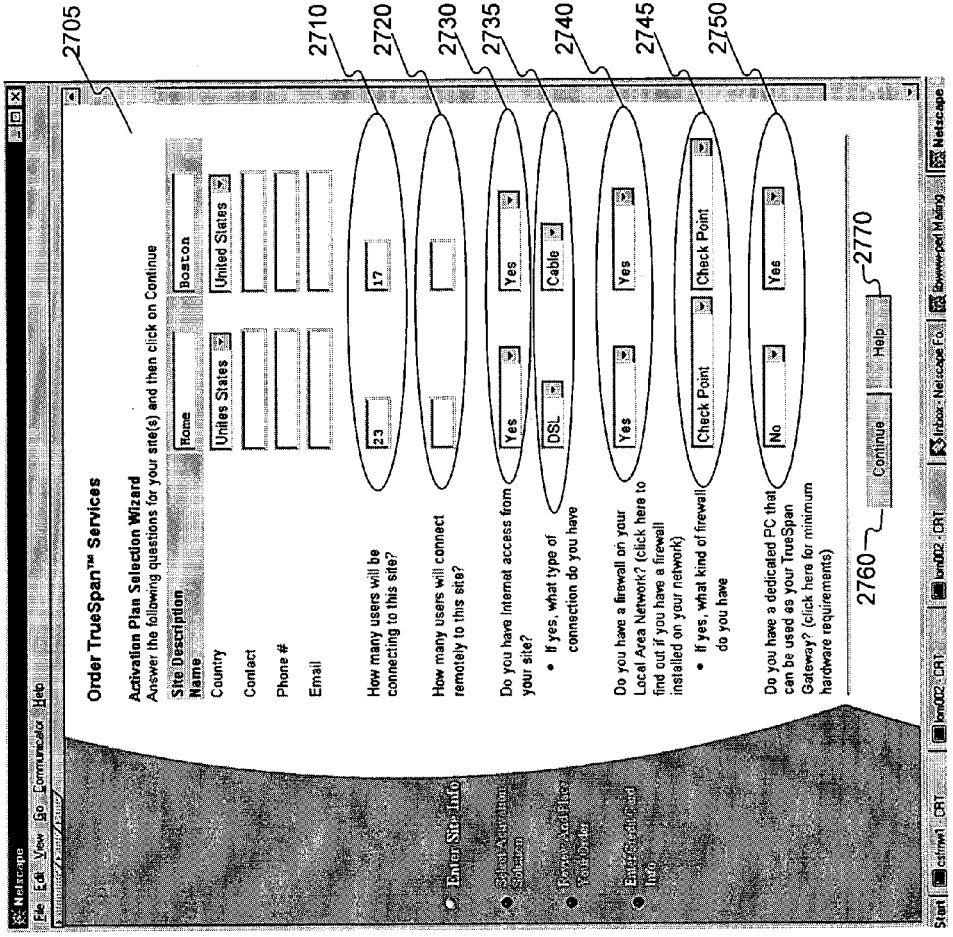
FIG. 27 is an exemplary graphical user interface of a network operations center for providing information about the sites, in accordance with methods and systems consistent with the present invention.

After providing the contact information, the user may access another web page provided by the network operations center 610 to provide information about the sites 2570 and 2580. FIG. 27 is an exemplary graphical user interface, such as a web page 2705 for providing information about the sites 2570 and 2580, in accordance with methods and systems consistent with the present invention. From the web page 2705, the user may answer questions displayed on that web page 2705. For example, the user may indicate how many users 2710 may access the site 2570, how many users may connect 2720 to the site 2570 remotely, and whether the site 2570 is connected 2730 to the base network 2540. If so, the user may indicate the type of connection 2735 between the site 2570 and the base network 2540, such as a digital subscriber line connection.

The user may also indicate whether there is a firewall 2740 in the local area network 2560. If so, the user may indicate the type of the firewall 2745, for example, a Check Point firewall. Furthermore, the user may further indicate whether there is a dedicated personal computer 2750 that may be configured as gateway 2520 to provide access to the base network 2540 from the local area network 2560. Finally, the user may press a continue 2760 button to proceed, or a help 2770 button to request additional information.

Figure 28:
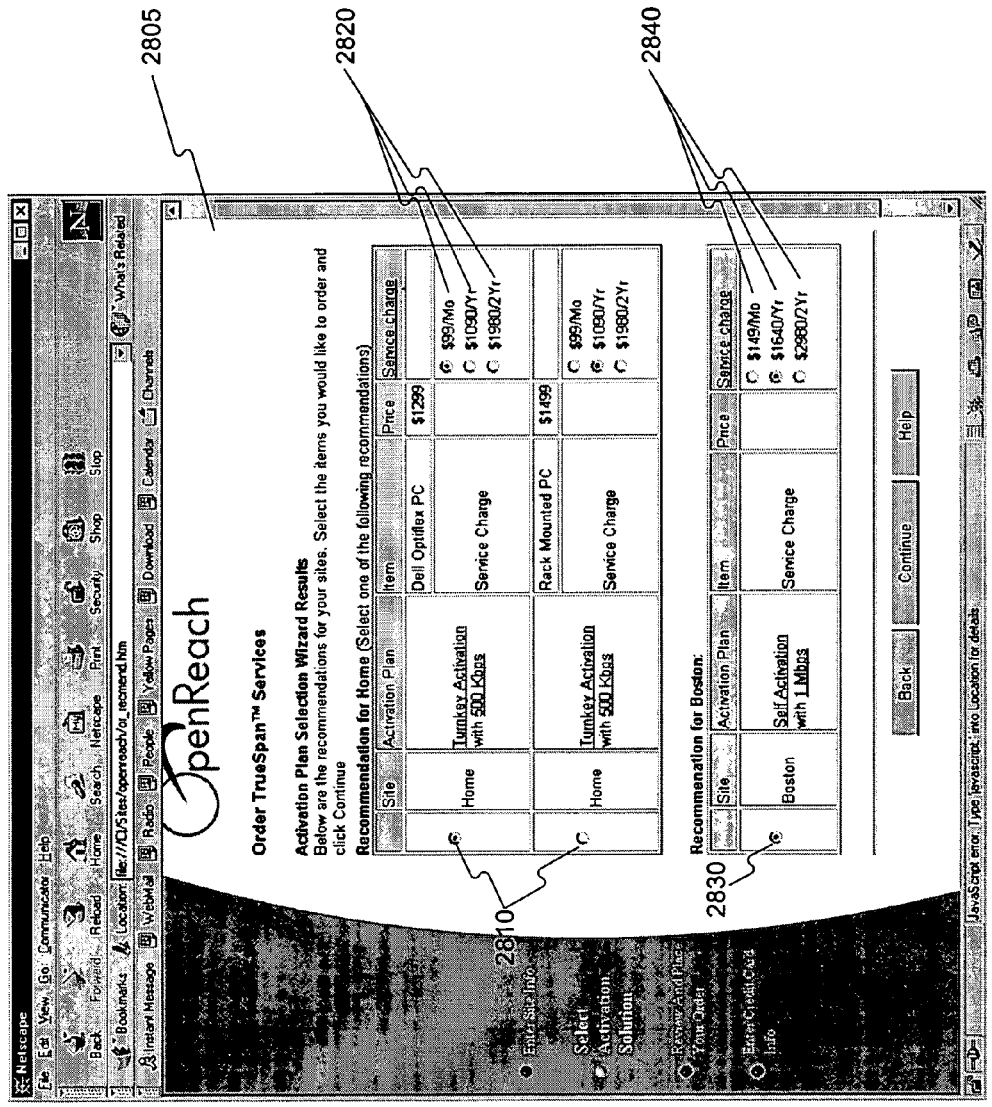
FIG. 28 is an exemplary graphical user interface of a network operations center for ordering support services, in accordance with methods and systems consistent with the present invention.

The user may also access an ordering wizard in the network operations center 610 to order support services that may be needed to establish the virtual network over the base network 2540. FIG. 28 is an exemplary graphical user interface, such as a web page 2805 provided by the network operations center 610 for ordering support services, in accordance with methods and systems consistent with the present invention. The network operations center 610 may offer the user recommendations on configuring the sites 2570 and 2580 based on the indications provided by the user on the web page 2805. For example, the ordering wizard may offer choices 2810 between more than one type of gateway 2520, such as between a desktop computer and a rack-mounted computer. The ordering wizard may also offer the user choices 2820 between more than one service charge arrangement, such as monthly, annual, or bi-annual billing periods.

The ordering wizard may offer different choices for each site 2570 and 2580. For example, the ordering wizard may offer a choice 2810 between turnkey activation configurations, if the user indicates that the site 2570 does not have a dedicated personal computer 2750 for use as the gateway 2520. However, the ordering wizard may offer a different service plan 2830 if the user indicates that a dedicated personal computer 2750 is available for use as the gateway 2520. Also, the ordering wizard may apply a different service charge 2840 if the gateway 2520 interfaces the base network 2540 at a different bandwidth, such as 1 Mbps versus 500 kbps.

Figure 29:
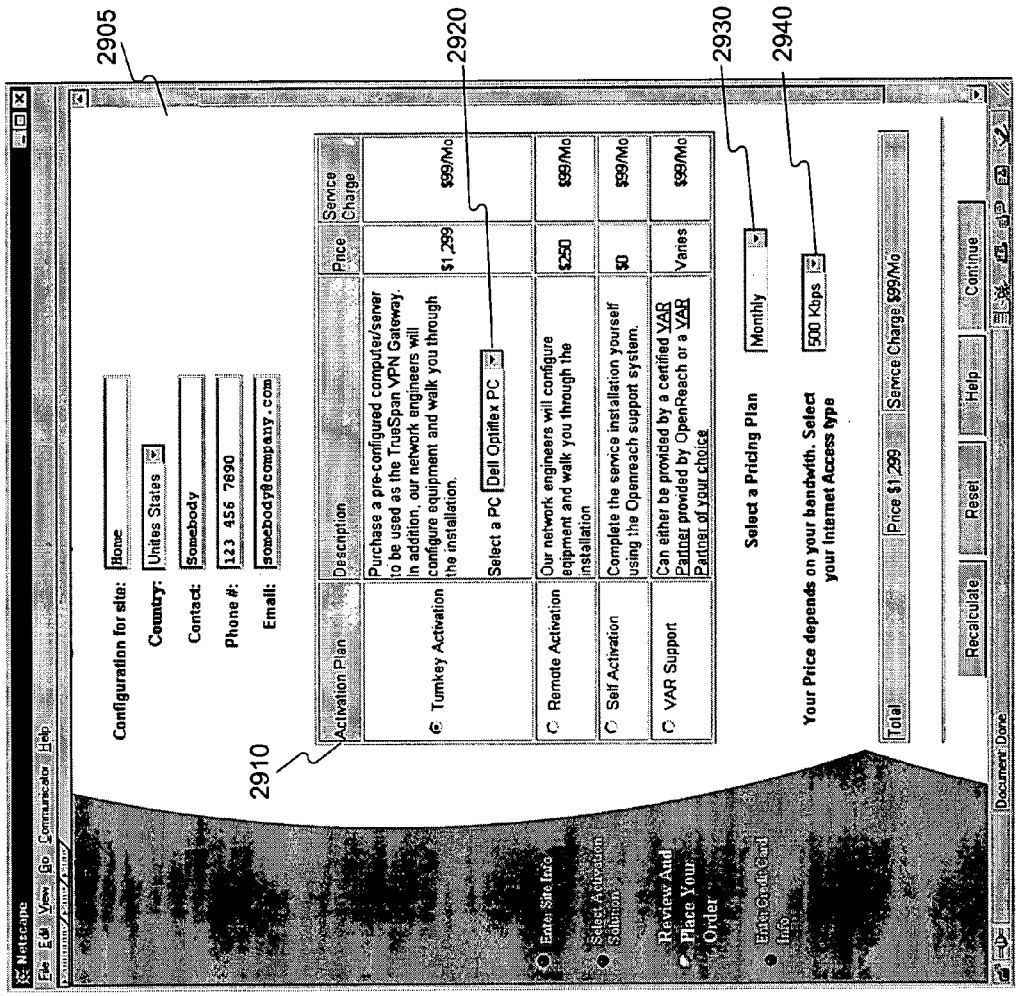
FIG. 29 is an exemplary graphical user interface for requesting support services, in accordance with methods and systems consistent with the present invention.

The user may also have the option of ordering support services from the network operations center 610 without using the ordering wizard. FIG. 29 is an exemplary graphical user interface, such as a web page 2905 for requesting support services, in accordance with methods and systems consistent with the present invention. The user may configure each site 2570, 2580 by selecting services from a menu of available options on the web page 2905. For example, the user may indicate an activation plan 2910, a type of computer 2920 for use as the gateway 2520, a pricing plan 2930, and a bandwidth 2940 between the gateway 2520 and the base network 2540.

Figure 30:
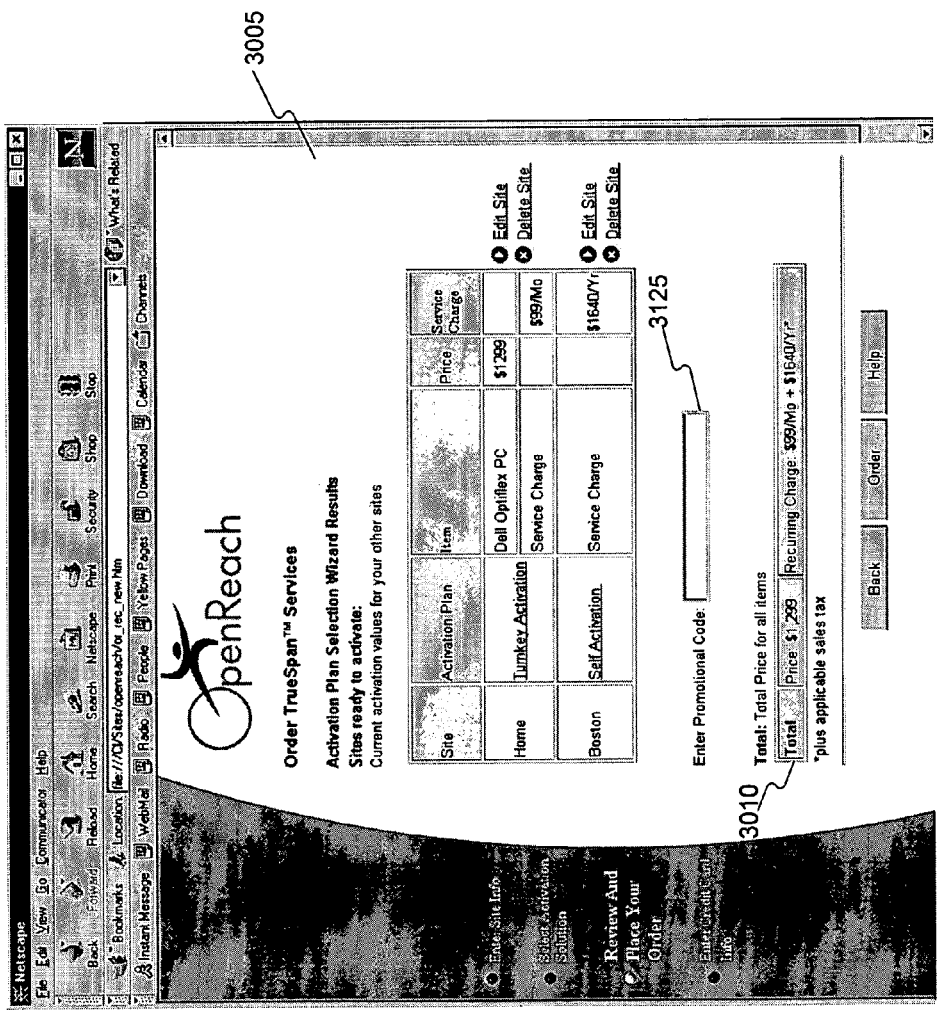
FIG. 30 is an exemplary report showing the support services ordered by the user, in accordance with methods and systems consistent with the present invention.

The user may then access another web page to review the services ordered from the network operations center 610. FIG. 30 is an exemplary graphical user interface, such as a web page 3005 showing the support services ordered by the user, in accordance with methods and systems consistent with the present invention. The network operations center 610 may generate the web page 3005, which may describe the virtual network and specify a service charge 3010 based on the number of gateways (2520, 2530), the bandwidth 2940 at which each gateway (2520, 2530) interfaces the base network, the number of users 2720 that connect remotely to each site (2570, 2580), and the billing period 2930. Then the network operations center 610 may send the web page 3005 to the user's web browser.

Figure 31:
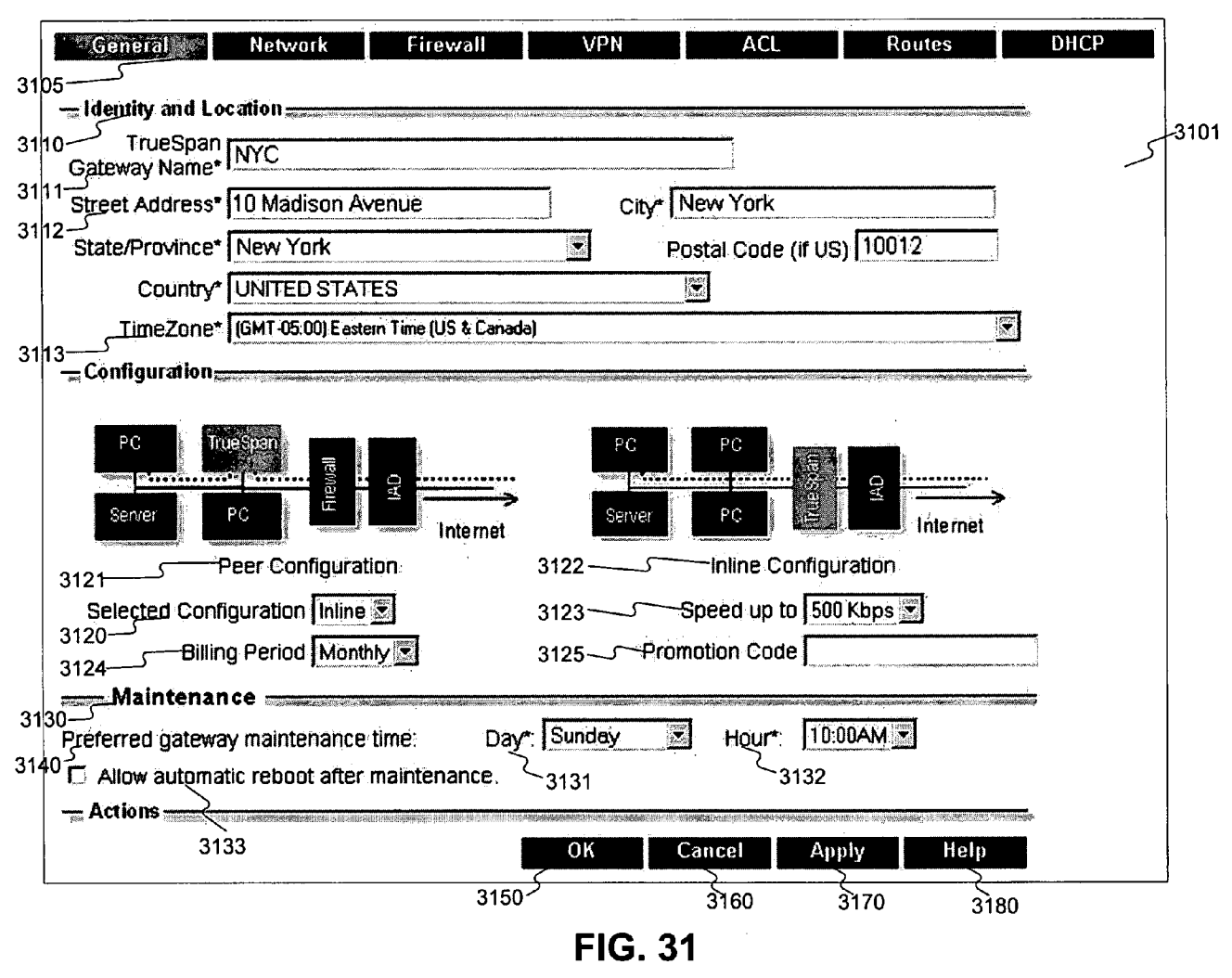

The user may then access another web page 3101 to provide general information for configuring and administering the sites 2570 and 2580. FIG. 31 is an exemplary graphical user interface, such as a web page 3101 for providing configuration, billing, and maintenance information, in accordance with methods and systems consistent with the present invention. The user may access the web page 3101 and select a General 3105 tab to specify a general configuration for the virtual network. The user may also specify an identity and location 3110 for the gateway 2520, assign a name 3111 to the gateway 2520, specify a street address 3112 where the gateway is located, and specify a time zone 3113 in which the gateway 2520 is located.

Furthermore, the user may specify a configuration 3120 for the local area network 2560, such as a peer configuration 3121 or an in-line configuration 3122, specify a bandwidth 3123 for the network service provider 2525, specify a billing period 3124 for the gateway 2520, such as a monthly or yearly billing period, and specify a promotion code 3125 for a promotional offer, such as a discount on initial installation. Additionally, the user may specify preferences for maintenance 3130 of the gateway 2520. For example, the user may specify a preferred maintenance time 3140, by day of the week 3131 and hour 3132 in the specified time zone 3113, for software upgrades. The user may also specify whether to allow automatic reboot 3133 of the gateway 2520 after maintenance operations.

The user may then select an OK 3150 button to accept any configuration and billing information changes made on web page 3101. The user may select a Cancel 3160 button to abort any changes made on web page 3101 and exit. The user may test any changes made by selecting an Apply 3170 button. Finally, the user may select a Help 3180 button to request additional help.

Figure 32:
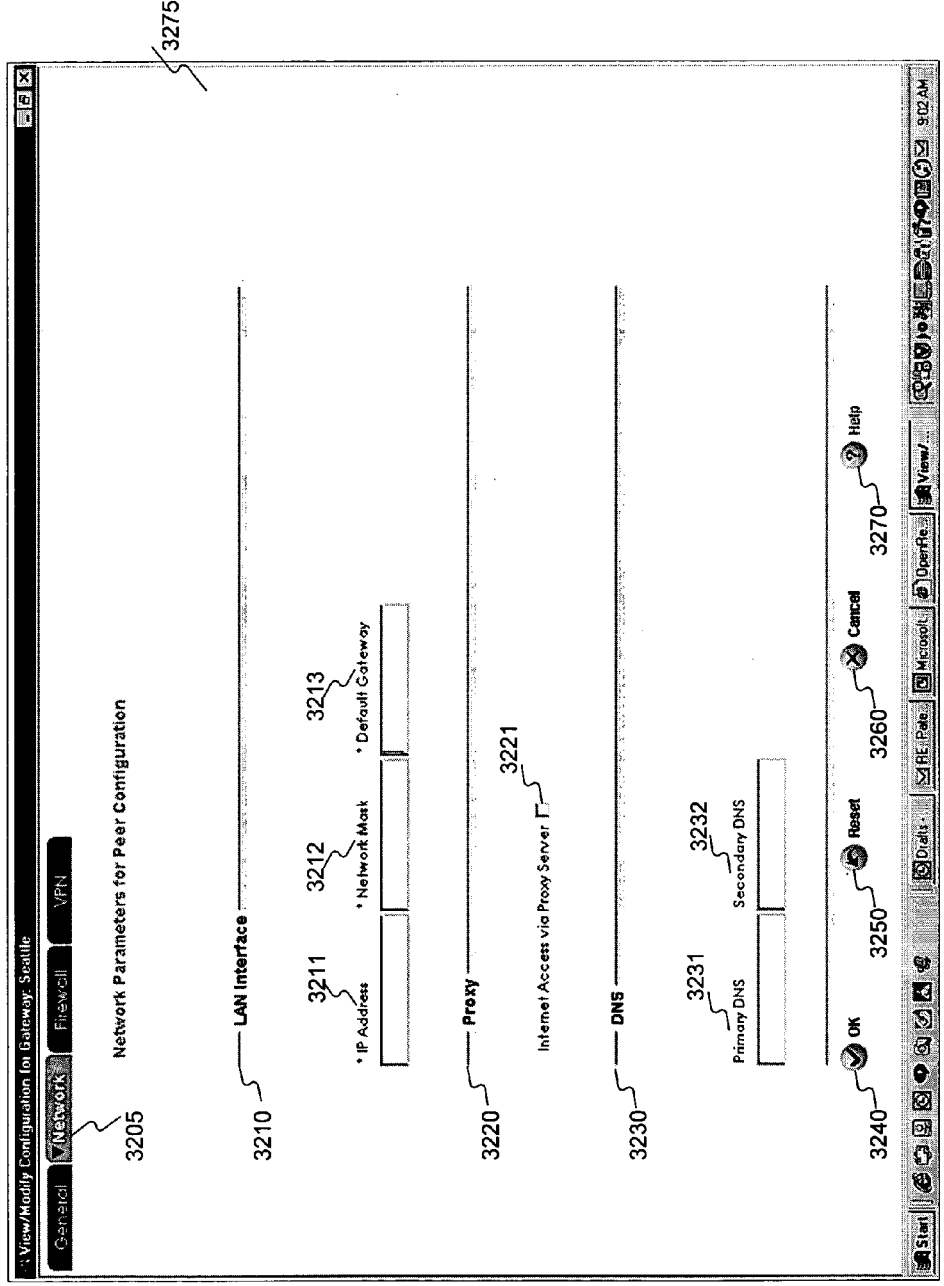
FIG. 32 is an exemplary graphical user interface of a network operations center for providing local network configuration information, in accordance with methods and systems consistent with the present invention.

The user may then access another web page to configure an interface to the local area network 2570. FIG. 32 is an exemplary graphical user interface, such as a web page 3275 of the network operations center 610 for providing local network configuration information, in accordance with methods and systems consistent with the present invention. The user may access the web page 3275 in the network operations center 610 and select a Network 3205 tab to specify a network configuration for the virtual network. The user may specify parameters of the local area network 2560, such as an Internet protocol address 3211, network mask 3212, and default gateway address 3213. The user may select 3221 whether the gateway 2520 functions as a proxy server 3220 that provides access to the base network 2540 from the local area network 2560. The user may also specify name servers 3230 for the base network 2540, such as a primary 3231 and a secondary 3232 Internet domain name server.

In an alternative embodiment (not shown), all or a portion of the registration information for the gateway 2520 may be presented on the web page 3275 for confirmation, rather than requiring the user to enter the information. For example, the network operations center 610 may retrieve previously stored registration information for the gateway 2520 from database server 616. The network operations center 610 may then send the retrieved registration information to the user as default settings for web page 3275. The user may then confirm the retrieved registration information.

In addition, the user may download program code from the network operations center 610 to automatically determine a portion or all of the registration information. For example, the user may execute program code to determine the real IP address of the gateway 2520, such as a script for executing a traceroute. The executed program code may then prepopulate the web page 3275 with the determined registration information before presenting the web page 3275 to the user and requesting confirmation from the user.

The user may alter the configuration of the virtual network by making changes and selecting an OK 3240 button or may revert to a previous configuration of the virtual network by selecting a Reset 3250 button. The user may also select a Cancel 3260 button to abort any changes made and exit from the network configuration page. Additionally, the user may select a help button 3270 to request additional help.

Figure 33:
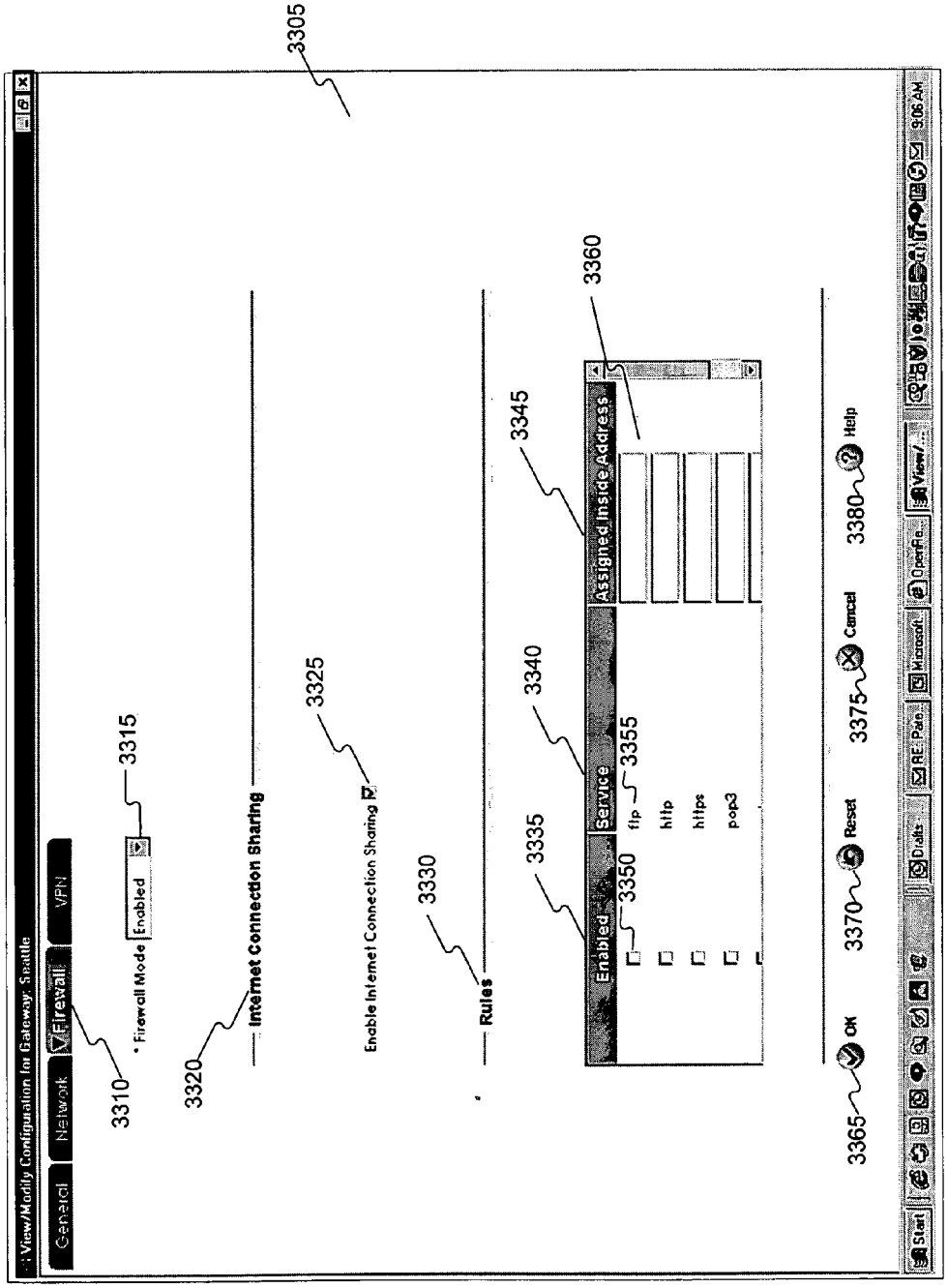
FIG. 33 is an exemplary graphical user interface of a network operations center for configuring a firewall in the virtual network, in accordance with methods and systems consistent with the present invention.

The user may then configure a firewall (shown in FIG. 31) between the local area network 2560 and the base network 2540 from the network operations center 610. FIG. 33 is an exemplary graphical user interface, such as a web page 3305 of the network operations center 610 for configuring a firewall, in accordance with methods and systems consistent with the present invention. The user may access the web page 3305 and select Firewall 3310 tab to configure features of the firewall. The user may enable or disable the firewall features with the Firewall Mode 3315 control. The user may also control whether a local area network 2560 is allowed to access the base network 2540. The user may allow the local area network 2560 to access the base network 2540 using connection sharing 3320 by selecting the Enable Internet Connection Sharing 3325 control.

When connection sharing 3320 is not enabled, the local area network 2560 may be restricted from accessing through the gateway 2520 other processors that do not interface the gateway 2520 via tunnel 2555. The gateway 2520 may allow communications from one site 2570 through the tunnel 2555 to another site 2580, while restricting information flowing through the gateway 2520 but not destined to the tunnel 2555, such as information destined to another processor in the base network 2540 that does not interface the gateway 2520 via the tunnel 2555. For example, the gateway 2520 may allow packets from the first local area network 2560 to flow through the tunnel 2555, while restricting packets from the first local area network 2560 to an Internet web site that does not interface the gateway 2520 via the tunnel 2555.

When connection sharing 3320 is enabled, the local area network 2560 may access the base network 2540 through the gateway 2520, and the base network 2540 may access the local area network 2560 through the gateway 2520. The user may restrict the type of access permitted through the gateway 2520 by enabling the firewall with the Firewall Mode 3315 control. When the firewall is enabled, the user may establish rules 3330 that selectively restrict information flowing through the gateway 2520 and between the base network 2540 and the local area network 2560.

The user may also specify which services 3340 of the base network 2540 are enabled 3335. Furthermore, the user may route service 3340 requests for the base network 2540 to specific processors in the local area network 2560 by identifying a processor in the local area network 2560, for example, identifying the processor's assigned address 3345. For example, the user may route ftp 3355 service requests to a specific processor in the local area network 2560 by selecting the enable 3350 box and specifying an address 3360 for the processor.

The user may select an OK 3365 button to accept any changes made to web page 3305 and alter the firewall configuration or select a Reset 3370 button to revert to a previous firewall configuration. The user may select a Cancel 3375 button to abort any changes made and exit from the firewall configuration page. Additionally, the user may select a Help 3380 button to request additional help.

Figure 34:
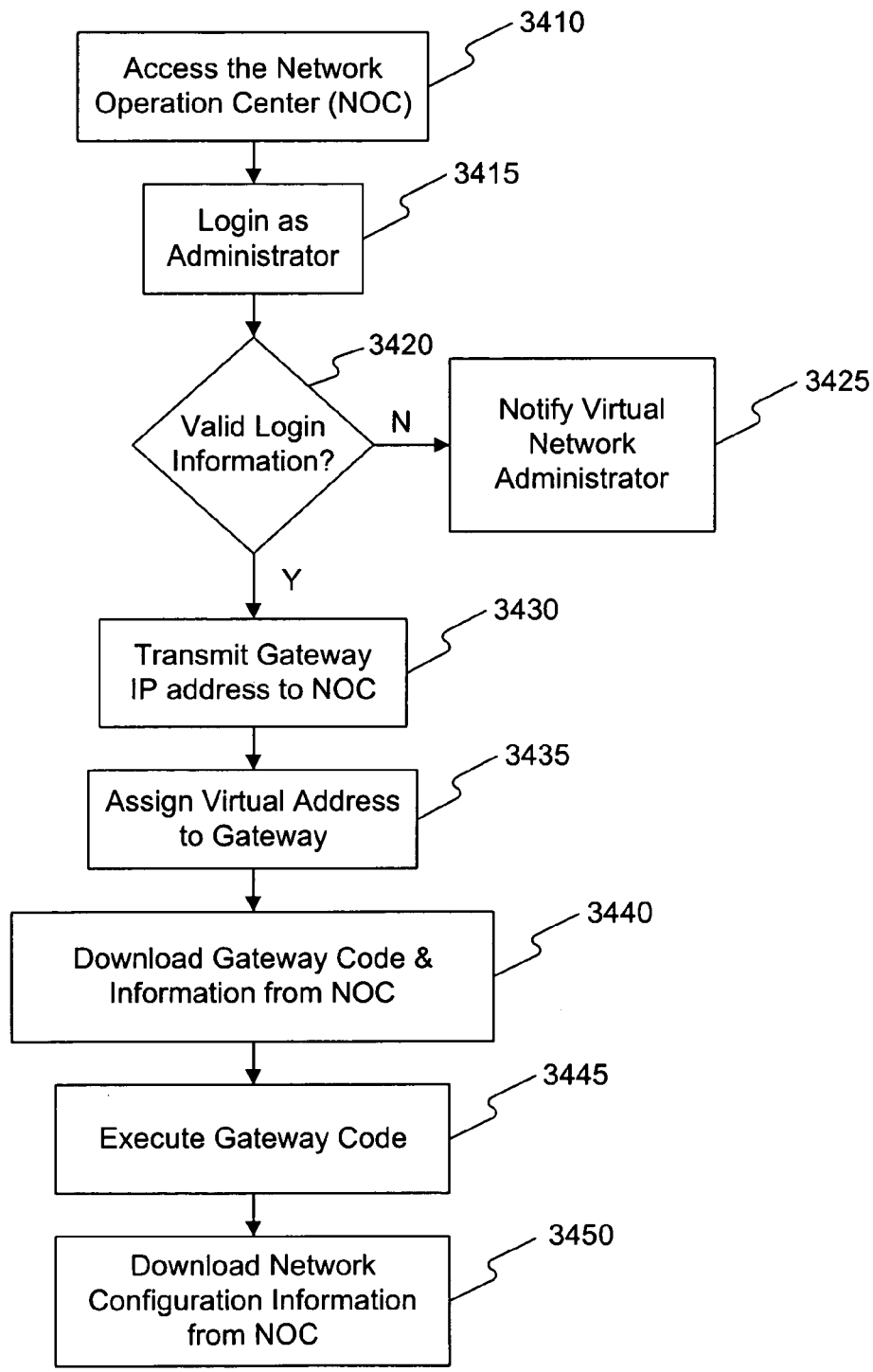
FIG. 34 is an exemplary flow chart of steps for registering a gateway with a network operations center, in accordance with methods and systems consistent with the present invention.

The user may then register with the network operations center 610 a processor, such as a personal computer as the gateway 2520. FIG. 34 is an exemplary flow chart of steps for registering the processor with the network operations center 610, in accordance with methods and systems consistent with the present invention. First, the user may access the network operations center 610 through the base network 2540 (step 3410). The network operations center 610 may assign one or more login accounts through which the user may access the network operations center 610 to administer the virtual network.

The network operations center 610 may also assign to the user one or more login accounts for the user to enter problem reports, or to generate quality-of-service reports, but do not allow the user to configure the network 2510. The user may designate login accounts authorized to perform administrative tasks, such as configuring the virtual network.

When the user attempts to login and configure the network 2510 (step 3415), the network operations center 610 may determine whether the user is authorized to configure the virtual network (step 3420). If the user is not authorized to configure the virtual network, then the network operations center 610 may notify an administrator for the network operation center 610 and a designated administrator for the virtual network (step 3425).

If the user is authorized to configure the virtual network, then the user may access the web page 3275 (shown in FIG. 32) and indicate a routable address for the gateway 2520, such as an IP address routable in the Internet 620 (step 3430). The network operations center 610 may also assign to the gateway 2520 a virtual address that is routable in the virtual network (step 3435). Next, the user may download code and information from the network operations center 610 (step 3440). The user may execute the code on a processor, such as a personal computer, configuring the processor as the gateway 2520 based on the provided information (step 3445). Then the gateway 2520 may download additional information about the virtual network from the network operations center 610 (step 3450).

Figure 35:
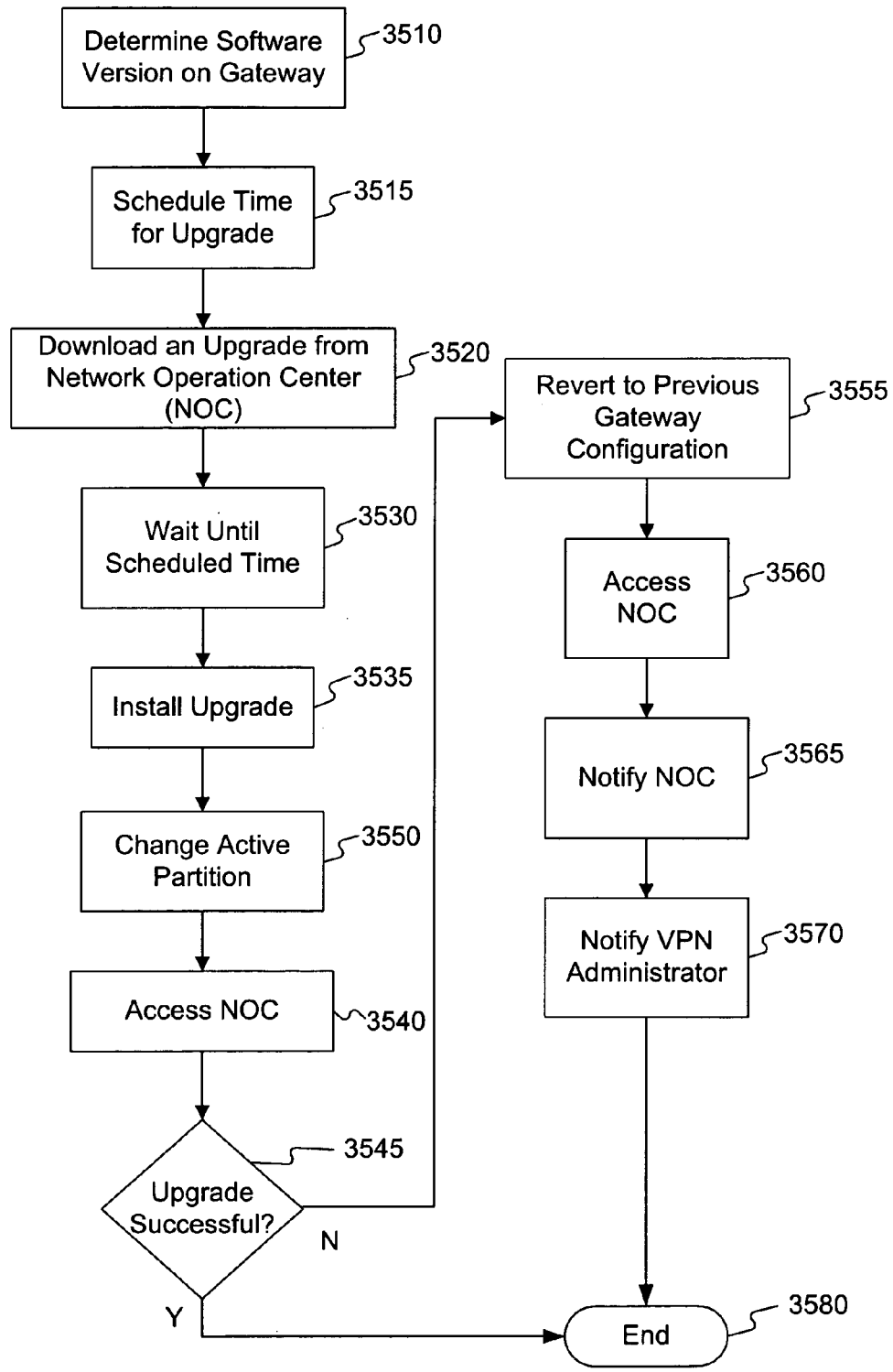
FIG. 35 is an exemplary flow chart of steps for upgrading a configuration of a gateway, in accordance with methods and systems consistent with the present invention.

After the user configures the gateway 2520, the network operations center 610 may reconfigure the gateway 2520 automatically. FIG. 35 is an exemplary flow chart of steps for upgrading the configuration of the gateway 2520, in accordance with methods and systems consistent with the present invention. The network operations center 610 may determine a version of the code and configuration information for gateway 2520 by communicating with the gateway 2520 through the tunnel 2545 (step 3510). If an upgrade is available, the network operations center 610 may schedule a time 3140 for the upgrade (step 3515). The gateway 2520 may then download code and information for the upgrade from the network operations center 610 to an inactive partition of the storage module 250 in the gateway 2520 (step 3520). The gateway 2520 may then wait until the scheduled time 3140 (step 3530).

At the scheduled time 3140, the gateway 2520 may install the upgrade (step 3535) and designate that the partition of the storage module 250 containing the upgraded configuration is active and that the partition including the previous configuration is inactive (step 3550). Then the gateway 2520 may attempt to access the network operations center 610 using the upgraded configuration (step 3540). The gateway 2520 may determine that the upgrade is successful if the gateway 2520 establishes a tunnel 2545 to the network operations center 610 (step 3545). If the upgrade is successful, the upgrade process may terminate (step 3580).

If the upgrade is not successful, the gateway 2520 may revert to the previous configuration (step 3555) and establish a tunnel 2545 to access the network operations center 610 (step 3560). The gateway 2520 may notify the network operations center 610 through the tunnel 2545 that the upgrade is not successful (step 3565). The network operations center 610 may then notify the administrator of the virtual network (step 3570) and the upgrade process may terminate (step 3580).

Figure 36:
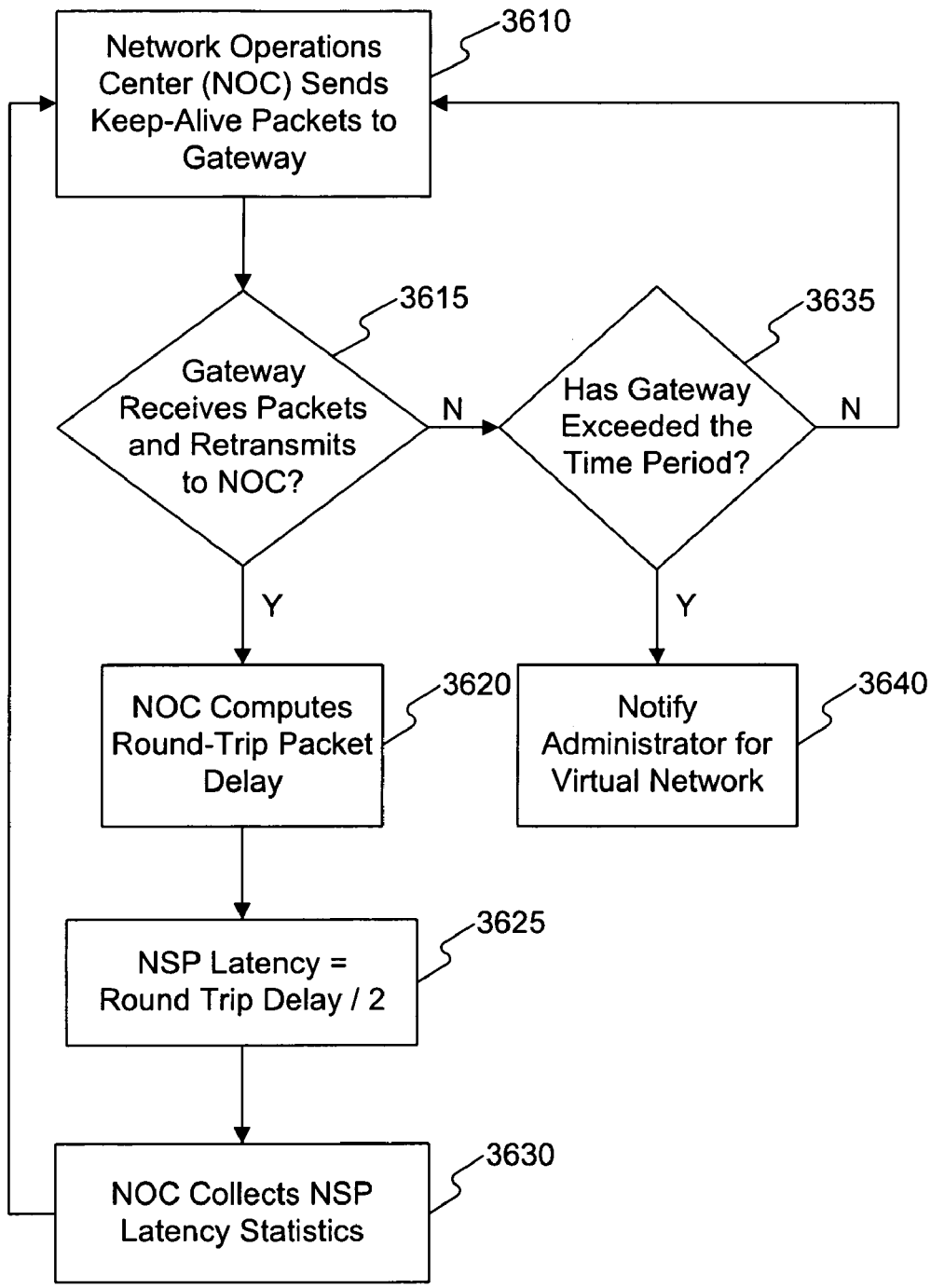
FIG. 36 is an exemplary flow chart of steps for estimating latency of a network service provider, in accordance with methods and systems consistent with the present invention.

Once the gateway 2520 is configured, the network operations center 610 may monitor the latency of the network service provider 2525. FIG. 36 is an exemplary flow chart of steps for estimating latency of the network service provider 2525 (shown in FIG. 25), in accordance with methods and systems consistent with the present invention. The network operations center 610 may send "keep-alive" packets to the gateway 2520 (step 3610), which may in turn send them back to the network operations center 610 (step 3615). If the gateway 2520 does not send back the "keep-alive" packets, then the network operations center 610 may determine whether the gateway 2520 has exceeded a time period threshold for detecting a service interruption (step 3635). If the network operations center 610 determines that the gateway 2520 has exceeded the time period threshold, then the network operations center 610 may notify the administrator of the virtual network (step 3640).

If the gateway 2520 does send back the packets, then the network operations center 610 may receive the packets and compute the round-trip delay between the time the network operations center 610 sent the packets and the time the network operations center 610 received the packets (step 3620). The network operations center 610 may estimate the latency of the network service provider 2525 by dividing the round-trip delay in half (step 3625). Then, the network operations center 610 may archive the estimated latency (step 3630).

Figure 37:
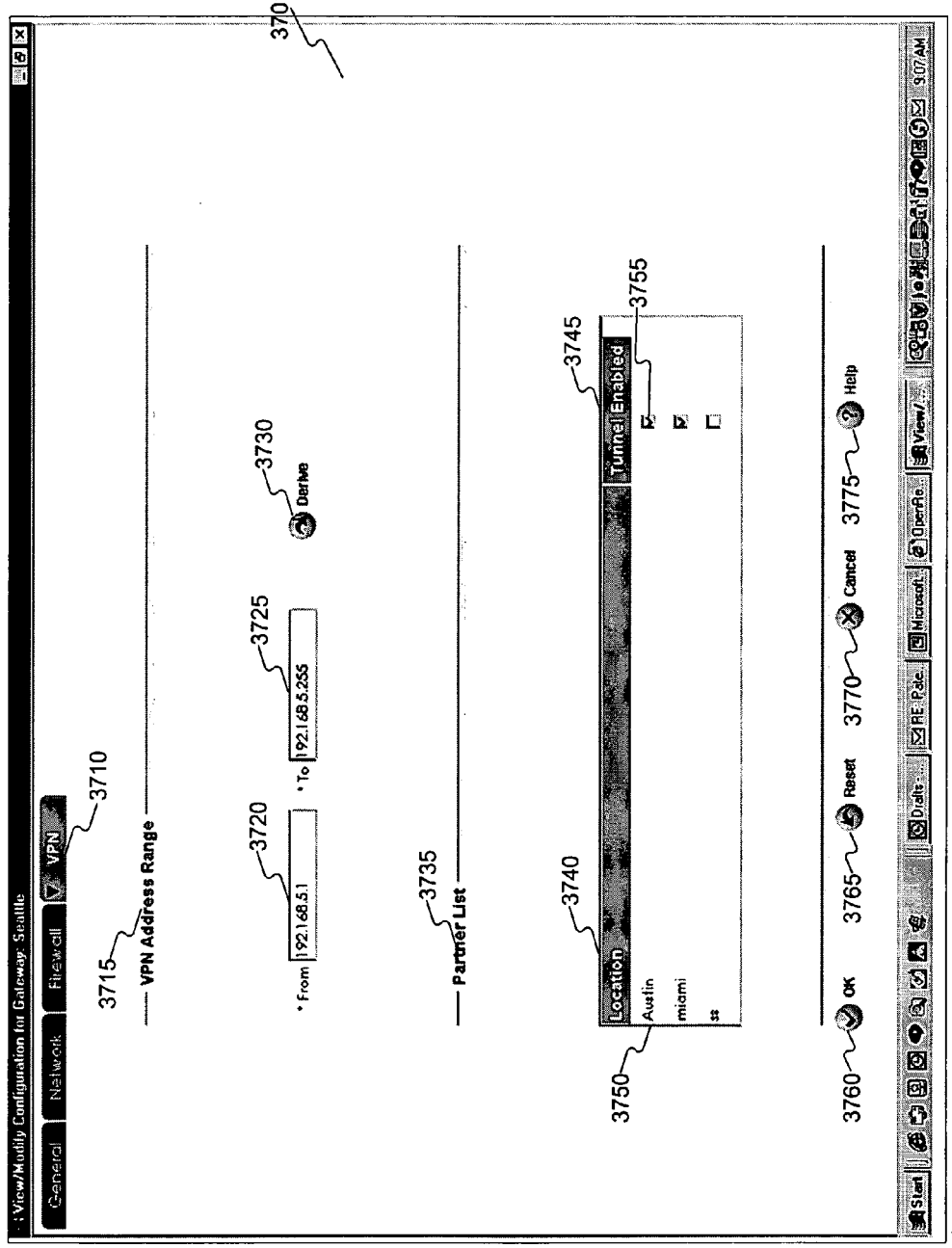
FIG. 37 is an exemplary graphical user interface of a network operations center for configuring a tunnel through the base network, in accordance with methods and systems consistent with the present invention.

Once the gateways 2520 and 2530 are configured, the user may enable the tunnel 2555 through the base network 2540 from the network operations center 610. FIG. 37 is an exemplary graphical user interface, such as a web page 3701 provided by the network operations center 610 for configuring the tunnel 2555 through the base network 2540, in accordance with methods and systems consistent with the present invention. The user may access web page 3701 and select a VPN 3710 tab to configure one or more features of the virtual network. For example, the user may set a VPN address range 3715 assigned to the gateway 2520 by specifying a first virtual address 3720 and a last virtual address 3725 in the VPN address range 3715. Then, the user may click on a Derive 3730 button to assign the specified VPN address range 3715 to the gateway 2520. The user may also use the VPN address range to create an Access Control List (not shown).

The user may indicate consent to enabling the tunnel 2555 between the gateway 2520 and another gateway 2530 by selecting from a potential partner list 3735. The potential partner list 3735 may include a location 3740 field indicating a name 3750 of the gateway 2530 and a Tunnel Enabled 3745 field. For example, the user may indicate consent to enabling the tunnel 2555 between the "Seattle" gateway 2520 and the "Austin" gateway 2530 by selecting the appropriate Tunnel Enabled 3755 control. The network operation center 610 may then determine that the "Seattle" and "Austin" gateways 2520, 2530 mutually consent to enabling the tunnel 2555 and then place "Seattle" on the partner list (as shown in FIG. 11A) for the "Austin" gateway and "Austin" on the partner list for the "Seattle" gateway.

The user may select an OK 3760 button to accept any changes made to web page 3701 and alter the tunnel 2555 configuration, or select a Reset 3765 button to revert to a previous tunnel 2555 configuration. The user may select a Cancel 3375 button to abort any changes and exit from the web page 3701. Additionally, the user may select a Help 3380 button to request additional help.

After the tunnel 2555 is enabled, the network operations center 610 may send the partner list to the gateways 2520 and 2530, which may then establish the tunnel 2555 through the base network 2540. Accordingly, the tunnel 2555 established between the gateways 2520 and 2530 may form a virtual network over the base network 2540.

Figure 38:
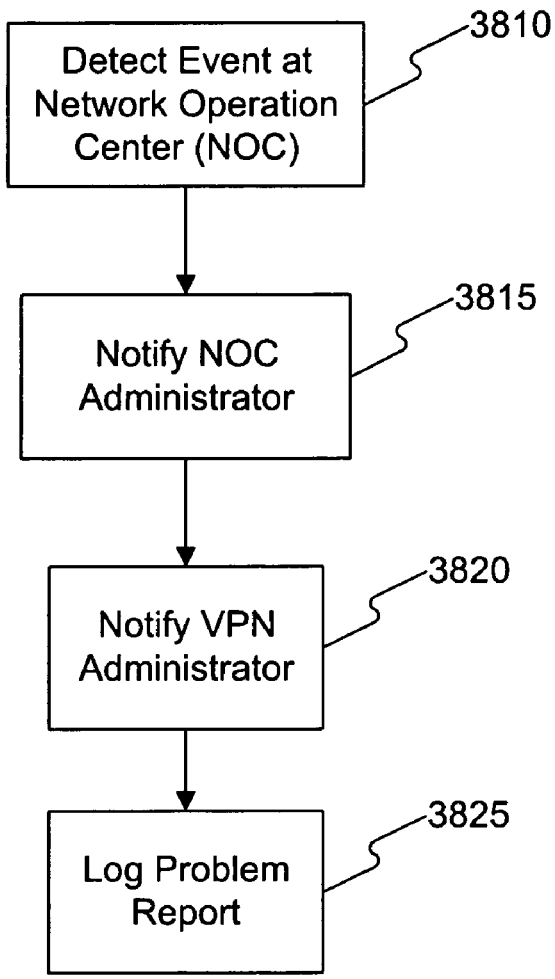
FIG. 38 is an exemplary flow chart of steps performed by the network operations center to monitor a virtual network, in accordance with methods and systems consistent with the present invention.

After establishing the virtual network, the network operations center 610 may monitor the virtual network and notify the user if an event occurs. FIG. 38 is an exemplary flow chart of steps performed by the network operations center 610 to monitor the virtual network, in accordance with methods and systems consistent with the present invention. The network operations center 610 may detect an event, such as an attempt to reconfigure the virtual network by a user who is not authorized to configure the network (step 3810). The network operations center 610 may then notify an administrator of the network operations center 610 (step 3815). The network operations center 610 may also notify the designated administrator of the virtual network (step 3820). The network operations center 610 may also log the detected event in a database of problem reports (step 3825).

Figure 39:
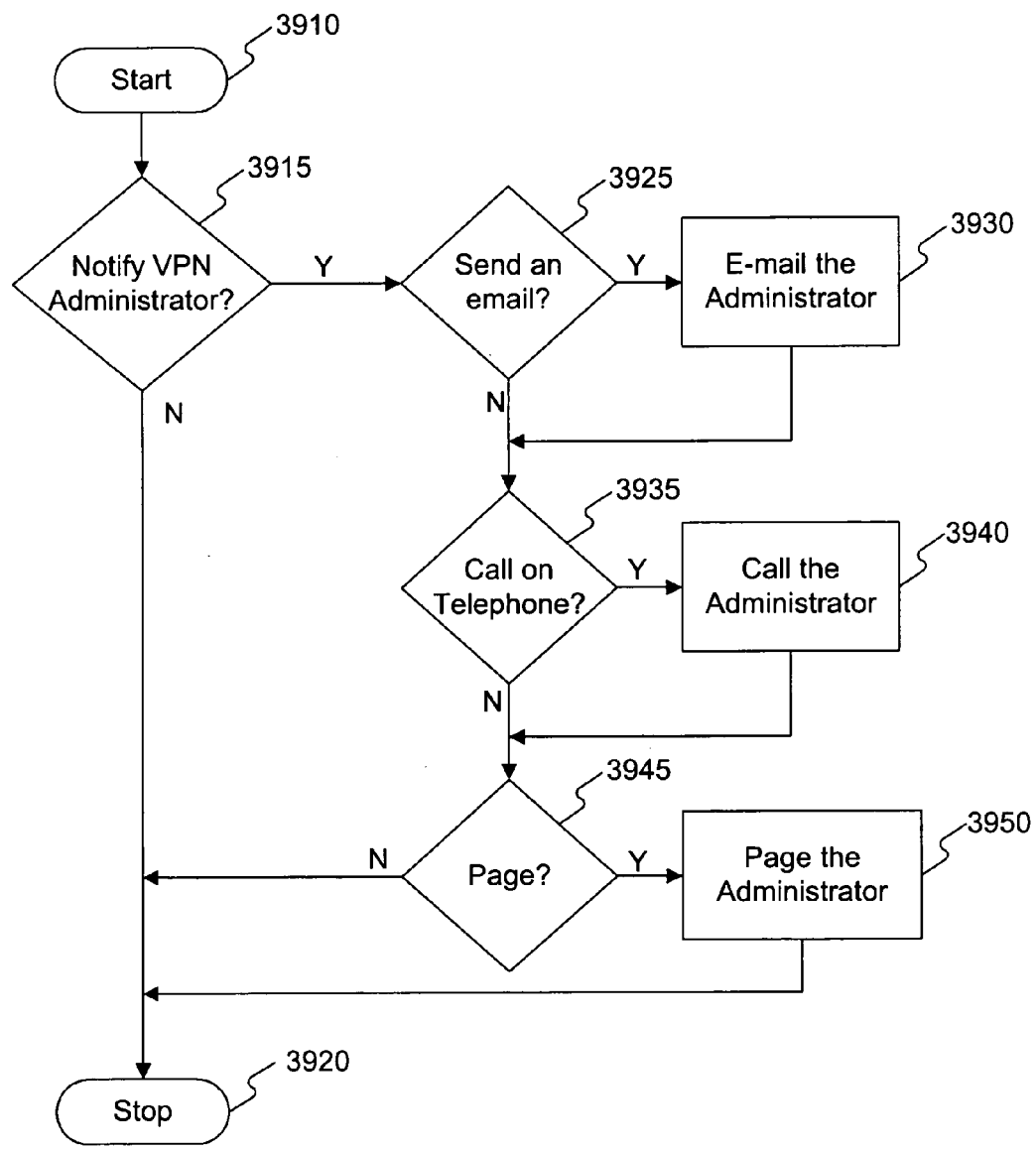
FIG. 39 is an exemplary flow chart of steps performed by a network operations center to notify an administrator of a virtual network, in accordance with methods and systems consistent with the present invention.

The network operations center 610 may selectively notify the user of detected events. FIG. 39 is an exemplary flow chart of steps performed by the network operations center 610 to notify the administrator of the virtual network, in accordance with methods and systems consistent with the present invention. The network operations center 610 may execute a process to notify the administrator of the virtual network upon detecting an event (step 3910). First, the network operations center 610 may determine whether the administrator of the virtual network should be notified of the event (step 3915). The administrator may specify performance thresholds (not shown) for quality-of-service statistics, such as a duration of a loss of gateway availability. For example, the administrator may specify a duration for the event, such as to notify the administrator immediately, to notify the administrator after 15 minutes, 30 minutes, 1 hour, 2 hours, 4 hours, 8 hours, or to never notify the administrator. If the quality-of-service statistics exceed the specified performance thresholds, the network operations center 610 may alert the administrator. If the network operations center 610 determines that the administrator need not be notified, then the network operations center 610 may terminate the process (step 3920). For example, the administrator may indicate whether or not to be notified when the 2520 gateway fails to communicate with the network operations center 610 after a software upgrade.

Otherwise, the network operations center 610 may determine whether to send an email to the administrator (step 3925). If an email address 2645 is provided for the administrator, the network operations center 610 may send an email to the administrator (step 3930). The network operations center 610 may also determine whether to call the administrator on the telephone (step 3935). If a telephone number 2640 is provided for the administrator, the network operations center 610 may call the telephone number (step 3940). The network operations center 610 may further determine whether to page the administrator by sending a pager message (step 3945). If a pager number is provided for the administrator, the network operations center 610 may send a pager message to the pager number (step 3950). Finally, the network operations center 610 may terminate the notification process (step 3920). The network operations center 610 may notify the administrator by one or more of the following: sending an email (step 3930), calling on the telephone (step 3940), and paging the administrator (step 3950). The network operations center 610 may also notify more than administrator about an event. In an alternative embodiment (not shown), the administrator may be notified by a customer care center.

Figure 40:
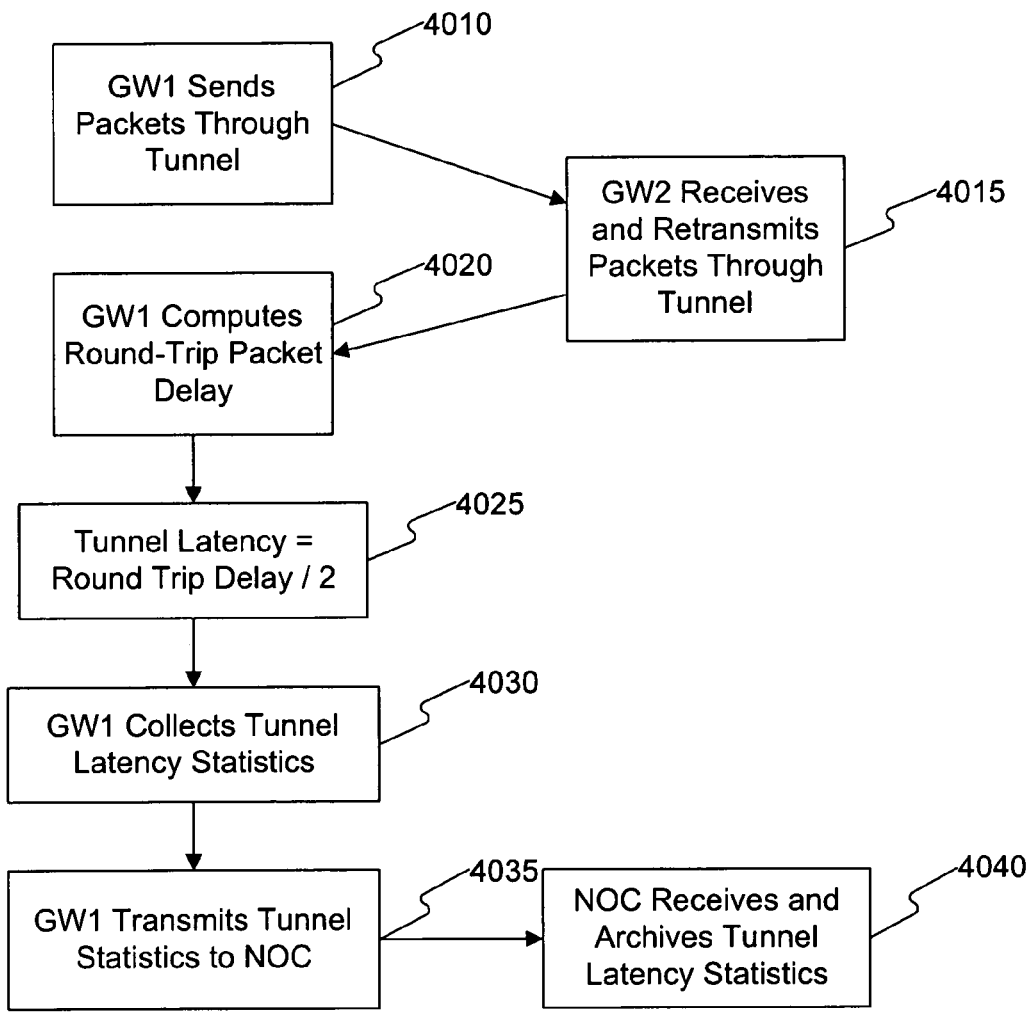
FIG. 40 is an exemplary flow chart of steps for estimating latency of a tunnel through a base network, in accordance with methods and systems consistent with the present invention.

After the user establishes the tunnel 2555 through the base network 2540, the gateway 2520 may monitor the latency of the tunnel 2555. FIG. 40 is an exemplary flow chart of steps for estimating latency of the tunnel 2555 through the base network 2540, in accordance with methods and systems consistent with the present invention. The gateway 2520 may send packets, such as ICMP packets through the tunnel 2555 to another gateway 2530 (step 4010). The other gateway 2530 may receive and send back the packets through the tunnel 2555 to the gateway 2520 (step 4015). The gateway 2520 may receive the packets and compute the round-trip delay between the time the gateway 2520 sent the packets and the time the gateway 2520 received the packets (step 4020). The gateway 2520 may estimate the tunnel latency by dividing the round-trip delay in half (step 4025). The gateway 2520 may collect tunnel latency statistics for a period of time, such as 5 minutes (step 4030). Then, the gateway 2520 may send the tunnel latency statistics to the network operations center 610 (step 4035), which may archive the tunnel latency statistics (step 4040).

After the user establishes the tunnel 2555 through the base network 2540, the network operations center 610 may monitor tunnel performance statistics using records transmitted by the gateway 2520. FIG. 41 is an exemplary record of tunnel performance statistics that the gateway 2520 may send to the network operations center 610, in accordance with methods and systems consistent with the present invention. FIG. 41 shows exemplary monitoring information 4105 that the gateway 2520 may send to the network operations center 610. The monitoring information 4105 may include information about the gateway 2520, such as a name field 4110 indicating the name 3111 of the gateway 2520, an address field 4115 indicating the virtual address of the gateway 2520, and a time field 4120 indicating how long the gateway 2520 has been operating.

The monitoring information 4105 may also include information about each tunnel 2555 established through the gateway 2520, such as an address field 4125 indicating the virtual address of the other gateway 2530, an age field 4130 indicating the age of the tunnel 2555, tunnel bandwidth statistics 4135, and tunnel latency statistics 4140. Tunnel bandwidth statistics 4135 may include a time-of-day, a time interval between bandwidth measurements, a number of bytes transmitted, and a number of packets transmitted. Tunnel latency statistics 4140 may include a time-of-day, a time interval between latency measurements, a minimum latency measured, a maximum latency measured, and an average latency measured.

The monitoring information 4105 may further include information about the interface 2525 between the gateway 2520 and the base network 2540, such as a name field 4145 indicating the type of interface and bandwidth statistics 4150. The bandwidth statistics 4150 may include a time-of-day, a time interval between bandwidth measurements, a number of bytes transmitted through the interface 2525, a number of packets transmitted, a number of packets transmitted through the interface 2525, a number of transmit errors, a number of transmitted packets that are dropped, a number of bytes received through the interface 2525, a number of packets received through the interface 2525, a number of receive errors, and a number of received packets that are dropped. When the network operations center 610 receives the monitoring information 4105 from the gateway 2520, the network operations center 610 may archive the monitoring information 4105. Based on the monitoring information 4105, the network operations center 610 may then generate quality of service reports showing the bandwidth, latency or availability of each gateway 2520 and tunnel 2555 in the virtual network.

Figure 42:
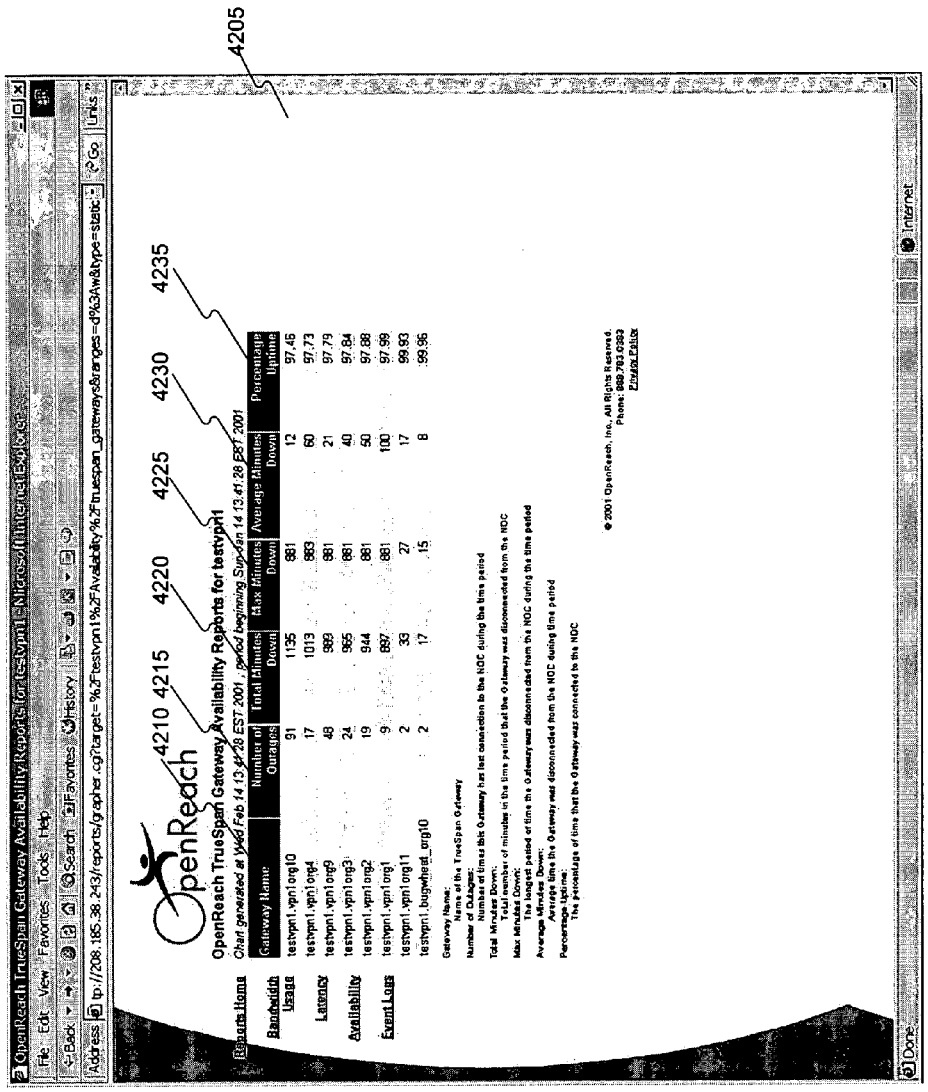
FIG. 42 is an exemplary report provided by a network operations center for comparing availability of gateways, in accordance with methods and systems consistent with the present invention.

The network operations center 610 may use the monitoring information 4105 provided by the gateway 2520 to monitor the availability of the gateway 2520. FIG. 42 is an exemplary report, such as a web page 4205 provided by the network operations center 610 for comparing availability of gateways 2520 and 2530, in accordance with methods and systems consistent with the present invention. The web page 4205 may include a Gateway Name field 4210 identifying each gateway. For each gateway, the web page 4205 may also include a Number of Outages field 4215 indicating how many times the gateway is disconnected from the network operations center 610 during the reporting period, a Total Minutes Down field 4220 indicating the period the gateway is disconnected, a Max Minutes Down field 4225 indicating the longest period that the gateway is disconnected. The web page 4205 may also include quality of service metrics, such as an Average Minutes Down field 4230 indicating the average period the gateway is disconnected, and a Percentage Uptime field 4235 indicating the percentage of time that the gateway is connected to the network operations center 610.

Figure 43:
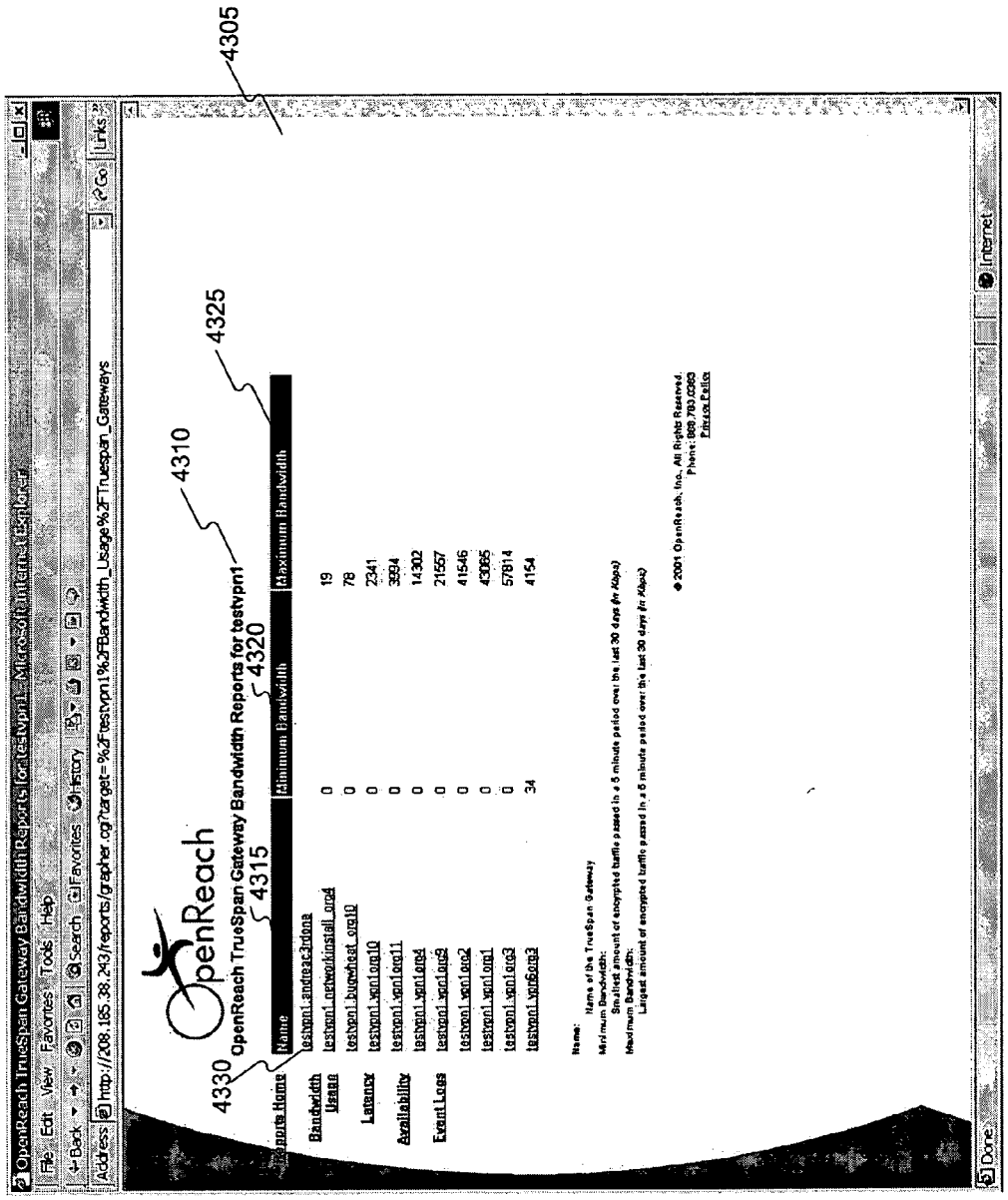
FIG. 43 is an exemplary graphical user interface of a network operations center for providing a comparison of the through puts of gateways in a virtual network, in accordance with methods and systems consistent with the present invention.

The network operations center 610 may also use the monitoring information 4105 provided by the gateway 2520 to provide a comparison of throughput of gateways. FIG. 43 is an exemplary graphical user interface, such as a web page 4305, of the network operations center 610 for providing a comparison of the throughputs of gateways 2520 and 2530 in the virtual network, in accordance with methods and systems consistent with the present invention. The web page 4305 may include a name 4310 of the virtual network and a Name field 4315 identifying each gateway. For each gateway, the web page 4305 may include a Minimum Bandwidth field 4320 indicating the smallest amount of encrypted traffic passed over the last 30 days and a Maximum Bandwidth field 4325 indicating the largest amount of encrypted traffic passed over the last 30 days, where traffic is measured during a 5 minute period. The name 4330 of each gateway may include a hyperlink to a detailed Gateway Bandwidth web page described below with respect to FIG. 44.

Figure 44:
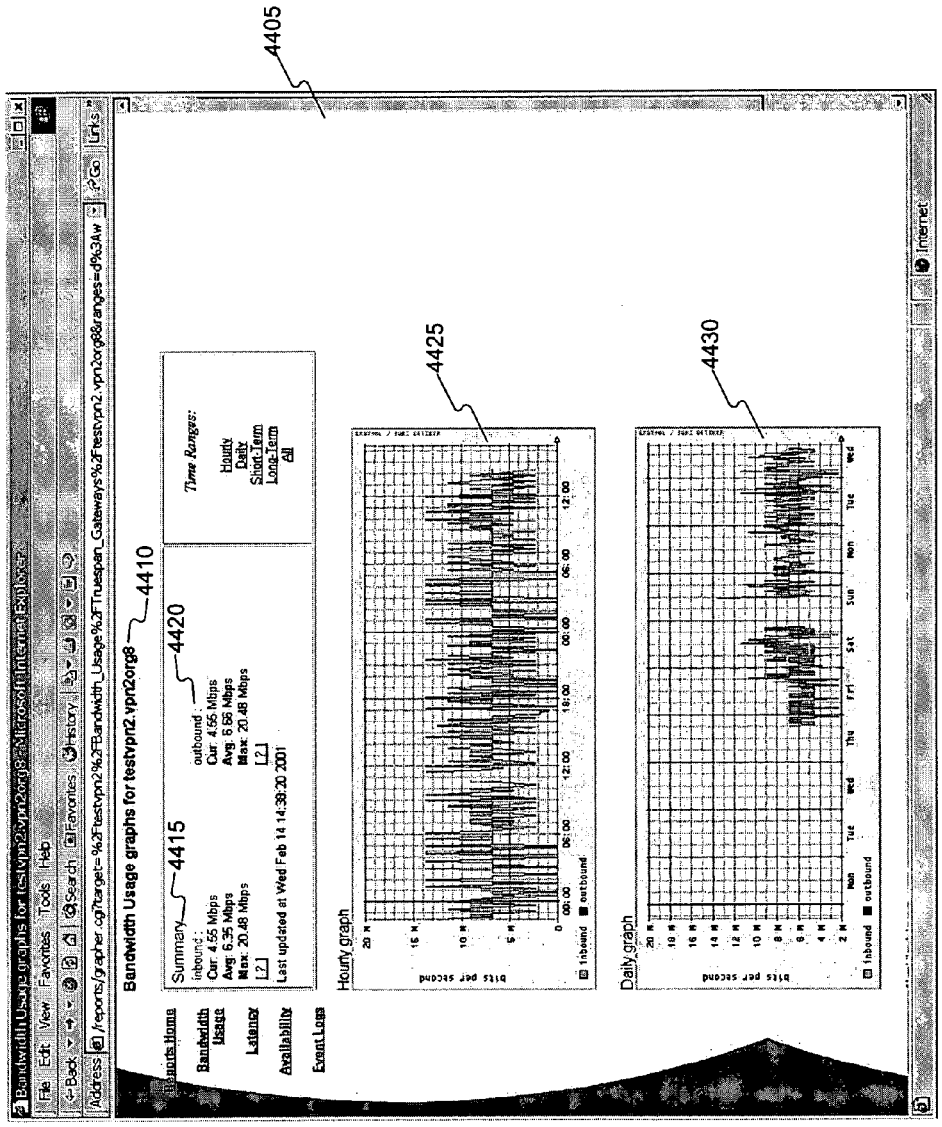
FIG. 44 is an exemplary report provided by a network operations center about the throughput of a gateway in a virtual network, in accordance with methods and systems consistent with the present invention.

The network operations center 610 may further use the monitoring information 4105 provided by the gateway 2520 to provide a report of throughput for the gateway 2520. FIG. 44 is an exemplary report, such as a web page 4405 provided by the network operations center about the throughput of the gateway 2520 in the virtual network, in accordance with methods and systems consistent with the present invention. The web page 4405 may include the name 4410 of the virtual network and gateway 2520, and a summary of inbound throughput statistics 4415 and outbound throughput statistics 4420. The inbound throughput statistics 4415 may include the current inbound throughput, average inbound throughput, and maximum inbound throughput in a specified time period. The outbound throughput statistics 4420 may include the current outbound throughput, average outbound throughput, and maximum outbound throughput in a specified time period. The specified time period may be a previous hour, a previous day, or since the time the gateway 2520 is enabled. The web page 4405 may further include an hourly graph 4425 and a daily graph 4430 showing inbound and outbound throughput through the gateway 2520.

Figure 45:
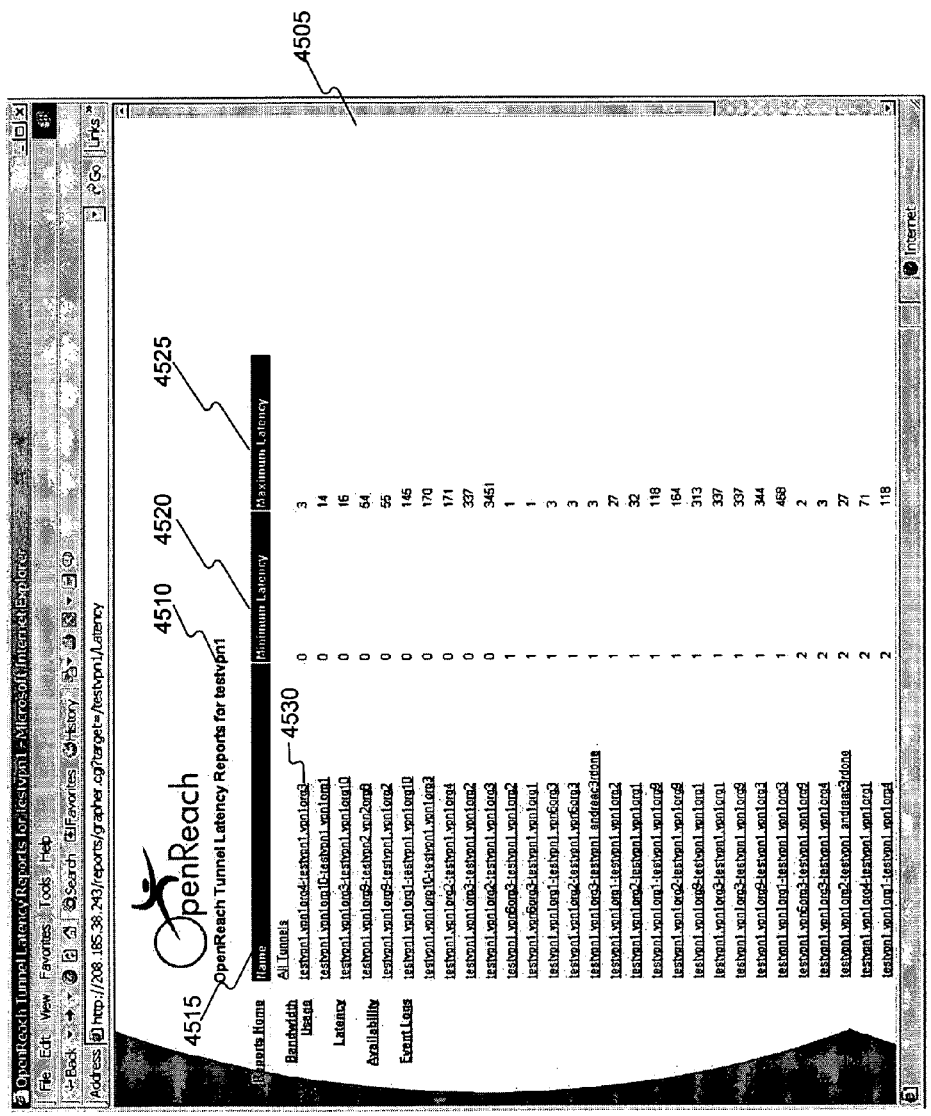
FIG. 45 is an exemplary graphical user interface of a network operations center for providing comparisons of latency statistics in a virtual network, in accordance with methods and systems consistent with the present invention.

The network operations center 610 may still further use the monitoring information 4105 provided by the gateway 2520 to provide a comparison of the latency statistics for tunnels in the virtual network. FIG. 45 is an exemplary graphical user interface, such as a web page 4505, of the network operations center 610 for providing comparisons of latency statistics in the virtual network, in accordance with methods and systems consistent with the present invention. The web page 4505 may include a name 4510 of the virtual network and a Name field 4515 identifying each tunnel in the virtual network. For each tunnel, such as the tunnel 2555, the web page 4505 may include a Minimum Latency field 4520 indicating the smallest latency for encrypted traffic passed through each tunnel 2555 during the last 30 days, and a Maximum Latency field 4525 indicating the largest latency for encrypted traffic passed through each tunnel during the last 30 days where latency may be measured in milliseconds. Each tunnel name 4530 may include a hyperlink to a detailed Tunnel Latency report (shown in FIG. 48).

Figure 46:
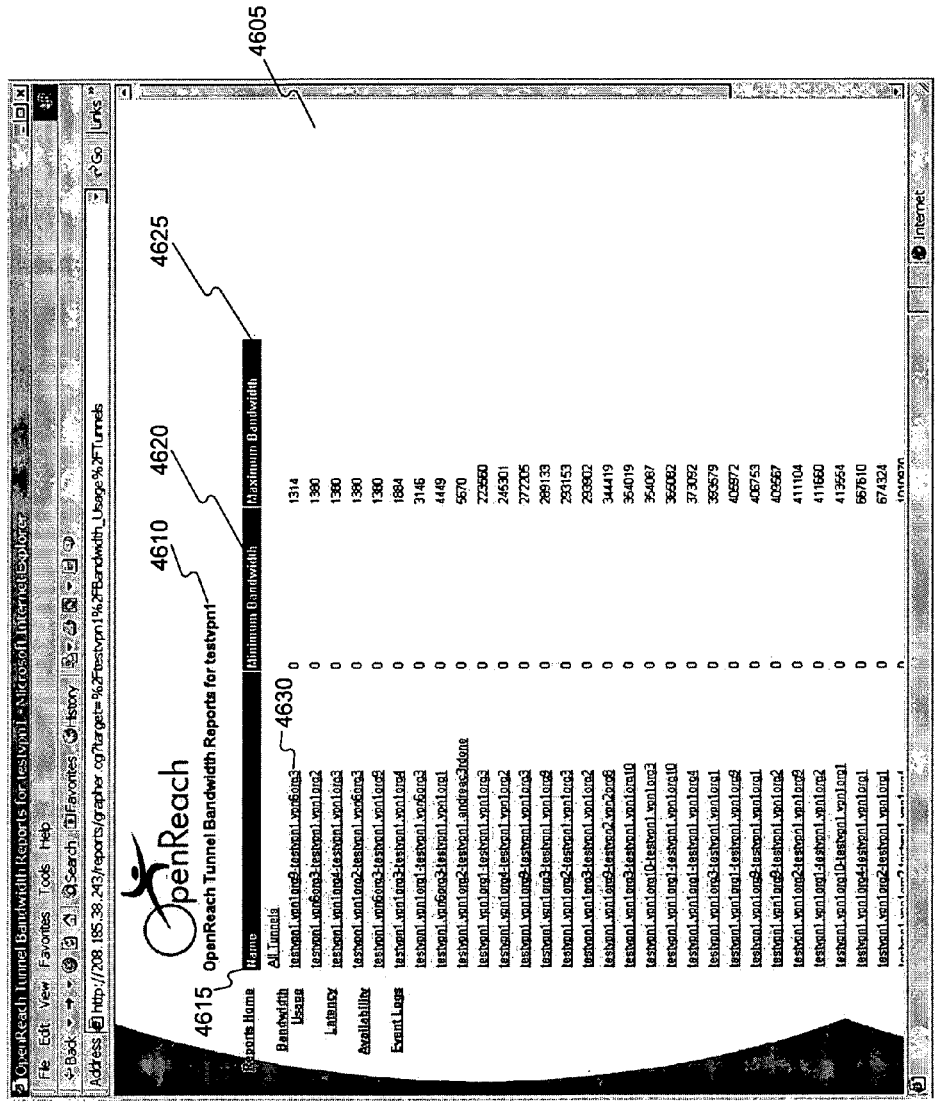
FIG. 46 is an exemplary graphical user interface of a network operations center for providing a comparison of the throughputs of tunnels through a base network, in accordance with methods and systems consistent with the present invention.

The network operations center 610 may also use the monitoring information 4105 provided by the gateway 2520 to provide a comparison of the throughputs of tunnels established through the base network 2540. FIG. 46 is an exemplary graphical user interface, such as a web page 4605 for providing a comparison of the throughputs of tunnels established through the base network 2540, in accordance with methods and systems consistent with the present invention. The web page 4605 may include a name 4610 of the virtual network and a Name field 4615 identifying each tunnel in the virtual network. For each tunnel, the web page 4605 may include a Minimum Bandwidth field 4620 indicating the smallest amount of encrypted traffic passed through each tunnel 2555 during the last 30 days, and a Maximum Bandwidth field 4625 indicating the largest amount of encrypted traffic passed through each tunnel during the last 30 days, where traffic may be measured during a 5 minute period. Each tunnel name 4530 may include a hyperlink to a detailed Tunnel Latency report, which will be described below with respect to FIG. 48.

Figure 47:
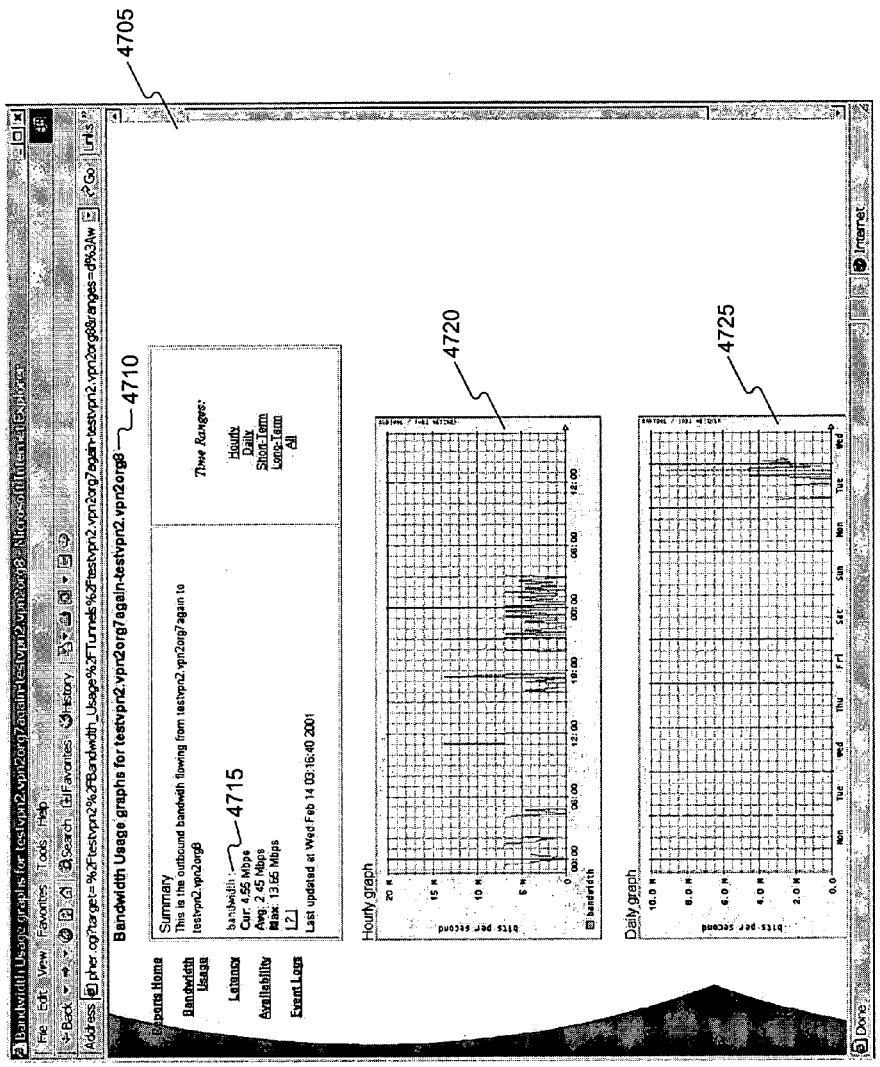
FIG. 47 is an exemplary report provided by a network operations center about the throughput of a tunnel through a base network, in accordance with methods and systems consistent with the present invention.

The network operations center 610 may further use the monitoring information 4105 provided by the gateway 2520 to provide a report of the throughput for the tunnel 2555. FIG. 47 is an exemplary report, such as a web page 4705 provided by the network operations center 610 about the throughput of the tunnel 2555, in accordance with methods and systems consistent with the present invention. The web page 4705 may include a name 4710 of the tunnel 2555 and a summary of tunnel 2555 throughput statistics 4715 including current throughput of tunnel 2555, average throughput of tunnel 2555, and maximum throughput of the tunnel 2555 in a specified time period. The specified time period may be a previous hour, a previous day, or the time since the tunnel 2555 is established. The web page 4705 may further include an hourly graph 4720 and a daily graph 4725 showing the throughput of tunnel 2555.

Figure 48:
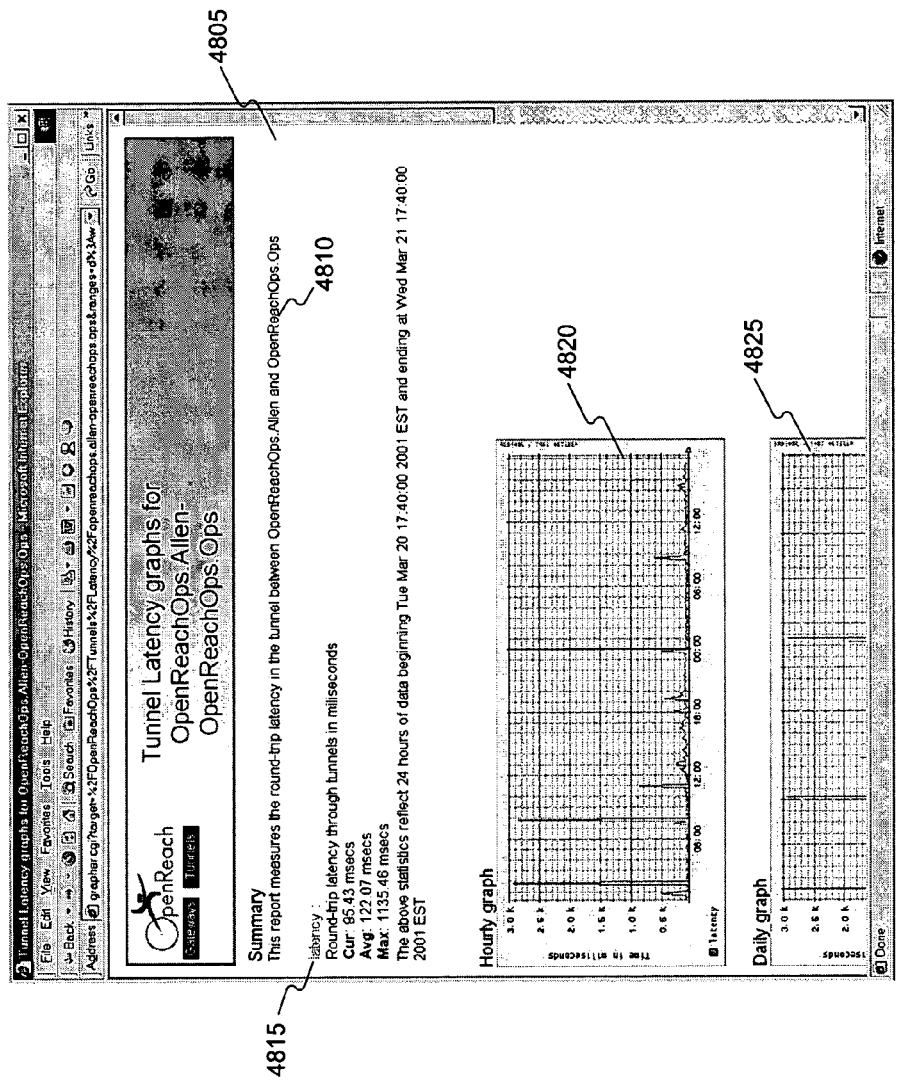
FIG. 48 is an exemplary report provided by a network operations center about the latency of a tunnel through a base network, in accordance with methods and systems consistent with the present invention.

The network operations center 610 may still further use the monitoring information 4105 provided by the gateway 2520 to provide a report of the latency for the tunnel 2555 in the virtual network. FIG. 48 is an exemplary report, such as a web page 4805 provided by the network operations center about the latency of the tunnel 2555, in accordance with methods and systems consistent with the present invention. The web page 4805 may include a name 4810 of the tunnel 2555 and a summary of tunnel 2555 latency statistics 4815 including current latency of the tunnel 2555, average latency of the tunnel 2555, and maximum latency of tunnel 2555 in a specified time period. The specified time period may be a previous hour, a previous day, or the time since the tunnel 2555 is established. The web page 4805 may further include an hourly graph 4820 and a daily graph 4825 showing the throughput of the tunnel 2555.

The above embodiments and other aspects and principles of the present invention may be implemented in various environments. Such environments and related applications may be specially constructed for performing the various processes and operations of the invention or they may include a general-purpose computer or computing platform selectively activated or reconfigured by program code (also referred to as code) to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the present invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. Examples of program instructions include for example micro-code, machine code, such as produced by a compiler, and files containing a high-level code that can be executed by the computer using an interpreter.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing network services using at least one processor interfacing a base network, said method comprising:
   receiving, at the at least one processor, information identifying a user authorized to administer a first processor separate from the at least one processor;
   receiving, at the at least one processor, a base address that is routable in the base network;
   providing, at the at least one processor and through the base network, code and information for configuring the first processor to interface the base network at the received base address;
   executing, at the first processor, the provided code to configure the first processor based on the provided information such that the first processor interfaces the base network; and
   providing, by the at least one processor and through the base network to the first processor, information enabling at least one tunnel through the base network to a second processor separate from the at least one processor, when the first and second processors each communicate to the at least one processor information indicating a consent for enabling the at least one tunnel.

2. The method of claim 1, further comprising:
   providing, by the at least one processor and through the base network to a firewall interfacing the base network, information for use by the firewall to selectively restrict from the first processor information flowing through the base network and destined to the first processor.

3. The method of claim 1, further comprising the steps of:
   upgrading, from the at least one processor and through the base network, the provided code and information in the first processor.

4. The method of claim 1, further comprising the step of:
   disabling, at the at least one processor, the at least one enabled tunnel when at least one of the first and second processors withdraws the consent to enabling the at least one enabled tunnel.

5. The method of claim 1, further comprising the step of:
   determining, at the at least one processor, a quality of service provided by a network service provider providing the first processor with access to the base network.

6. The method of claim 1, further comprising the step of:
   determining, at the least one processor, quality of services provided by two or more network service providers providing the first processor and the second processor with access to the base network.

7. The method of claim 6, further comprising the step of:
   providing a comparison of the determined quality of services across the two or more network service providers.

8. The method of claim 1, further comprising the step of:
   notifying, by the at least one processor, the identified user when the first processor is unable to establish the at least one enabled tunnel to the second processor through the base network.

9. The method of claim 8, wherein the step of notifying the identified user comprises the step of:
   sending an email to an email address specified by the identified user.

10. The method of claim 8, wherein the step of notifying the identified user comprises the step of:
    calling a telephone number specified by the identified user.

11. The method of claim 1, further comprising the step of:
    establishing the at least one enabled tunnel from the first processor to the second processor through the base network.

12. The method of claim 11, further comprising the step of:
    determining, at the at least one processor, a quality of service for the at least one established tunnel.

13. The method of claim 11, further comprising the step of:
    terminating the at least one established tunnel between the first and second processors when at least one of the first and second processors withdraws the consent to enabling the at least one established tunnel.

14. The method of claim 11, further comprising the steps of:
    receiving, at the at least one processor and through the base network, information indicating a number of packets flowing through the at least one established tunnel; and
    reporting to the identified user the indicated number of packets flowing through the at least one established tunnel.

15. The method of claim 11, further comprising the steps of:
    receiving, at the at least one processor and though the base network, information indicating a latency of at least one packet flowing through the at least one established tunnel; and
    reporting to the identified user the indicated latency.

16. The method of claim 11, further comprising the steps of:
    receiving, at the at least one processor and through the base network, information indicating a throughput of the at least one established tunnel; and
    reporting to the identified user the indicated throughput.

17. The method of claim 11, further comprising the steps of:
    receiving, at the at least one processor and through the base network, information indicating a status of the at least one established tunnel; and
    reporting to the identified user the indicated status.

18. The method of claim 11, further comprising the steps of:
    receiving, at the at least one processor, information indicating a number of packets lost when flowing through the at least one established tunnel; and reporting to the identified user the indicated number of packets lost.

19. The method of claim 1, further comprising the step of:
providing, by the at least one processor and through the base network, at least one key to the first processor for decrypting information flowing from the second processor to the first processor when the at least one enabled tunnel is established between the first processor and the second processor.

20. The method of claim 1, further comprising the step of:
notifying, by the at least one processor, the identified user when an unauthorized attempt to access the first processor is detected.

21. The method of claim 1, further comprising the step of:
notifying, by the at least one processor, the identified user when an unauthorized access to the first processor is detected.

22. The method of claim 1, further comprising the steps of:
determining, at the at least one processor, a total number of processors that are separate from the at least one processor and that are administered by the identified user through the at least one processor; and
billing the identified user based on the determined total number of processors.

23. The method of claim 1, further comprising the steps of:
determining, at the at least one processor, a number of processors that are separate from the at least one processor and that are administered by the identified user through the at least one processor and that are configured as at least one gateway;
billing the identified user based on the determined number of processors.

24. The method of claim 1, further comprising the steps of:
determining, at the at least one processor, a number of processors that are separate from the at least one processor and that are administered by the identified user through the at least one processor and that are configured as a client processor;
billing the identified user based on the determined number of processors.

25. The method of claim 1, further comprising the steps of:
determining, at the least one processor, a total number of processors that are separate from the at least one processor and that are administered by the identified user through the at least one processor;
determining a bandwidth allocated in the base network to the first processor; and
billing the identified user based on the determined bandwidth.

26. The method of claim 1, wherein the step of providing the code and the information for configuring the first processor comprises the step of:
providing, by the at least one processor to the first processor, a virtual address that identifies the first processor in at least one virtual network enabled over the base network by the at least one processor, the virtual address being routable in the at least one virtual network.

27. The method of claim 26, further comprising the step of:
monitoring, at the at least one processor, quality of service of the at least one virtual network.

28. The method of claim 26, further comprising the steps of:
establishing the at least one enabled tunnel from the first processor to the second processor through the base network; and
routing the at least one packet through the at least one established tunnel between the first processor and the second processor based on the virtual address that identifies the first processor in the at least one virtual network.

29. The method of claim 28, further comprising the step of:
prioritizing the routing of the at least one packet through the at least one established tunnel between the first processor and the second processor.

30. The method of claim 1, further comprising the step of:
monitoring, at the at least one processor, quality of service of at least one virtual network enabled over the base network by the at least one processor, based on at least one packet flowing through the at least one virtual network, the at least one packet including a virtual address from a range of virtual addresses that are routable through the at least one virtual network.

31. The method of claim 1, further comprising the step of:
monitoring, at the at least one processor, quality of service of at least one virtual network enabled over the base network by the at least one processor and administered by the identified user through the at least one processor, based on at least one packet flowing through the at least one virtual network.

32. The method of claim 1, further comprising the step of:
monitoring, at the at least one processor, quality of service of at least one virtual network enabled over the base network by the at least one processor, based on at least one packet that flows through the at least one virtual network, the at least one packet being associated with at least one application.

33. The method of claim 1, wherein the first and second processors each communicate to the at least one processor information indicating a consent for enabling the at least one tunnel by communicating at least one name.

34. The method of claim 33, wherein communicating at least one name comprises communicating at least one name independent of the base network.

35. The method of claim 1, wherein the first and second processors each communicate to the at least one processor information indicating a consent for enabling the at least one tunnel by communicating at least one address.

36. The method of claim 35, wherein communicating at least one address comprises communicating at least one address independent of the base network.

37. A method for providing network services over a base network, said method comprising:
providing at least one site in the base network;
receiving, at the at least one site, information about a user;
providing to the user code and other information for self-configuring a first processor;
executing the code on the first processor to self-configure the first processor based on the provided other information; and
establishing communication over the base network between the at least one site and the self-configured first processor to provide the self-configured first processor virtual address information enabling at least one tunnel through the base network between the self-configured first processor and at least one other self-configured second processor, when the at least one site determines that the self-configured first and second processors mutually consent to enabling the at least one tunnel, wherein the self-configured first and second processors consent to enabling the at least one tunnel by communicating to the at least one site information indicating consent.

38. The method of claim 37, further comprising the step of:
establishing at least one virtual network over the base network based on the at least one enabled tunnel.

39. The method of claim 38, further comprising the step of:
the at least one site administering the at least one virtual network on behalf of the user.

40. The method of claim 39, further comprising the step of:
the at least one site providing to the user a graphical interface through which the user administers the at least one virtual network.

41. The method of claim 39, further comprising the step of:
the at least one site providing to the user quality of service (QoS) information about the at least one virtual network.

42. The method of claim 38, further comprising the steps of:
the at least one site monitoring the at least one virtual network; and
the at least one site providing to the user monitoring information about the at least one virtual network.

43. The method of claim 42, further comprising the step of:
the at least one site notifying the user when the at least one site detects in the at least one virtual network an event that exceeds a predetermined threshold.

44. The method of claim 38, further comprising the step of:
the at least one site automating on behalf of the user administration of the at least one virtual network.

45. The method of claim 38, further comprising the step of:
billing the user based on a number of the self-configured first processor and other processors that the user self-configures and administers through the at least one site.

46. The method of claim 38, further comprising the step of:
billing the user based on a number of the self-configured first processor and at least one client processor that the user configures and administers through the at least one site.

47. The method of claim 38, further comprising the step of:
billing the user based on bandwidth allocated in the base network for the self-configured first processor and other processors that the user self-configures and administers through the at least one site.

48. The method of claim 38, further comprising the step of:
the at least one site dynamically modifying configuration of the self-configured first processor through the base network.

49. The method of claim 38, further comprising the step of:
the at least one site communicating with the self-configured first and second processors through other tunnels established through the base network to facilitate administration of the at least one virtual network on behalf of the user.

50. The method of claim 37, further comprising the step of:
the at least one site providing to the user quality of service (QoS) information about at least one network service provider that provides access to the base network.

51. The method of claim 37, further comprising the step of:
the at least one site providing to the user a comparison of quality of service (QoS) information about different network service providers providing access to the base network.

52. The method of claim 37, further comprising the step of:
the at least one site upgrading the code executed in the self-configured first processor through the base network.

53. The method of claim 37, further comprising:
the at least one site configuring for the self-configured first processor a firewall based on additional information provided by the user to the at least one site.

54. The method of claim 37, further comprising the steps of:
the at least one site requesting from the user additional information about a local area network that is administered by the user and that interfaces the base network;
the at least one site receiving the additional information from the user; and
the at least one site determining the other information for self-configuring the first processor based on the additional information.

55. The method of claim 37, wherein the step of establishing communication comprises the steps of:
the self-configured first processor automatically initiating the communication with the at least one site based on the other information provided by the at least one site for self-configuring the first processor; and
the at least one site providing to the self-configured processor additional information enabling the self-configured first process to establish a secure tunnel to the at least one site.

56. The method of claim 55, further comprising the step of:
the at least one site administering the self-configured first processor through the secure tunnel established through the base network between the self-configured first processor and the at least one site.

* * * * *